US012432382B2

(12) United States Patent
Ohkawa et al.

(10) Patent No.: US 12,432,382 B2
(45) Date of Patent: Sep. 30, 2025

(54) THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

(71) Applicant: Panasonic Intellectual Property Corporation of America, Torrance, CA (US)

(72) Inventors: Masato Ohkawa, Toyama (JP); Noritaka Iguchi, Osaka (JP); Toshiyasu Sugio, Osaka (JP); Takahiro Nishi, Nara (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 105 days.

(21) Appl. No.: 18/242,729

(22) Filed: Sep. 6, 2023

(65) Prior Publication Data
US 2023/0421814 A1 Dec. 28, 2023

Related U.S. Application Data

(63) Continuation of application No. PCT/JP2022/009732, filed on Mar. 7, 2022.
(Continued)

(51) Int. Cl.
*H04N 19/60* (2014.01)
*H04N 19/136* (2014.01)
(Continued)

(52) U.S. Cl.
CPC .......... *H04N 19/60* (2014.11); *H04N 19/136* (2014.11); *H04N 19/172* (2014.11); *H04N 19/189* (2014.11); *H04N 19/463* (2014.11)

(58) Field of Classification Search
CPC .... H04N 19/60; H04N 19/136; H04N 19/172; H04N 19/189; H04N 19/463; H04N 19/597; H04N 19/70; G06T 9/00
See application file for complete search history.

(56) References Cited

U.S. PATENT DOCUMENTS

2014/0375638 A1 12/2014 Tomaru et al.
2015/0181213 A1* 6/2015 Chono ................. H04N 19/176
375/240.02
(Continued)

FOREIGN PATENT DOCUMENTS

WO 2014/020663 2/2014
WO 2020/162495 8/2020
(Continued)

OTHER PUBLICATIONS

International Search Report (ISR) issued on May 10, 2022 in International (PCT) Application No. PCT/JP2022/009732.

*Primary Examiner* — Jared Walker
(74) *Attorney, Agent, or Firm* — Wenderoth, Lind & Ponack, L.L.P.

(57) ABSTRACT

A three-dimensional data encoding method includes: obtaining second attribute information obtained by transforming first attribute information of a three-dimensional point in at least one frame among frames, the frames constituting a sequence; and encoding the second attribute information to generate a bitstream. The transforming is different from quantization, and the bitstream further includes: at least one first parameter provided for the sequence for the transforming; and at least one second parameter provided for each of the at least one frame for the transforming.

4 Claims, 62 Drawing Sheets

Related U.S. Application Data

(60) Provisional application No. 63/158,607, filed on Mar. 9, 2021.

(51) Int. Cl.
  *H04N 19/172* (2014.01)
  *H04N 19/189* (2014.01)
  *H04N 19/463* (2014.01)

(56) References Cited

U.S. PATENT DOCUMENTS

| | | | |
|---|---|---|---|
| 2017/0214943 A1* | 7/2017 | Cohen | H04N 19/62 |
| 2017/0347100 A1* | 11/2017 | Chou | H03M 7/3059 |
| 2019/0318488 A1* | 10/2019 | Lim | H04N 21/85406 |
| 2019/0355152 A1* | 11/2019 | Li | H03M 7/3082 |
| 2020/0013215 A1* | 1/2020 | Vosoughi | G06T 17/005 |
| 2020/0372603 A1* | 11/2020 | Rangan | G06T 15/04 |
| 2021/0368186 A1 | 11/2021 | Sugio et al. | |
| 2021/0407144 A1* | 12/2021 | Ramasubramonian | G06T 17/20 |
| 2021/0409769 A1 | 12/2021 | Iguchi et al. | |

FOREIGN PATENT DOCUMENTS

| | | | | |
|---|---|---|---|---|
| WO | WO-2020162495 A1 * | 8/2020 | | G06T 9/001 |
| WO | 2020/189709 | 9/2020 | | |
| WO | WO-2020189709 A1 * | 9/2020 | | G06T 9/00 |

\* cited by examiner

| | GEOMETRY INFORMATION | ATTRIBUTE INFORMATION |
|---|---|---|
| n = 1 | $G(1) = (x_1, y_1, z_1)$ | $A(1) = (R_1, G_1, B_1)$ |
| n = 2 | $G(2) = (x_2, y_2, z_2)$ | $A(2) = (R_2, G_2, B_2)$ |
| ⋮ | ⋮ | ⋮ |
| n = N | $G(N) = (x_N, y_N, z_N)$ | $A(N) = (R_N, G_N, B_N)$ |

FIG. 27

```
EXAMPLES OF SEMANTICS OF pcc_nal_unit_type
(1) if pcc_codec_type == Codec 1
       0:Codec1 Goemetry
       1:Codec1 AttributeX
       2:Codec1 AttributeY
       3:Codec1 Geom. PS
       4:Codec1 AttrX. PS
       5:Codec1 AttrX. PS
       6:Codec1 Geometry Sequence PS
       7:Codec1 AttributeX Sequence PS
       8:Codec1 AttributeY Sequence PS
       9:Codec1 AU Header
      10:Codec1 GOF Header
    11 ~:Codec1 reserved for future use (2) if pcc_codec_type == Codec 2
       0:Codec2 DataA
       1:Codec2 MetaDataA
       2:Codec2 MetaDataB
     3 ~:Codec2 reserved for future use
```

FIG. 35

```
SPS0{
  sps_idx
  common_information();
  for(i=0; i>numAttribute; i++){
     attribute_type;
     instance_id;
     num_dimention;
     transform_flag;
     if(transform_flag){
        offset;
        scale;
     }
     attribute_info();
  }
}
```

0-TH : color1
FIRST : color2
SECOND : reflectance

FIG. 37

```
SPS(){
  sps_idx
  common_information();
  for(i=0; i>numAttribute; i++){
    attribute_type;
    instance_id;
    num_dimention;
    transform_info();
    attribute_info();
  }
}
```

FIG. 38

```
transform_info(){
 transform_type;
   if( transform_type == 0 ){
     //none
   }else if (transform_type == 1){
     offset
     scale
   }else if (transform_type == 2){
     offset_log2 //offset MULTIPLIER OF 2 FOR OFFSET
     scale_log2  //scale MULTIPLIER OF 2 FOR SCALE
   }else if (transform_type == 3){
     offset
   }
}
```

FIG. 39

```
transform_info(){
  transform_type;
  if( attribute_type == color ){
    //none
  }else if (transform_type == reflectance){
    scale
  }else if (transform_type == normal_vector){
    transform_order // 1
    scale
    offset
  }
}
```

FIG. 44

```
SEI(){
    format_id;
    if(format_id == 0) {
        ply_format_info();
    } else if(format_id == 1) {
        las_format_info();
    } else if( ... ) {
        .
        .
        .
    }
}
```

FIG. 45

```
ply_format_info(){
    format_info;
    element_info;
    property_num;
    for(i=0;i<property_num;i++) {
        property_info;
        property_type;
        scale;
        offset;
        is_property;
        if(! is_property) {
            fill_property;
        }else{
            sps_id
            component_id
        }
    }
}
```

FIG. 46

```
las_format_info(){
    public_header_block();
    variable_length_records();
    point_data_records();
    extended_variable_length_records();
}
```

FIG. 47

```
public_header_block() {
    file_signature;
    file_sourceID;
    global_encoding;
    ProjectID_GUID_data1;
    ProjectID_GUID_data2;
    ProjectID_GUID_data3;
    ProjectID_GUID_data4;
    version_major;
    version_minor;
    system_identifier;
    generating_software;
    file_creation_day_of_year;
    file_creation_year;
    header_size;
    offset_to_point_data;
    number_of_variable_length_records;
    point_data_record_format;
    point_data_record_length;
    legacy_number_of_point_records;
    legacy_number_of_point_by_retrun;
    x_scale_factor;
    y_scale_factor;
    z_scale_factor;
    x_offset;
    y_offset;
    z_offset;
    max_x;
    min_x;
    max_y;
    min_y;
    max_z;
    min_z;
    start_of_waveform_data_packet_record;
    start_of_first_extended_variable_length_record;
    number_of_extended_variable_length_records;
    number_of_point_records;
    number_of_points_by_retrun;
}
```

FIG. 48

```
variable_length_records() {
    reserved;
    user_id;
    record_id;
    record_length_after_header;
    rescription;
}
```

FIG. 49

```
point_data_records(){
    component_num;
    for(i=0;i< component_num;i++) {
        component_info;
        scale;
        offset;
        is_component;
        if(! is_component) {
            fill_component;
        }
    }
}
```

FIG. 50

```
extended_variable_length_records() {
    reserved;
    user_id;
    record_id;
    record_length_after_header;
    rescription;
}
```

FIG. 57

```
SPS0{
    sps_idx
  common_information();
  for(i=0; i>numAttribute; i++){
    attribute_type;
    instance_id;
    num_dimention;
    num_attribute_parameter;
    for(i=0;i<num_attribute_parameter;i++){
       attribute_parameter(i)
    }
    attribute_info();
  }
}
```

FIG. 58

```
attribute_parameter(i){
    attr_param_type
    if( attr_param_type==1){
       //processing for attr_param_type==1
    }
    else if( attr_param_type ==3){
      attribute_source_offset_num_bits[ i ]
      attribute_source_offset [ i ]
      attribute_source_scale_num_bits [ i ]
      attribute_source_scale [ i ]
      attribute_scale_frac_bits [ i ]
    }
}
```

FIG. 62

| | 16 bit | | 8 bit |
|---|---|---|---|
| Point 0 | 14280 | | 55 |
| Point 1 | 14535 | | 57 |
| Point 2 | 14790 | * 1/255 ⟹ | 58 |
| Point 3 | 14280 | | 55 |
| Point 4 | 15045 | | 59 |
| Point n | ⋮ | | ⋮ |

FIG. 63

| | 8 bit | | 16 bit |
|---|---|---|---|
| Point 0 | 55 | | 14280 |
| Point 1 | 57 | | 14535 |
| Point 2 | 58 | * 255 ⟹ | 14790 |
| Point 3 | 55 | | 14280 |
| Point 4 | 59 | | 15045 |
| Point n | ⋮ | | ⋮ |

FIG. 65

| | 17 bit | | 16 bit |
|---|---|---|---|
| Point 0 | 75928 | | 37964 |
| Point 1 | 62306 | * 1/2 | 31153 |
| Point 2 | 14103 | ⟹ | 7051 |
| Point 3 | 82365 | | 41182 |
| Point 4 | 35441 | | 17720 |
| Point n | ⋮ | | ⋮ |

FIG. 66

| | Signed 16 bit | | Unsigned 16 bit |
|---|---|---|---|
| Point 0 | -5027 | | 0 |
| Point 1 | 347 | + 5027 | 5374 |
| Point 2 | 3563 | ⟹ | 8590 |
| Point 3 | 82 | | 5109 |
| Point 4 | -321 | | 4706 |
| Point n | ⋮ | | ⋮ |

FIG. 67

| | double 64 bit | | 8 bit |
|---|---|---|---|
| Point 0 | 23.12012 | | 12 |
| Point 1 | 23.12024 | * 100000 | 24 |
| Point 2 | 23.12036 | - 2312000 ⇒ | 36 |
| Point 3 | 23.12048 | | 48 |
| Point 4 | 23.12060 | | 60 |
| Point n | ⋮ | | ⋮ |

FIG. 68

|  | 16 bit | | 17 bit |
|---|---|---|---|
| Point 0 | 37964 | | 75928 |
| Point 1 | 31153 | | 62306 |
| Point 2 | 7051 | * 2 → | 14102 |
| Point 3 | 41182 | | 82364 |
| Point 4 | 17720 | | 35440 |
| Point n | ⋮ | | ⋮ |

FIG. 69

|  | Unsigned 16 bit | | Signed 16 bit |
|---|---|---|---|
| Point 0 | 0 | | -5027 |
| Point 1 | 5374 | | 347 |
| Point 2 | 8590 | -5027 → | 3563 |
| Point 3 | 5109 | | 82 |
| Point 4 | 4706 | | 321 |
| Point n | ⋮ | | ⋮ |

FIG. 70

|  | 8 bit | | double 64 bit |
|---|---|---|---|
| Point 0 | 12 | | 23.12012 |
| Point 1 | 24 | + 2312000 | 23.12024 |
| Point 2 | 36 | * 1/100000 ⟹ | 23.12036 |
| Point 3 | 48 | | 23.12048 |
| Point 4 | 60 | | 23.12060 |
| Point n | ⋮ | | ⋮ |

THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

CROSS REFERENCE TO RELATED APPLICATIONS

This application is a U.S. continuation application of PCT International Patent Application Number PCT/JP2022/009732 filed on Mar. 7, 2022, claiming the benefit of priority of U.S. Provisional Patent Application No. 63/158,607 filed on Mar. 9, 2021, the entire contents of which are hereby incorporated by reference.

FIELD

The present disclosure relates to a three-dimensional data encoding method, a three-dimensional data decoding method, a three-dimensional data encoding device, and a three-dimensional data decoding device.

BACKGROUND

Devices or services utilizing three-dimensional data are expected to find their widespread use in a wide range of fields, such as computer vision that enables autonomous operations of cars or robots, map information, monitoring, infrastructure inspection, and video distribution. Three-dimensional data is obtained through various means including a distance sensor such as a rangefinder, as well as a stereo camera and a combination of a plurality of monocular cameras.

Methods of representing three-dimensional data include a method known as a point cloud scheme that represents the shape of a three-dimensional structure by a point cloud in a three-dimensional space. In the point cloud scheme, the positions and colors of a point cloud are stored. While point cloud is expected to be a mainstream method of representing three-dimensional data, a massive amount of data of a point cloud necessitates compression of the amount of three-dimensional data by encoding for accumulation and transmission, as in the case of a two-dimensional moving picture (examples include Moving Picture Experts Group-4 Advanced Video Coding (MPEG-4 AVC) and High Efficiency Video Coding (HEVC) standardized by MPEG).

Meanwhile, point cloud compression is partially supported by, for example, an open-source library (Point Cloud Library) for point cloud-related processing.

Furthermore, a technique for searching for and displaying a facility located in the surroundings of the vehicle by using three-dimensional map data is known (see, for example, Patent Literature (PTL) 1).

CITATION LIST

Patent Literature

PTL 1: International Publication WO 2014/020663

SUMMARY

Technical Problem

For such three-dimensional data encoding methods and three-dimensional data decoding methods, there is a demand for improving encoding efficiency.

The present disclosure is intended to provide a three-dimensional data encoding method, a three-dimensional data decoding method, a three-dimensional data encoding device, or a three-dimensional data decoding device that is capable of improving encoding efficiency.

Solution to Problem

A three-dimensional data encoding method according to an aspect of the present disclosure includes: obtaining second attribute information obtained by transforming first attribute information of a three-dimensional point in at least one frame among frames, the frames constituting a sequence; and encoding the second attribute information to generate a bitstream, wherein the transforming is different from quantization, and the bitstream further includes: at least one first parameter provided for the sequence for the transforming; and at least one second parameter provided for each of the at least one frame for the transforming.

A three-dimensional data decoding method according to an aspect of the present disclosure includes: obtaining a bitstream; and decoding the bitstream to generate second attribute information obtained by transforming first attribute information of a three-dimensional point in at least one frame among frames, the frames constituting a sequence, wherein the transforming is different from quantization, and the bitstream further includes: at least one first parameter provided for the sequence for the transforming; and at least one second parameter provided for each of the at least one frame for the transforming.

Advantageous Effects

The present disclosure provides a three-dimensional data encoding method, a three-dimensional data decoding method, a three-dimensional data encoding device, or a three-dimensional data decoding device that is capable of improving encoding efficiency.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 27 is a diagram illustrating a semantics example of pcc_nal_unit_type according to Embodiment 2.

FIG. 35 is a diagram illustrating a first example of a syntax of SPS according to Embodiment 3.

FIG. 37 is a diagram illustrating a second example of the syntax of SPS according to Embodiment 3.

FIG. 38 is a diagram illustrating a first example of a syntax of transform information according to Embodiment 3.

FIG. 39 is a diagram illustrating a second example of the syntax of the transform information according to Embodiment 3.

FIG. 44 is a diagram illustrating an example of a syntax of SEI according to Embodiment 4.

FIG. 45 is a diagram illustrating an example of a syntax of ply_format_info( ) according to Embodiment 4.

FIG. 46 is a diagram illustrating an example of a syntax of las_format_info( ) according to Embodiment 4.

FIG. 47 is a diagram illustrating an example of a syntax of public_header_block( ) according to Embodiment 4.

FIG. 48 is a diagram illustrating an example of a syntax of variable_length_records( ) according to Embodiment 4.

FIG. 49 is a diagram illustrating an example of a syntax of point_data_records( ) according to Embodiment 4.

FIG. 50 is a diagram illustrating an example of a syntax of extended_variable_length_records( ) according to Embodiment 4.

FIG. 57 is a diagram illustrating an example of a syntax of SPS according to Embodiment 4.

FIG. 58 is a diagram illustrating an example of a syntax of attribute_parameter(i) according to Embodiment 4.

FIG. 62 is a diagram illustrating an example of processing performed by a transformer according to a second example of Embodiment 4.

FIG. 63 is a diagram illustrating an example of processing performed by an inverse transformer according to a second example of Embodiment 4.

FIG. 65 is a diagram illustrating an example of processing performed by a transformer according to a third example of Embodiment 4.

FIG. 66 is a diagram illustrating an example of processing performed by a transformer according to a third example of Embodiment 4.

FIG. 67 is a diagram illustrating an example of processing performed by a transformer according to a third example of Embodiment 4.

FIG. 68 is a diagram illustrating an example of processing performed by an inverse transformer according to a third example of Embodiment 4.

FIG. 69 is a diagram illustrating an example of processing performed by an inverse transformer according to a third example of Embodiment 4.

FIG. 70 is a diagram illustrating an example of processing performed by an inverse transformer according to a third example of Embodiment 4.

DESCRIPTION OF EMBODIMENTS

Figure 1:
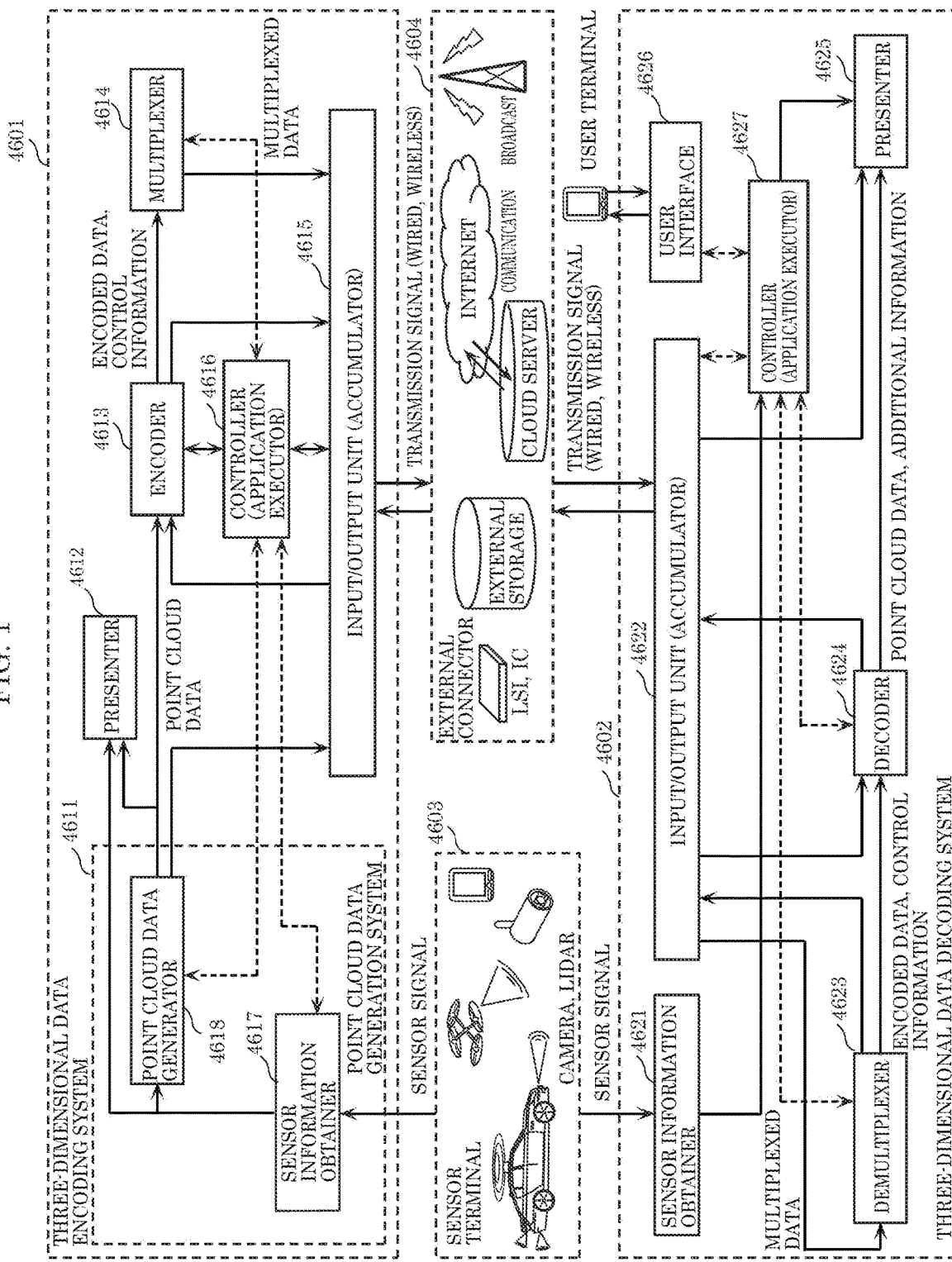
FIG. 1 is a diagram illustrating a configuration of a three-dimensional data encoding and decoding system according to Embodiment 1.

A three-dimensional data encoding method according to an aspect of the present disclosure includes: transforming attribute information of a three-dimensional point in at least one frame among frames, the frames constituting a sequence; and encoding the attribute information transformed to generate a bitstream. Here, the bitstream further includes: at least one first parameter provided for the sequence for the transforming; and at least one second parameter provided for each of the at least one frame for the transforming.

Accordingly, in the three-dimensional data encoding method, for example, switching the parameter of the transforming between the sequence-based parameter and the frame-based parameter can be selectively controlled. Accordingly, an appropriate transform process can be performed, thus enabling improvement in coding efficiency.

For example, in a three-dimensional data decoding device that decodes the attribute information from the bitstream, when the at least one second parameter corresponding to a current frame to be processed is included in the bitstream, the at least one second parameter may be used, the current frame being included in the frames.

For example, in the three-dimensional data decoding device, when the at least one second parameter corresponding to the current frame is not included in the bitstream, the at least one first parameter may be used.

For example, the transforming may include performing, on the attribute information, at least one of: multiplication or division, using a first value; or addition or subtraction, using a second value. For example, each of the at least one first parameter and the at least one second parameter may indicate at least one of the first value or the second value.

For example, the bitstream may include information items on a plurality of types of the three-dimensional point, the information items on the plurality of types including the attribute information. For example, the bitstream may further include first information indicating whether each of the information items on the plurality of types is compressed.

For example, the information items on the plurality of types may include a plurality of types of attribute information of the three-dimensional point. For example, the information items on the plurality of types may include geometry information of the three-dimensional point.

For example, the bitstream may include first control information for the sequence, and the first control information may include information indicating a list of the information items on the plurality of types. For example, the first information may include: information identifying the first control information; and information indicating an ordinal position, on the list, of information that is compressed.

For example, the bitstream may further include second information indicating a format type of point cloud data including the attribute information.

A three-dimensional data decoding method according to an aspect of the present disclosure includes: decoding a bitstream to generate decoded attribute information; and inverse-transforming the decoded attribute information to generate attribute information of a three-dimensional point in at least one frame among frames, the frames constituting a sequence. Here, the bitstream further includes: at least one first parameter provided for the sequence for the inverse-transforming; and at least one second parameter provided for each of the at least one frame for the inverse-transforming.

Accordingly, the three-dimensional data decoding device can decode attribute information from a bitstream for which coding efficiency has been improved.

For example, the three-dimensional data decoding method may further include: when the at least one second parameter corresponding to a current frame to be processed is included in the bitstream, inverse-transforming decoded attribute information of the current frame using the at least one second parameter, the current frame being included in the frames.

For example, the three-dimensional data decoding method may further include: when the at least one second parameter corresponding to the current frame is not included in the bitstream, inverse-transforming the decoded attribute information of the current frame using the at least one first parameter.

For example, the inverse-transforming may include performing, on the decoded attribute information, at least one of: multiplication or division, using a first value; or addition or subtraction, using a second value. For example, each of the at least one first parameter and the at least one second parameter may indicate at least one of the first value or the second value.

For example, the bitstream may include information items on a plurality of types of the three-dimensional point, the information items on the plurality of types including the attribute information. For example, the bitstream may further include first information indicating whether each of the information items on the plurality of types is compressed.

For example, the information items on the plurality of types may include a plurality of types of attribute information of the three-dimensional point. For example, the information items on the plurality of types may include geometry information of the three-dimensional point.

For example, the bitstream may include first control information for the sequence, and the first control information may include information indicating a list of the information items on the plurality of types. For example, the first information may include: information identifying the first control information; and information indicating an ordinal position, on the list, of information that is compressed.

For example, the bitstream may further include second information indicating a format type of point cloud data including the attribute information.

A three-dimensional data encoding device according to an aspect of the present disclosure includes: a processor; and memory, and, using the memory, the processor: transforms attribute information of a three-dimensional point in at least one frame among frames, the frames constituting a sequence; and encodes the attribute information transformed to generate a bitstream. Here, the bitstream further includes: at least one first parameter provided for the sequence for the transforming; and at least one second parameter provided for each of the at least one frame for the transforming.

Accordingly, in the three-dimensional data encoding device, for example, switching the parameter of the transforming between the sequence-based parameter and the frame-based parameter can be selectively controlled. Accordingly, an appropriate transform process can be performed, thus enabling improvement in coding efficiency.

A three-dimensional data decoding device according to an aspect of the present disclosure includes: a processor; and memory, and, using the memory, the processor: decodes a bitstream to generate decoded attribute information; and inverse-transforms the decoded attribute information to generate attribute information of a three-dimensional point in at least one frame among frames, the frames constituting a sequence. Here, the bitstream further includes: at least one first parameter provided for the sequence for the inverse-transforming; and at least one second parameter provided for each of the at least one frame for the inverse-transforming.

Accordingly, the three-dimensional data decoding device can decode attribute information from a bitstream for which coding efficiency has been improved.

It is to be noted that these general or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

Hereinafter, embodiments will be specifically described with reference to the drawings. It is to be noted that each of the following embodiments indicate a specific example of the present disclosure. The numerical values, shapes, materials, constituent elements, the arrangement and connection of the constituent elements, steps, the processing order of the steps, etc., indicated in the following embodiments are mere examples, and thus are not intended to limit the present disclosure. Among the constituent elements described in the following embodiments, constituent elements not recited in any one of the independent claims will be described as optional constituent elements.

Embodiment 1

When using encoded data of a point cloud in a device or for a service in practice, required information for the application is desirably transmitted and received in order to reduce the network bandwidth. However, conventional encoding structures for three-dimensional data have no such a function, and there is also no encoding method for such a function.

Embodiment 1 described below relates to a three-dimensional data encoding method and a three-dimensional data encoding device for encoded data of a three-dimensional point cloud that provides a function of transmitting and receiving required information for an application, a three-dimensional data decoding method and a three-dimensional data decoding device for decoding the encoded data, a three-dimensional data multiplexing method for multiplexing the encoded data, and a three-dimensional data transmission method for transmitting the encoded data.

In particular, at present, a first encoding method and a second encoding method are under investigation as encoding methods (encoding schemes) for point cloud data. However, there is no method defined for storing the configuration of encoded data and the encoded data in a system format. Thus, there is a problem that an encoder cannot perform an MUX process (multiplexing), transmission, or accumulation of data.

In addition, there is no method for supporting a format that involves two codecs, the first encoding method and the second encoding method, such as point cloud compression (PCC).

With regard to this embodiment, a configuration of PCC-encoded data that involves two codecs, a first encoding method and a second encoding method, and a method of storing the encoded data in a system format will be described.

A configuration of a three-dimensional data (point cloud data) encoding and decoding system according to this embodiment will be first described. FIG. 1 is a diagram showing an example of a configuration of the three-dimensional data encoding and decoding system according to this embodiment. As shown in FIG. 1, the three-dimensional data encoding and decoding system includes three-dimensional data encoding system 4601, three-dimensional data decoding system 4602, sensor terminal 4603, and external connector 4604.

Three-dimensional data encoding system 4601 generates encoded data or multiplexed data by encoding point cloud data, which is three-dimensional data. Three-dimensional data encoding system 4601 may be a three-dimensional data encoding device implemented by a single device or a system implemented by a plurality of devices. The three-dimensional data encoding device may include a part of a plurality of processors included in three-dimensional data encoding system 4601.

Three-dimensional data encoding system 4601 includes point cloud data generation system 4611, presenter 4612, encoder 4613, multiplexer 4614, input/output unit 4615, and controller 4616. Point cloud data generation system 4611 includes sensor information obtainer 4617, and point cloud data generator 4618.

Sensor information obtainer 4617 obtains sensor information from sensor terminal 4603, and outputs the sensor information to point cloud data generator 4618. Point cloud data generator 4618 generates point cloud data from the sensor information, and outputs the point cloud data to encoder 4613.

Presenter 4612 presents the sensor information or point cloud data to a user. For example, presenter 4612 displays information or an image based on the sensor information or point cloud data.

Encoder 4613 encodes (compresses) the point cloud data, and outputs the resulting encoded data, control information (signaling information) obtained in the course of the encoding, and other additional information to multiplexer 4614. The additional information includes the sensor information, for example.

Multiplexer 4614 generates multiplexed data by multiplexing the encoded data, the control information, and the additional information input thereto from encoder 4613. A format of the multiplexed data is a file format for accumulation or a packet format for transmission, for example.

Input/output unit 4615 (a communication unit or interface, for example) outputs the multiplexed data to the outside. Alternatively, the multiplexed data may be accumulated in an accumulator, such as an internal memory. Controller 4616 (or an application executor) controls each processor. That is, controller 4616 controls the encoding, the multiplexing, or other processing.

Note that the sensor information may be input to encoder 4613 or multiplexer 4614. Alternatively, input/output unit 4615 may output the point cloud data or encoded data to the outside as it is.

A transmission signal (multiplexed data) output from three-dimensional data encoding system 4601 is input to three-dimensional data decoding system 4602 via external connector 4604.

Three-dimensional data decoding system 4602 generates point cloud data, which is three-dimensional data, by decoding the encoded data or multiplexed data. Note that three-dimensional data decoding system 4602 may be a three-dimensional data decoding device implemented by a single device or a system implemented by a plurality of devices. The three-dimensional data decoding device may include a part of a plurality of processors included in three-dimensional data decoding system 4602.

Three-dimensional data decoding system 4602 includes sensor information obtainer 4621, input/output unit 4622, demultiplexer 4623, decoder 4624, presenter 4625, user interface 4626, and controller 4627.

Sensor information obtainer 4621 obtains sensor information from sensor terminal 4603.

Input/output unit 4622 obtains the transmission signal, decodes the transmission signal into the multiplexed data (file format or packet), and outputs the multiplexed data to demultiplexer 4623.

Demultiplexer 4623 obtains the encoded data, the control information, and the additional information from the multiplexed data, and outputs the encoded data, the control information, and the additional information to decoder 4624.

Decoder 4624 reconstructs the point cloud data by decoding the encoded data.

Presenter 4625 presents the point cloud data to a user. For example, presenter 4625 displays information or an image based on the point cloud data. User interface 4626 obtains an indication based on a manipulation by the user. Controller 4627 (or an application executor) controls each processor. That is, controller 4627 controls the demultiplexing, the decoding, the presentation, or other processing.

Note that input/output unit 4622 may obtain the point cloud data or encoded data as it is from the outside. Presenter 4625 may obtain additional information, such as sensor information, and present information based on the additional information. Presenter 4625 may perform a presentation based on an indication from a user obtained on user interface 4626.

Sensor terminal 4603 generates sensor information, which is information obtained by a sensor. Sensor terminal 4603 is a terminal provided with a sensor or a camera. For example, sensor terminal 4603 is a mobile body, such as an automobile, a flying object, such as an aircraft, a mobile terminal, or a camera.

Sensor information that can be generated by sensor terminal 4603 includes (1) the distance between sensor terminal 4603 and an object or the reflectance of the object obtained by LiDAR, a millimeter wave radar, or an infrared sensor or (2) the distance between a camera and an object or the reflectance of the object obtained by a plurality of monocular camera images or a stereo-camera image, for example. The sensor information may include the posture, orientation, gyro (angular velocity), position (GPS information or altitude), velocity, or acceleration of the sensor, for example. The sensor information may include air temperature, air pressure, air humidity, or magnetism, for example.

External connector 4604 is implemented by an integrated circuit (LSI or IC), an external accumulator, communication with a cloud server via the Internet, or broadcasting, for example.

Figures 2, 3:
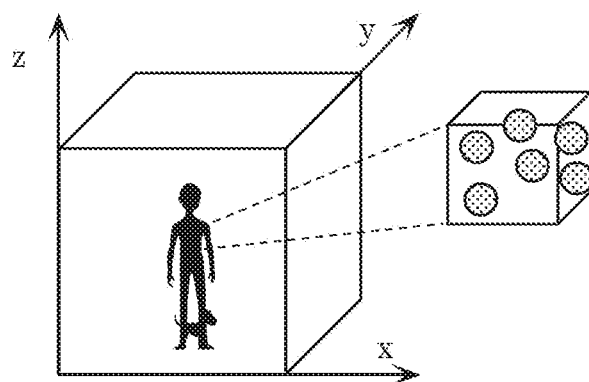
FIG. 2 is a diagram illustrating a structure example of point cloud data according to Embodiment 1.
FIG. 3 is a diagram illustrating a structure example of a data file indicating the point cloud data according to Embodiment 1.

Next, point cloud data will be described. FIG. 2 is a diagram showing a configuration of point cloud data. FIG. 3 is a diagram showing a configuration example of a data file describing information of the point cloud data.

Point cloud data includes data on a plurality of points. Data on each point includes geometry information (three-dimensional coordinates) and attribute information associated with the geometry information. A set of a plurality of such points is referred to as a point cloud. For example, a point cloud indicates a three-dimensional shape of an object.

Geometry information (position), such as three-dimensional coordinates, may be referred to as geometry. Data on each point may include attribute information (attribute) on a plurality of types of attributes. A type of attribute is color or reflectance, for example.

One item of attribute information (in other words, a piece of attribute information or an attribute information item) may be associated with one item of geometry information (in other words, a piece of geometry information or a geometry information item), or attribute information on a plurality of different types of attributes may be associated with one item of geometry information. Alternatively, items of attribute information on the same type of attribute may be associated with one item of geometry information.

The configuration example of a data file shown in FIG. 3 is an example in which geometry information and attribute information are associated with each other in a one-to-one relationship, and geometry information and attribute information on N points forming point cloud data are shown.

The geometry information is information on three axes, specifically, an x-axis, a y-axis, and a z-axis, for example. The attribute information is RGB color information, for example. A representative data file is ply file, for example.

Figure 4:
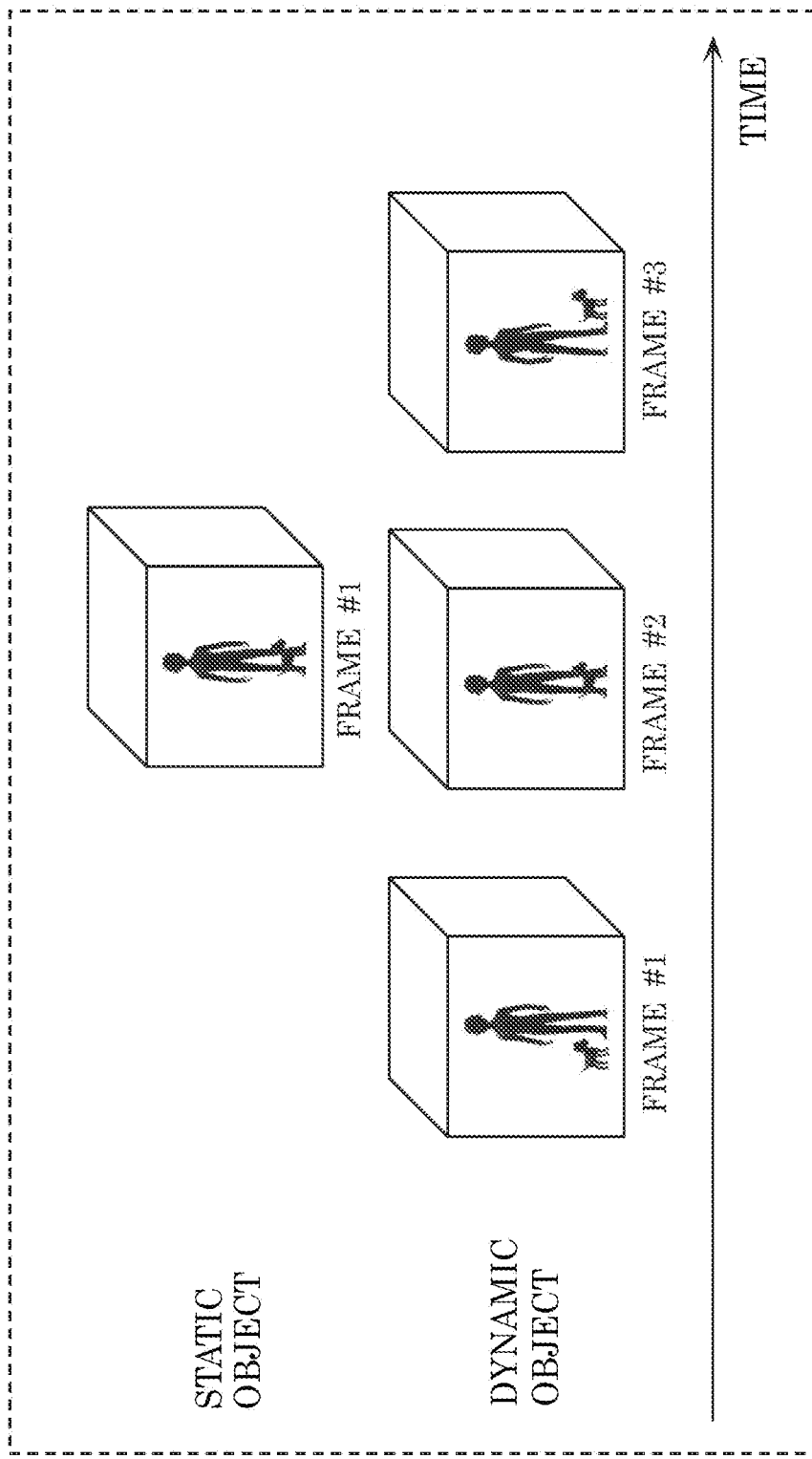
FIG. 4 is a diagram illustrating types of the point cloud data according to Embodiment 1.

Next, types of point cloud data will be described. FIG. 4 is a diagram showing types of point cloud data. As shown in FIG. 4, point cloud data includes a static object and a dynamic object.

The static object is three-dimensional point cloud data at an arbitrary time (a time point). The dynamic object is three-dimensional point cloud data that varies with time. In the following, three-dimensional point cloud data associated with a time point will be referred to as a PCC frame or a frame.

The object may be a point cloud whose range is limited to some extent, such as ordinary video data, or may be a large point cloud whose range is not limited, such as map information.

There are point cloud data having varying densities. There may be sparse point cloud data and dense point cloud data.

In the following, each processor will be described in detail. Sensor information is obtained by various means, including a distance sensor such as LiDAR or a range finder, a stereo camera, or a combination of a plurality of monocular cameras. Point cloud data generator 4618 generates point cloud data based on the sensor information obtained by sensor information obtainer 4617. Point cloud data generator 4618 generates geometry information as point cloud data, and adds attribute information associated with the geometry information to the geometry information.

When generating geometry information or adding attribute information, point cloud data generator 4618 may process the point cloud data. For example, point cloud data generator 4618 may reduce the data amount by omitting a point cloud whose position coincides with the position of another point cloud. Point cloud data generator 4618 may also convert the geometry information (such as shifting, rotating or normalizing the position) or render the attribute information.

Note that, although FIG. 1 shows point cloud data generation system 4611 as being included in three-dimensional data encoding system 4601, point cloud data generation system 4611 may be independently provided outside three-dimensional data encoding system 4601.

Encoder 4613 generates encoded data by encoding point cloud data according to an encoding method previously defined. In general, there are the two types of encoding methods described below. One is an encoding method using geometry information, which will be referred to as a first encoding method, hereinafter. The other is an encoding method using a video codec, which will be referred to as a second encoding method, hereinafter.

Decoder 4624 decodes the encoded data into the point cloud data using the encoding method previously defined.

Multiplexer 4614 generates multiplexed data by multiplexing the encoded data in an existing multiplexing method. The generated multiplexed data is transmitted or accumulated. Multiplexer 4614 multiplexes not only the PCC-encoded data but also another medium, such as a video, an audio, subtitles, an application, or a file, or reference time information. Multiplexer 4614 may further multiplex attribute information associated with sensor information or point cloud data.

Multiplexing schemes or file formats include ISOBMFF, MPEG-DASH, which is a transmission scheme based on ISOBMFF, MMT, MPEG-2 TS Systems, or RMP, for example.

Demultiplexer 4623 extracts PCC-encoded data, other media, time information and the like from the multiplexed data.

Input/output unit 4615 transmits the multiplexed data in a method suitable for the transmission medium or accumulation medium, such as broadcasting or communication. Input/output unit 4615 may communicate with another device over the Internet or communicate with an accumulator, such as a cloud server.

As a communication protocol, http, ftp, TCP, UDP or the like is used. The pull communication scheme or the push communication scheme can be used.

A wired transmission or a wireless transmission can be used. For the wired transmission, Ethernet (registered trademark), USB, RS-232C, HDMI (registered trademark), or a coaxial cable is used, for example. For the wireless transmission, wireless LAN, Wi-Fi (registered trademark), Bluetooth (registered trademark), or a millimeter wave is used, for example.

As a broadcasting scheme, DVB-T2, DVB-S2, DVB-C2, ATSC3.0, or ISDB-S3 is used, for example.

Figure 5:
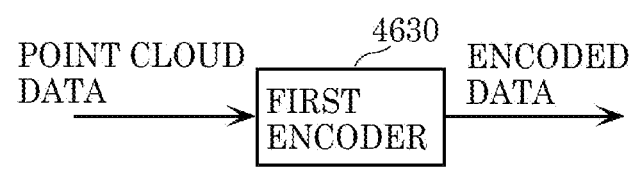
FIG. 5 is a diagram illustrating a structure of a first encoder according to Embodiment 1.
Figure 6:
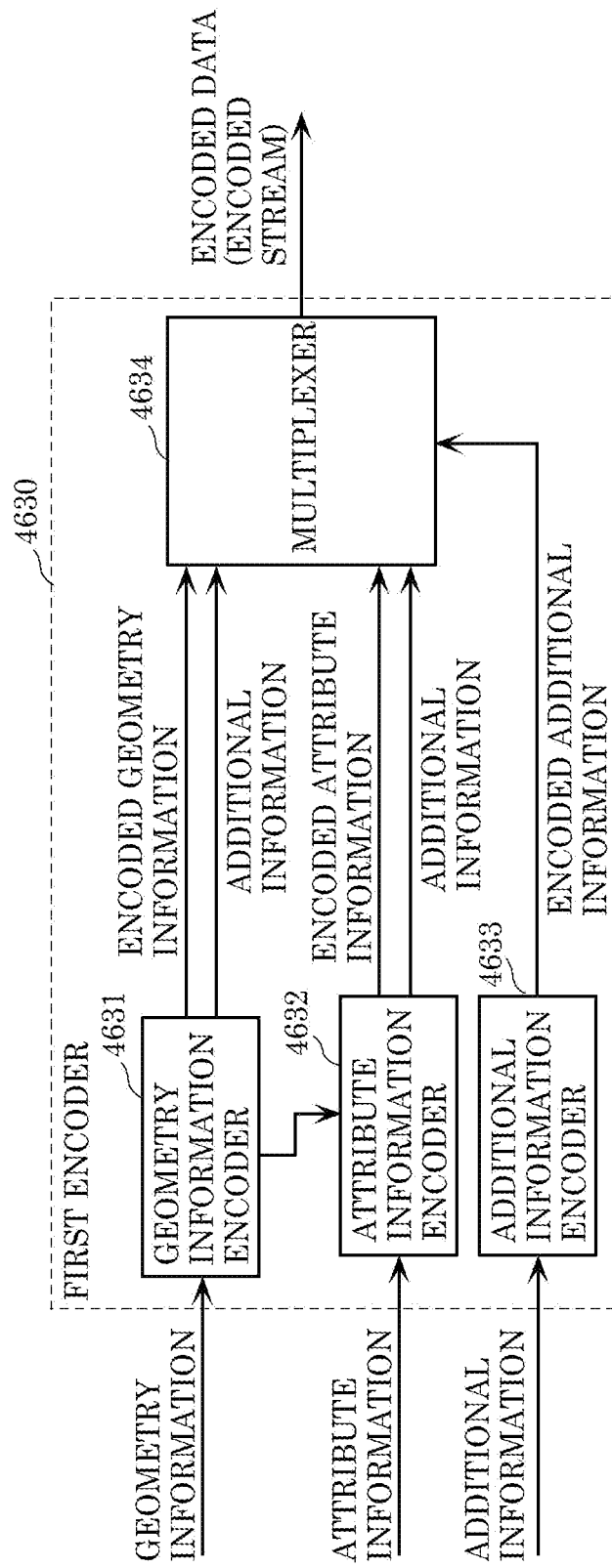
FIG. 6 is a block diagram illustrating the first encoder according to Embodiment 1.

FIG. 5 is a diagram showing a configuration of first encoder 4630, which is an example of encoder 4613 that performs encoding in the first encoding method. FIG. 6 is a block diagram showing first encoder 4630. First encoder 4630 generates encoded data (encoded stream) by encoding point cloud data in the first encoding method. First encoder 4630 includes geometry information encoder 4631, attribute information encoder 4632, additional information encoder 4633, and multiplexer 4634.

First encoder 4630 is characterized by performing encoding by keeping a three-dimensional structure in mind. First encoder 4630 is further characterized in that attribute information encoder 4632 performs encoding using information obtained from geometry information encoder 4631. The first encoding method is referred to also as geometry-based PCC (GPCC).

Point cloud data is PCC point cloud data like a PLY file or PCC point cloud data generated from sensor information, and includes geometry information (position), attribute information (attribute), and other additional information (metadata). The geometry information is input to geometry information encoder 4631, the attribute information is input to attribute information encoder 4632, and the additional information is input to additional information encoder 4633.

Geometry information encoder 4631 generates encoded geometry information (compressed geometry), which is encoded data, by encoding geometry information. For example, geometry information encoder 4631 encodes geometry information using an N-ary tree structure, such as an octree. Specifically, in the case of an octree, a current space (target space) is divided into eight nodes (subspaces), 8-bit information (occupancy code) that indicates whether each node includes a point cloud or not is generated. A node including a point cloud is further divided into eight nodes, and 8-bit information that indicates whether each of the eight nodes includes a point cloud or not is generated. This process is repeated until a predetermined level is reached or the number of the point clouds included in each node becomes equal to or less than a threshold.

Attribute information encoder 4632 generates encoded attribute information (compressed attribute), which is encoded data, by encoding attribute information using configuration information generated by geometry information encoder 4631. For example, attribute information encoder 4632 determines a reference point (reference node) that is to be referred to in encoding a current point (in other words, a current node or a target node) to be processed based on the octree structure generated by geometry information encoder 4631. For example, attribute information encoder 4632 refers to a node whose parent node in the octree is the same as the parent node of the current node, of peripheral nodes or neighboring nodes. Note that the method of determining a reference relationship is not limited to this method.

The process of encoding attribute information may include at least one of a quantization process, a prediction process, and an arithmetic encoding process. In this case, "refer to" means using a reference node for calculating a predicted value of attribute information or using a state of a reference node (occupancy information that indicates whether a reference node includes a point cloud or not, for example) for determining a parameter of encoding. For example, the parameter of encoding is a quantization parameter in the quantization process or a context or the like in the arithmetic encoding.

Additional information encoder 4633 generates encoded additional information (compressed metadata), which is encoded data, by encoding compressible data of additional information.

Multiplexer 4634 generates encoded stream (compressed stream), which is encoded data, by multiplexing encoded geometry information, encoded attribute information, encoded additional information, and other additional information. The generated encoded stream is output to a processor in a system layer (not shown).

Figure 7:
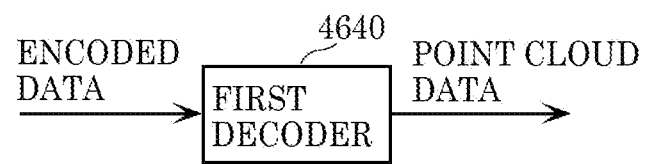
FIG. 7 is a diagram illustrating a structure of a first decoder according to Embodiment 1.
Figure 8:
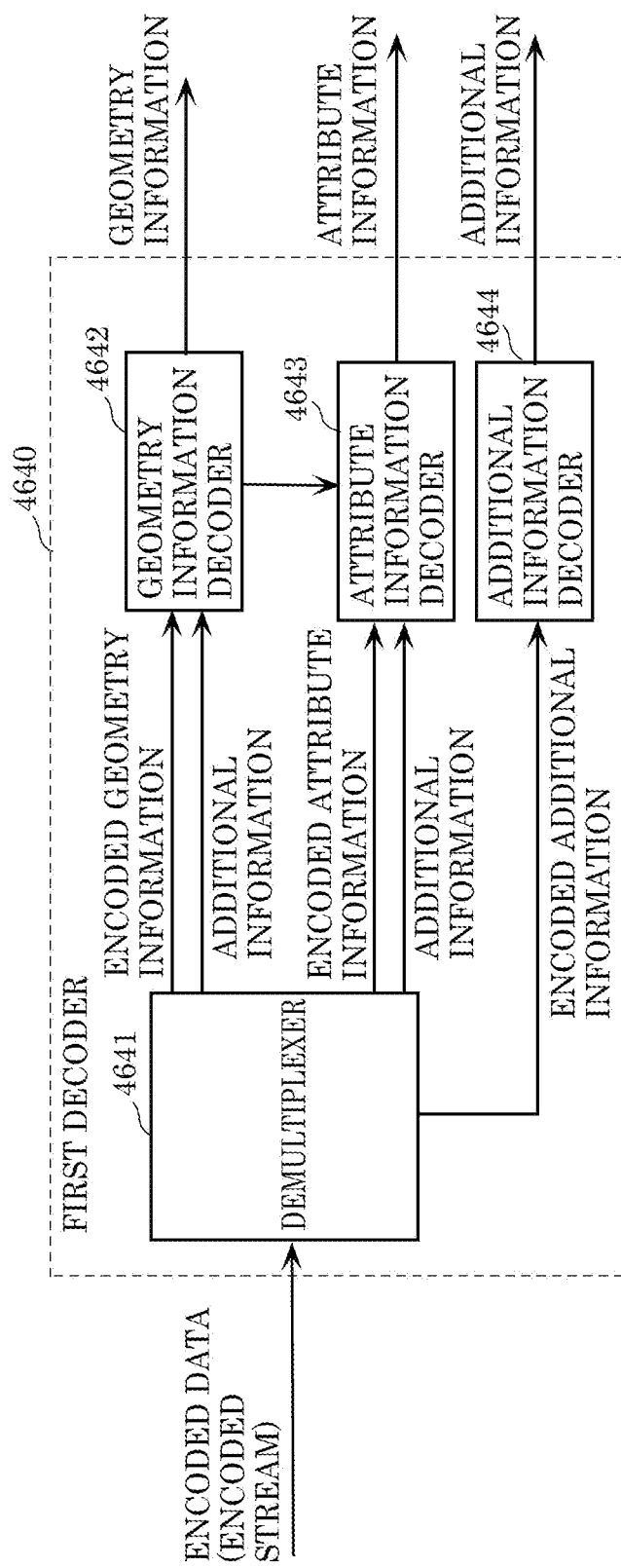
FIG. 8 is a block diagram illustrating the first decoder according to Embodiment 1.

Next, first decoder 4640, which is an example of decoder 4624 that performs decoding in the first encoding method, will be described. FIG. 7 is a diagram showing a configuration of first decoder 4640. FIG. 8 is a block diagram showing first decoder 4640. First decoder 4640 generates point cloud data by decoding encoded data (encoded stream) encoded in the first encoding method in the first encoding method. First decoder 4640 includes demultiplexer 4641, geometry information decoder 4642, attribute information decoder 4643, and additional information decoder 4644.

An encoded stream (compressed stream), which is encoded data, is input to first decoder 4640 from a processor in a system layer (not shown).

Demultiplexer 4641 separates encoded geometry information (compressed geometry), encoded attribute information (compressed attribute), encoded additional information (compressed metadata), and other additional information from the encoded data.

Geometry information decoder 4642 generates geometry information by decoding the encoded geometry information. For example, geometry information decoder 4642 restores the geometry information on a point cloud represented by three-dimensional coordinates from encoded geometry information represented by an N-ary structure, such as an octree.

Attribute information decoder 4643 decodes the encoded attribute information based on configuration information generated by geometry information decoder 4642. For example, attribute information decoder 4643 determines a reference point (reference node) that is to be referred to in decoding a current point (current node) to be processed based on the octree structure generated by geometry information decoder 4642. For example, attribute information decoder 4643 refers to a node whose parent node in the octree is the same as the parent node of the current node, of peripheral nodes or neighboring nodes. Note that the method of determining a reference relationship is not limited to this method.

The process of decoding attribute information may include at least one of an inverse quantization process, a prediction process, and an arithmetic decoding process. In this case, "refer to" means using a reference node for calculating a predicted value of attribute information or using a state of a reference node (occupancy information that indicates whether a reference node includes a point cloud or not, for example) for determining a parameter of decoding. For example, the parameter of decoding is a quantization parameter in the inverse quantization process or a context or the like in the arithmetic decoding.

Additional information decoder 4644 generates additional information by decoding the encoded additional information. First decoder 4640 uses additional information required for the decoding process for the geometry information and the attribute information in the decoding, and outputs additional information required for an application to the outside.

Figure 9:
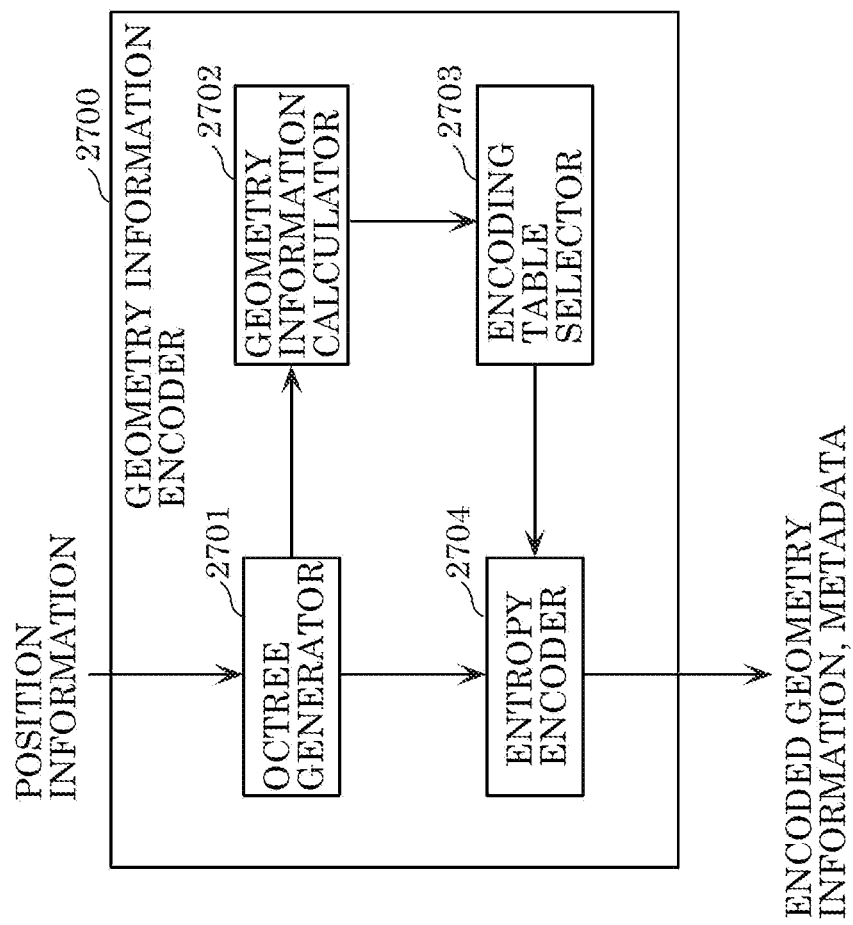
FIG. 9 is a block diagram of a three-dimensional data encoding device according to Embodiment 1.

Next, an example configuration of a geometry information encoder will be described. FIG. 9 is a block diagram of geometry information encoder 2700 according to this embodiment. Geometry information encoder 2700 includes octree generator 2701, geometry information calculator 2702, encoding table selector 2703, and entropy encoder 2704.

Octree generator 2701 generates an octree, for example, from input position information, and generates an occupancy code of each node of the octree. Geometry information calculator 2702 obtains information that indicates whether a neighboring node of a current node (target node) is an occupied node or not. For example, geometry information calculator 2702 calculates occupancy information on a neighboring node from an occupancy code of a parent node to which a current node belongs (information that indicates whether a neighboring node is an occupied node or not). Geometry information calculator 2702 may save an encoded node in a list and search the list for a neighboring node. Note that geometry information calculator 2702 may change neighboring nodes in accordance with the position of the current node in the parent node.

Encoding table selector 2703 selects an encoding table used for entropy encoding of the current node based on the occupancy information on the neighboring node calculated by geometry information calculator 2702. For example, encoding table selector 2703 may generate a bit sequence based on the occupancy information on the neighboring node and select an encoding table of an index number generated from the bit sequence.

Entropy encoder 2704 generates encoded geometry information and metadata by entropy-encoding the occupancy code of the current node using the encoding table of the selected index number. Entropy encoder may add, to the encoded geometry information, information that indicates the selected encoding table.

Figure 10:
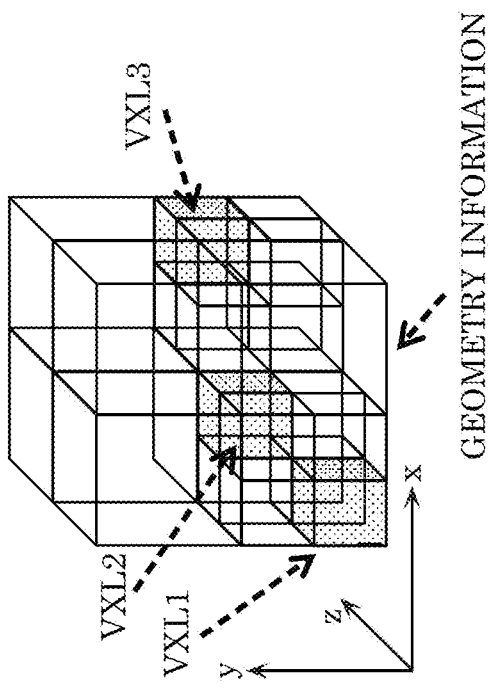
FIG. 10 is a diagram showing an example of geometry information according to Embodiment 1.
Figure 11:
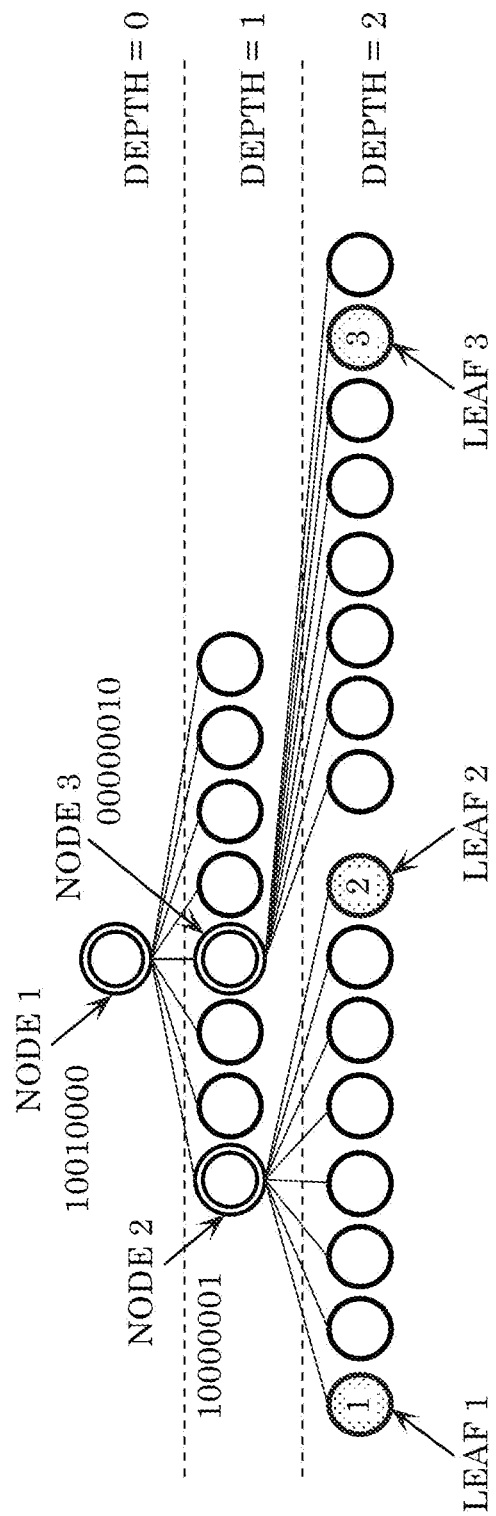
FIG. 11 is a diagram showing an example of an octree representation of geometry information according to Embodiment 1.

In the following, an octree representation and a scan order for geometry information will be described. Geometry information (geometry data) is transformed into an octree structure (octree transform) and then encoded. The octree structure includes nodes and leaves. Each node has eight nodes or leaves, and each leaf has voxel (VXL) information. FIG. 10 is a diagram showing an example structure of geometry information including a plurality of voxels. FIG. 11 is a diagram showing an example in which the geometry information shown in FIG. 10 is transformed into an octree structure. Here, of leaves shown in FIG. 11, leaves 1, 2, and 3 represent voxels VXL1, VXL2, and VXL3 shown in FIG. 10, respectively, and each represent VXL containing a point cloud (referred to as a valid VXL, hereinafter).

Specifically, node 1 corresponds to the entire space comprising the geometry information in FIG. 10. The entire space corresponding to node 1 is divided into eight nodes, and among the eight nodes, a node containing valid VXL is further divided into eight nodes or leaves. This process is repeated for every layer of the tree structure. Here, each node corresponds to a subspace, and has information (occupancy code) that indicates where the next node or leaf is located after division as node information. A block in the bottom layer is designated as a leaf and retains the number of the points contained in the leaf as leaf information.

Figure 12:
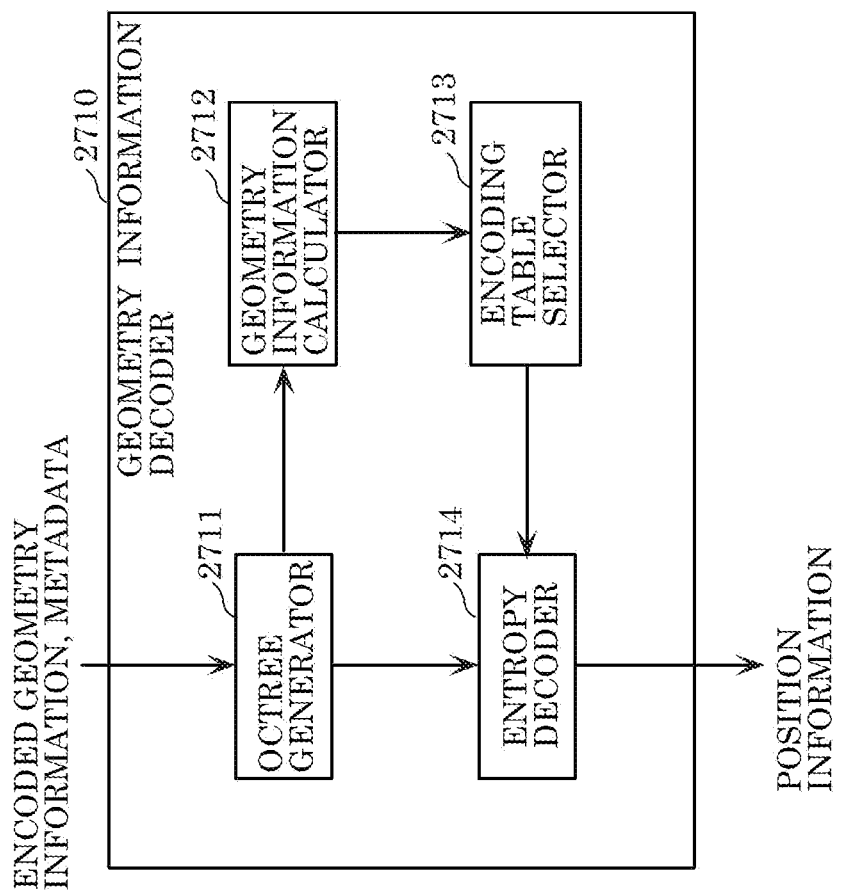
FIG. 12 is a block diagram of a three-dimensional data decoding device according to Embodiment 1.

Next, an example configuration of a geometry information decoder will be described. FIG. 12 is a block diagram of geometry information decoder 2710 according to this embodiment. Geometry information decoder 2710 includes octree generator 2711, geometry information calculator 2712, encoding table selector 2713, and entropy decoder 2714.

Octree generator 2711 generates an octree of a space (node) based on header information, metadata or the like of a bitstream. For example, octree generator 2711 generates an octree by generating a large space (root node) based on the sizes of a space in an x-axis direction, a y-axis direction, and a z-axis direction added to the header information and dividing the space into two parts in the x-axis direction, the y-axis direction, and the z-axis direction to generate eight small spaces A (nodes A0 to A7). Nodes A0 to A7 are sequentially designated as a current node.

Geometry information calculator 2712 obtains occupancy information that indicates whether a neighboring node of a current node is an occupied node or not. For example, geometry information calculator 2712 calculates occupancy information on a neighboring node from an occupancy code of a parent node to which a current node belongs. Geometry information calculator 2712 may save a decoded node in a list and search the list for a neighboring node. Note that geometry information calculator 2712 may change neighboring nodes in accordance with the position of the current node in the parent node.

Encoding table selector 2713 selects an encoding table (decoding table) used for entropy decoding of the current node based on the occupancy information on the neighboring node calculated by geometry information calculator 2712. For example, encoding table selector 2713 may generate a bit sequence based on the occupancy information on the neighboring node and select an encoding table of an index number generated from the bit sequence.

Entropy decoder 2714 generates position information by entropy-decoding the occupancy code of the current node using the selected encoding table. Note that entropy decoder 2714 may obtain information on the selected encoding table by decoding the bitstream, and entropy-decode the occupancy code of the current node using the encoding table indicated by the information.

Figure 13:
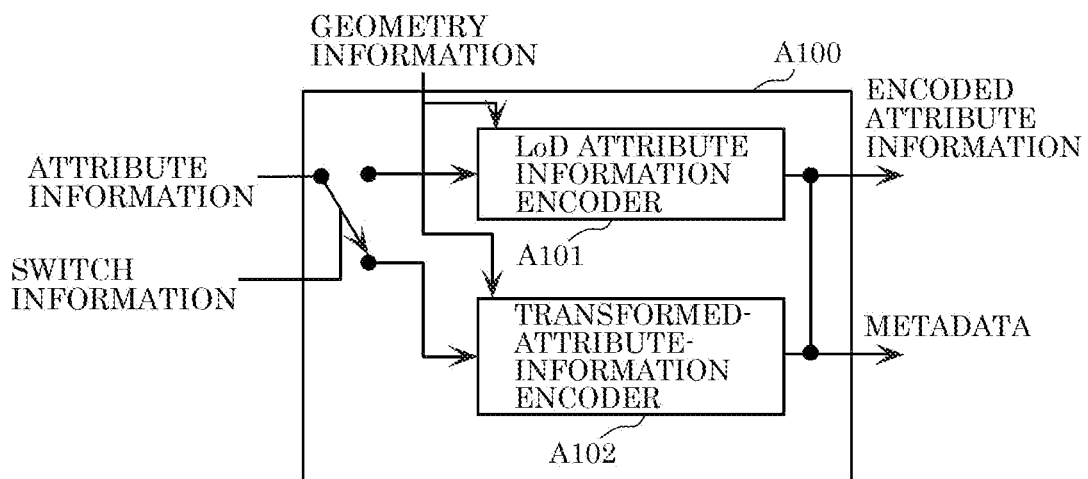
FIG. 13 is a block diagram of an attribute information encoder according to Embodiment 1.

In the following, configurations of an attribute information encoder and an attribute information decoder will be described. FIG. 13 is a block diagram showing an example configuration of attribute information encoder A100. The attribute information encoder may include a plurality of encoders that perform different encoding methods. For example, the attribute information encoder may selectively use any of the two methods described below in accordance with the use case.

Attribute information encoder A100 includes LoD attribute information encoder A101 and transformed-attribute-information encoder A102. LoD attribute information encoder A101 classifies three-dimensional points into a plurality of layers based on geometry information on the three-dimensional points, predicts attribute information on three-dimensional points belonging to each layer, and encodes a prediction residual therefor. Here, each layer into which a three-dimensional point is classified is referred to as a level of detail (LoD).

Transformed-attribute-information encoder A102 encodes attribute information using region adaptive hierarchical transform (RAHT). Specifically, transformed-attribute-information encoder A102 generates a high frequency component and a low frequency component for each layer by applying RAHT or Haar transform to each item of attribute information based on the geometry information on three-dimensional points, and encodes the values by quantization, entropy encoding or the like.

Figure 14:
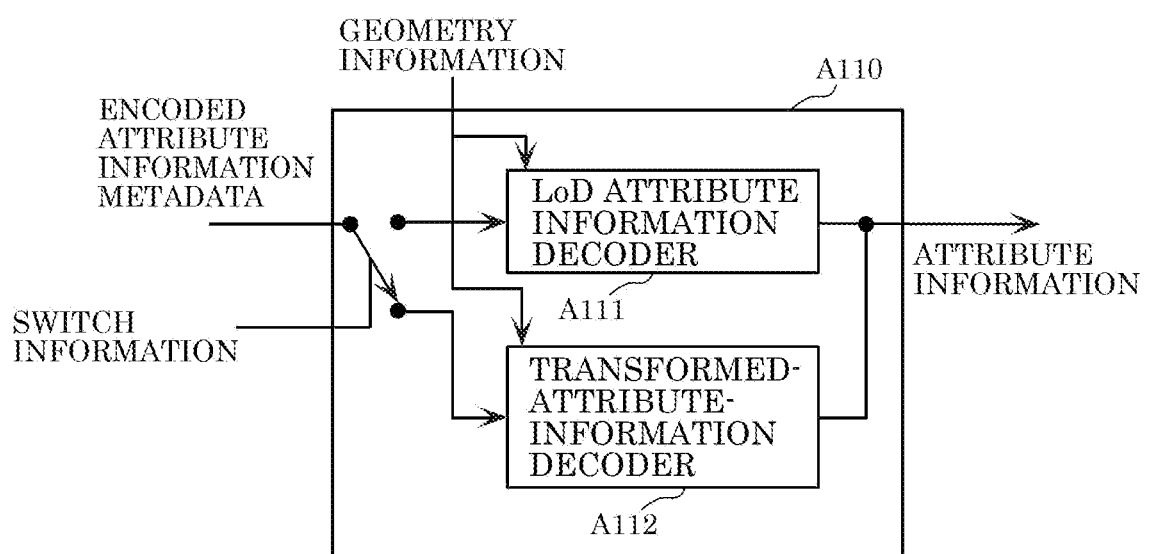
FIG. 14 is a block diagram of an attribute information decoder according to Embodiment 1.

FIG. 14 is a block diagram showing an example configuration of attribute information decoder A110. The attribute information decoder may include a plurality of decoders that perform different decoding methods. For example, the attribute information decoder may selectively use any of the two methods described below for decoding based on the information included in the header or metadata.

Attribute information decoder A110 includes LoD attribute information decoder A111 and transformed-attribute-information decoder A112. LoD attribute information decoder A111 classifies three-dimensional points into a plurality of layers based on the geometry information on the three-dimensional points, predicts attribute information on three-dimensional points belonging to each layer, and decodes attribute values thereof.

Transformed-attribute-information decoder A112 decodes attribute information using region adaptive hierarchical transform (RAHT). Specifically, transformed-attribute-information decoder A112 decodes each attribute value by applying inverse RAHT or inverse Haar transform to the high frequency component and the low frequency component of the attribute value based on the geometry information on the three-dimensional point.

Figure 15:
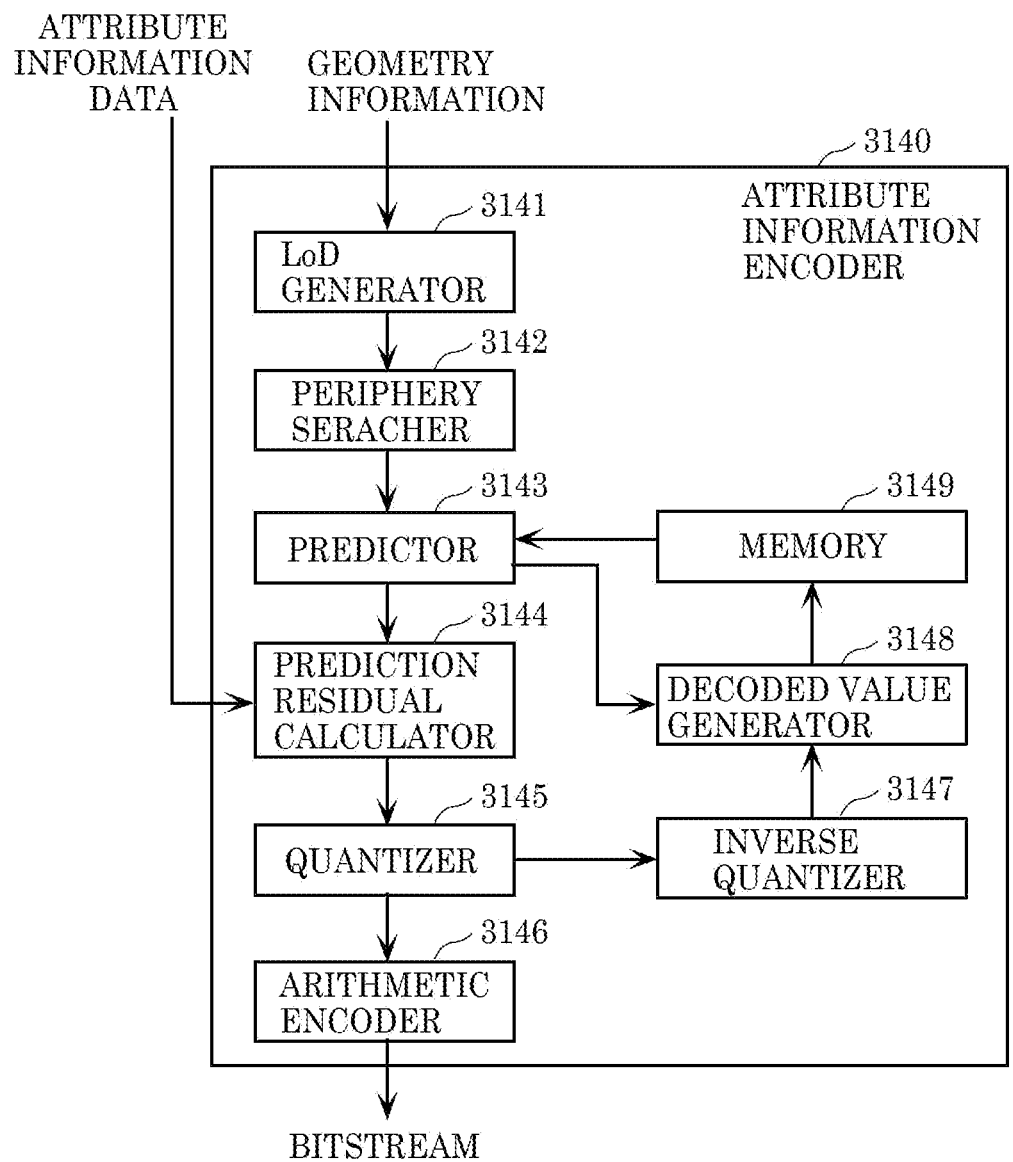
FIG. 15 is a block diagram showing a configuration of the attribute information encoder according to the variation of Embodiment 1.

FIG. 15 is a block diagram showing a configuration of attribute information encoder 3140 that is an example of LoD attribute information encoder A101.

Attribute information encoder 3140 includes LoD generator 3141, periphery searcher 3142, predictor 3143, prediction residual calculator 3144, quantizer 3145, arithmetic encoder 3146, inverse quantizer 3147, decoded value generator 3148, and memory 3149.

LoD generator 3141 generates an LoD using geometry information on a three-dimensional point.

Periphery searcher 3142 searches for a neighboring three-dimensional point neighboring each three-dimensional point using a result of LoD generation by LoD generator 3141 and distance information indicating distances between three-dimensional points.

Predictor 3143 generates a predicted value of an item of attribute information on a current (target) three-dimensional point to be encoded.

Prediction residual calculator 3144 calculates (generates) a prediction residual of the predicted value of the item of the attribute information generated by predictor 3143.

Quantizer 3145 quantizes the prediction residual of the item of attribute information calculated by prediction residual calculator 3144.

Arithmetic encoder 3146 arithmetically encodes the prediction residual quantized by quantizer 3145. Arithmetic encoder 3146 outputs a bitstream including the arithmetically encoded prediction residual to the three-dimensional data decoding device, for example.

The prediction residual may be binarized by quantizer 3145 before being arithmetically encoded by arithmetic encoder 3146.

Arithmetic encoder 3146 may initialize the encoding table used for the arithmetic encoding before performing the arithmetic encoding. Arithmetic encoder 3146 may initialize the encoding table used for the arithmetic encoding for each layer. Arithmetic encoder 3146 may output a bitstream including information that indicates the position of the layer at which the encoding table is initialized.

Inverse quantizer 3147 inverse-quantizes the prediction residual quantized by quantizer 3145.

Decoded value generator 3148 generates a decoded value by adding the predicted value of the item of attribute information generated by predictor 3143 and the prediction residual inverse-quantized by inverse quantizer 3147 together.

Memory 3149 is a memory that stores a decoded value of an item of attribute information on each three-dimensional point decoded by decoded value generator 3148. For example, when generating a predicted value of a three-dimensional point yet to be encoded, predictor 3143 may generate the predicted value using a decoded value of an item of attribute information on each three-dimensional point stored in memory 3149.

Figure 16:
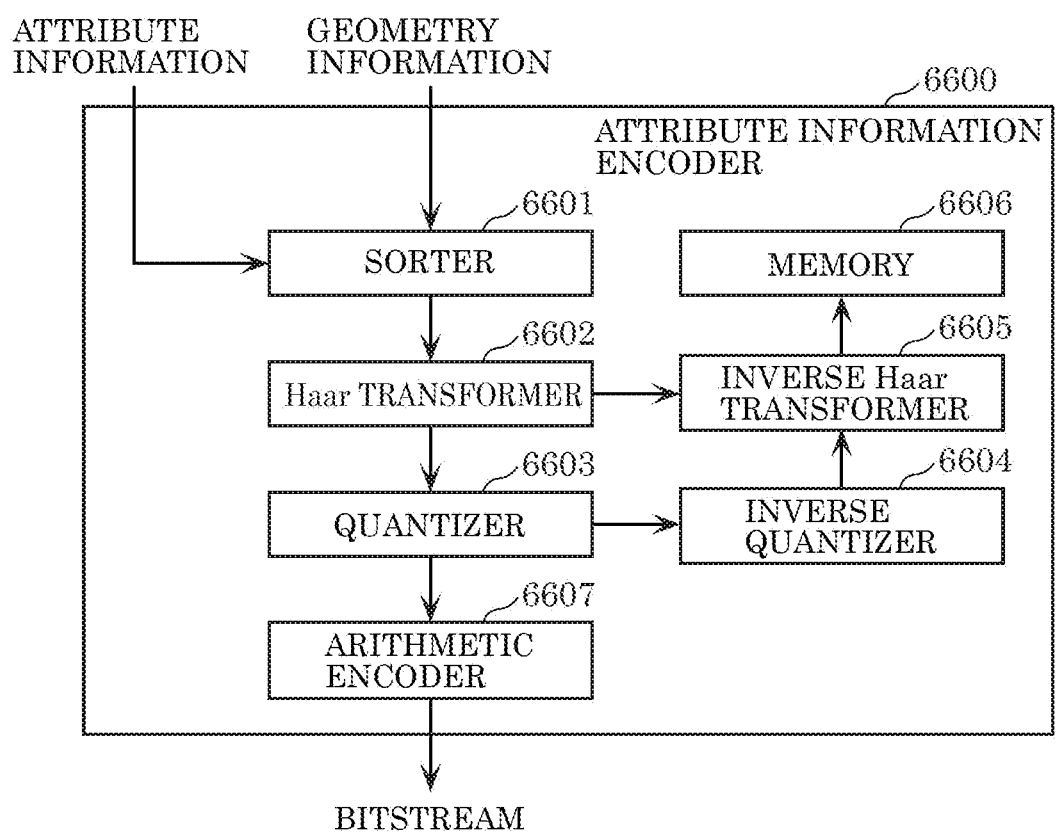
FIG. 16 is a block diagram of the attribute information encoder according to Embodiment 1.

FIG. 16 is a block diagram of attribute information encoder 6600 that is an example of transformation attribute information encoder A102. Attribute information encoder 6600 includes sorter 6601, Haar transformer 6602, quantizer 6603, inverse quantizer 6604, inverse Haar transformer 6605, memory 6606, and arithmetic encoder 6607.

Sorter 6601 generates the Morton codes by using the geometry information of three-dimensional points, and sorts the plurality of three-dimensional points in the order of the Morton codes. Haar transformer 6602 generates the coding coefficient by applying the Haar transform to the attribute information. Quantizer 6603 quantizes the coding coefficient of the attribute information.

Inverse quantizer 6604 inverse quantizes the coding coefficient after the quantization. Inverse Haar transformer 6605 applies the inverse Haar transform to the coding coefficient. Memory 6606 stores the values of items of attribute information of a plurality of decoded three-dimensional points. For example, the attribute information of the decoded three-dimensional points stored in memory 6606 may be utilized for prediction and the like of an unencoded three-dimensional point.

Arithmetic encoder 6607 calculates ZeroCnt from the coding coefficient after the quantization, and arithmetically encodes ZeroCnt. Additionally, arithmetic encoder 6607 arithmetically encodes the non-zero coding coefficient after the quantization. Arithmetic encoder 6607 may binarize the coding coefficient before the arithmetic encoding. In addition, arithmetic encoder 6607 may generate and encode various kinds of header information.

Figure 17:
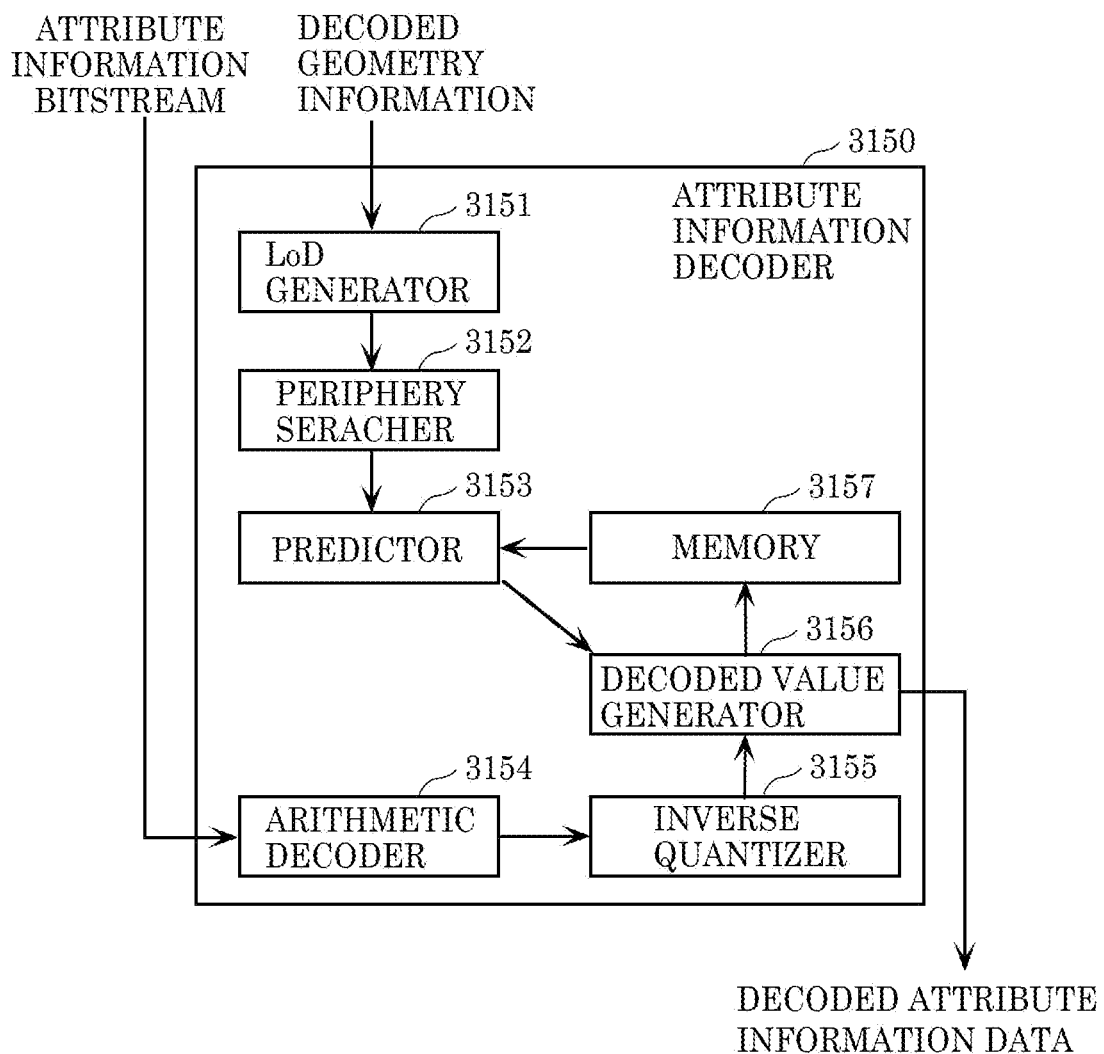
FIG. 17 is a block diagram showing a configuration of the attribute information decoder according to the variation of Embodiment 1.

FIG. 17 is a block diagram showing a configuration of attribute information decoder 3150 that is an example of LoD attribute information decoder A111.

Attribute information decoder 3150 includes LoD generator 3151, periphery searcher 3152, predictor 3153, arithmetic decoder 3154, inverse quantizer 3155, decoded value generator 3156, and memory 3157.

LoD generator 3151 generates an LoD using geometry information on a three-dimensional point decoded by the geometry information decoder (not shown in FIG. 17).

Periphery searcher 3152 searches for a neighboring three-dimensional point neighboring each three-dimensional point using a result of LoD generation by LoD generator 3151 and distance information indicating distances between three-dimensional points.

Predictor 3153 generates a predicted value of attribute information item on a current three-dimensional point to be decoded.

Arithmetic decoder 3154 arithmetically decodes the prediction residual in the bitstream obtained from attribute information encoder 3140 shown in FIG. 15. Note that arithmetic decoder 3154 may initialize the decoding table used for the arithmetic decoding. Arithmetic decoder 3154 initializes the decoding table used for the arithmetic decoding for the layer for which the encoding process has been performed by arithmetic encoder 3146 shown in FIG. 15. Arithmetic decoder 3154 may initialize the decoding table used for the arithmetic decoding for each layer. Arithmetic decoder 3154 may initialize the decoding table based on the information included in the bitstream that indicates the position of the layer for which the encoding table has been initialized.

Inverse quantizer 3155 inverse-quantizes the prediction residual arithmetically decoded by arithmetic decoder 3154.

Decoded value generator 3156 generates a decoded value by adding the predicted value generated by predictor 3153 and the prediction residual inverse-quantized by inverse quantizer 3155 together. Decoded value generator 3156 outputs the decoded attribute information data to another device.

Memory 3157 is a memory that stores a decoded value of an item of attribute information on each three-dimensional point decoded by decoded value generator 3156. For example, when generating a predicted value of a three-dimensional point yet to be decoded, predictor 3153 generates the predicted value using a decoded value of an item of attribute information on each three-dimensional point stored in memory 3157.

Figure 18:
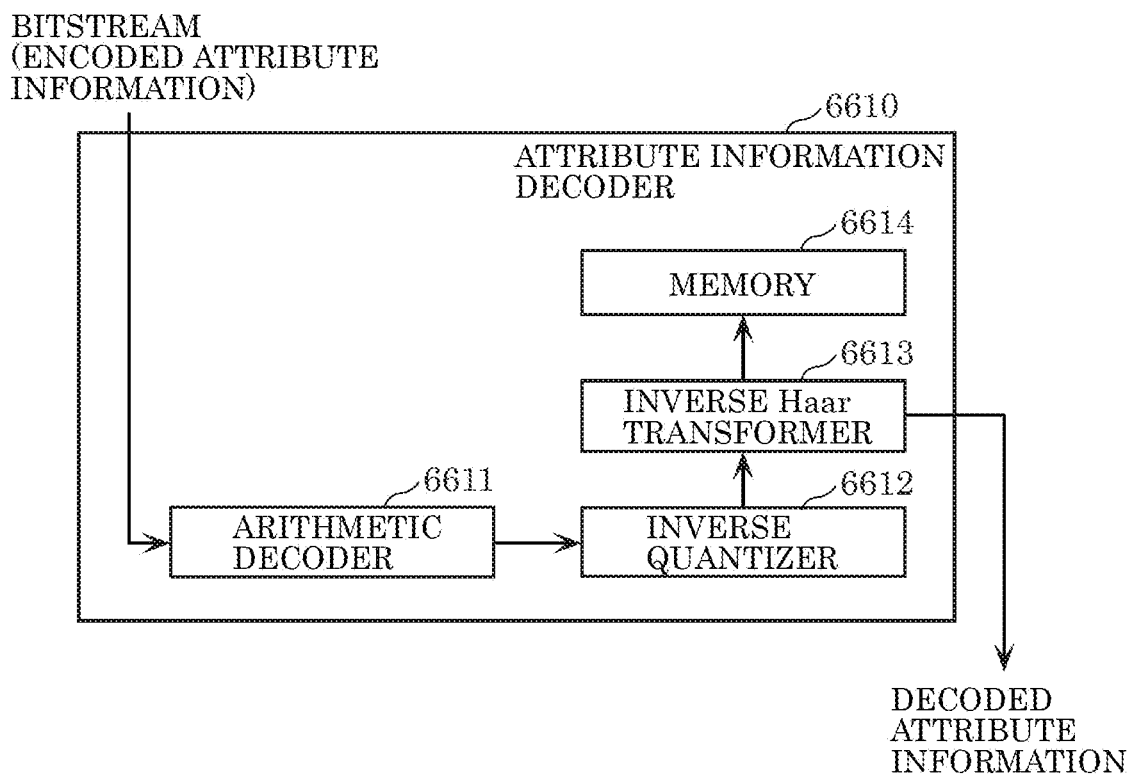
FIG. 18 is a block diagram of the attribute information decoder according to Embodiment 1.

FIG. 18 is a block diagram of attribute information decoder 6610 that is an example of transformation attribute information decoder A112. Attribute information decoder 6610 includes arithmetic decoder 6611, inverse quantizer 6612, inverse Haar transformer 6613, and memory 6614.

Arithmetic decoder 6611 arithmetically decodes ZeroCnt and the coding coefficient included in a bitstream. Note that arithmetic decoder 6611 may decode various kinds of header information.

Inverse quantizer 6612 inverse quantizes the arithmetically decoded coding coefficient. Inverse Haar transformer 6613 applies the inverse Haar transform to the coding coefficient after the inverse quantization. Memory 6614 stores the values of items of attribute information of a plurality of decoded three-dimensional points. For example, the attribute information of the decoded three-dimensional points stored in memory 6614 may be utilized for prediction of an undecoded three-dimensional point.

Figure 19:
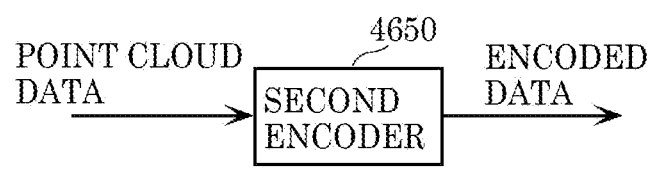
FIG. 19 is a diagram illustrating a structure of a second encoder according to Embodiment 1.
Figure 20:
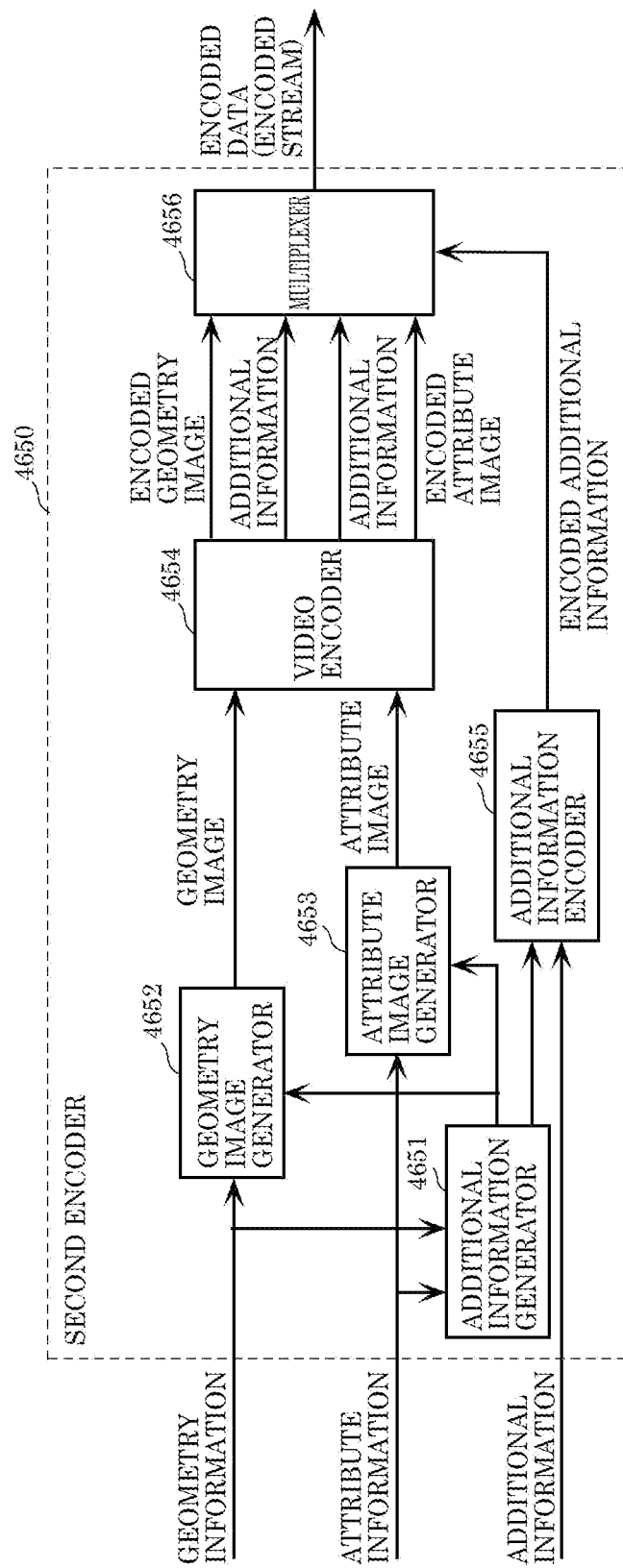
FIG. 20 is a block diagram illustrating the second encoder according to Embodiment 1.

Next, second encoder 4650, which is an example of encoder 4613 that performs encoding in the second encoding method, will be described. FIG. 19 is a diagram showing a configuration of second encoder 4650. FIG. 20 is a block diagram showing second encoder 4650.

Second encoder 4650 generates encoded data (encoded stream) by encoding point cloud data in the second encoding method. Second encoder 4650 includes additional information generator 4651, geometry image generator 4652, attribute image generator 4653, video encoder 4654, additional information encoder 4655, and multiplexer 4656.

Second encoder 4650 is characterized by generating a geometry image and an attribute image by projecting a three-dimensional structure onto a two-dimensional image, and encoding the generated geometry image and attribute image in an existing video encoding scheme. The second encoding method is referred to as video-based PCC (VPCC).

Point cloud data is PCC point cloud data like a PLY file or PCC point cloud data generated from sensor information, and includes geometry information (position), attribute information (attribute), and other additional information (metadata).

Additional information generator 4651 generates map information on a plurality of two-dimensional images by projecting a three-dimensional structure onto a two-dimensional image.

Geometry image generator 4652 generates a geometry image based on the geometry information and the map information generated by additional information generator 4651. The geometry image is a distance image in which distance (depth) is indicated as a pixel value, for example. The distance image may be an image of a plurality of point clouds viewed from one point of view (an image of a plurality of point clouds projected onto one two-dimensional plane), a plurality of images of a plurality of point clouds viewed from a plurality of points of view, or a single image integrating the plurality of images.

Attribute image generator 4653 generates an attribute image based on the attribute information and the map information generated by additional information generator 4651. The attribute image is an image in which attribute information (color (RGB), for example) is indicated as a pixel value, for example. The image may be an image of a plurality of point clouds viewed from one point of view (an image of a plurality of point clouds projected onto one two-dimensional plane), a plurality of images of a plurality of point clouds viewed from a plurality of points of view, or a single image integrating the plurality of images.

Video encoder 4654 generates an encoded geometry image (compressed geometry image) and an encoded attribute image (compressed attribute image), which are encoded data, by encoding the geometry image and the attribute image in a video encoding scheme. Note that, as the video encoding scheme, any well-known encoding method can be used. For example, the video encoding scheme is AVC or HEVC.

Additional information encoder 4655 generates encoded additional information (compressed metadata) by encoding the additional information, the map information and the like included in the point cloud data.

Multiplexer 4656 generates an encoded stream (compressed stream), which is encoded data, by multiplexing the encoded geometry image, the encoded attribute image, the encoded additional information, and other additional information. The generated encoded stream is output to a processor in a system layer (not shown).

Figure 21:
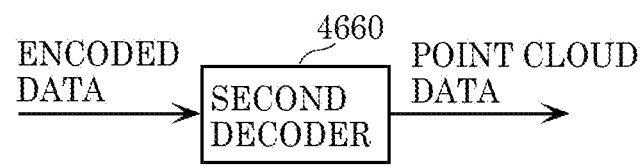
FIG. 21 is a diagram illustrating a structure of a second decoder according to Embodiment 1.
Figure 22:
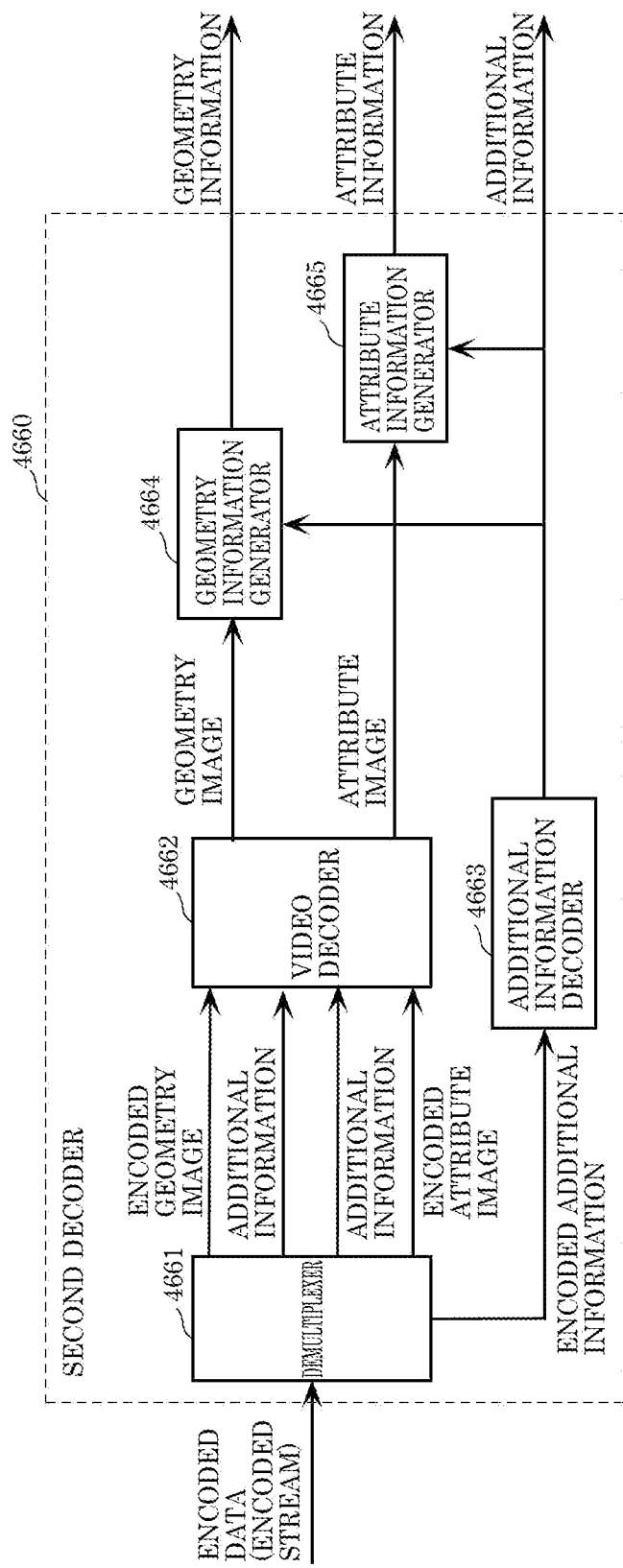
FIG. 22 is a block diagram illustrating the second decoder according to Embodiment 1.

Next, second decoder 4660, which is an example of decoder 4624 that performs decoding in the second encoding method, will be described. FIG. 21 is a diagram showing a configuration of second decoder 4660. FIG. 22 is a block diagram showing second decoder 4660. Second decoder 4660 generates point cloud data by decoding encoded data (encoded stream) encoded in the second encoding method in the second encoding method. Second decoder 4660 includes demultiplexer 4661, video decoder 4662, additional information decoder 4663, geometry information generator 4664, and attribute information generator 4665.

An encoded stream (compressed stream), which is encoded data, is input to second decoder 4660 from a processor in a system layer (not shown).

Demultiplexer 4661 separates an encoded geometry image (compressed geometry image), an encoded attribute image (compressed attribute image), an encoded additional information (compressed metadata), and other additional information from the encoded data.

Video decoder 4662 generates a geometry image and an attribute image by decoding the encoded geometry image and the encoded attribute image in a video encoding scheme. Note that, as the video encoding scheme, any well-known encoding method can be used. For example, the video encoding scheme is AVC or HEVC.

Additional information decoder 4663 generates additional information including map information or the like by decoding the encoded additional information.

Geometry information generator 4664 generates geometry information from the geometry image and the map information. Attribute information generator 4665 generates attribute information from the attribute image and the map information.

Second decoder 4660 uses additional information required for decoding in the decoding, and outputs additional information required for an application to the outside.

Figure 23:
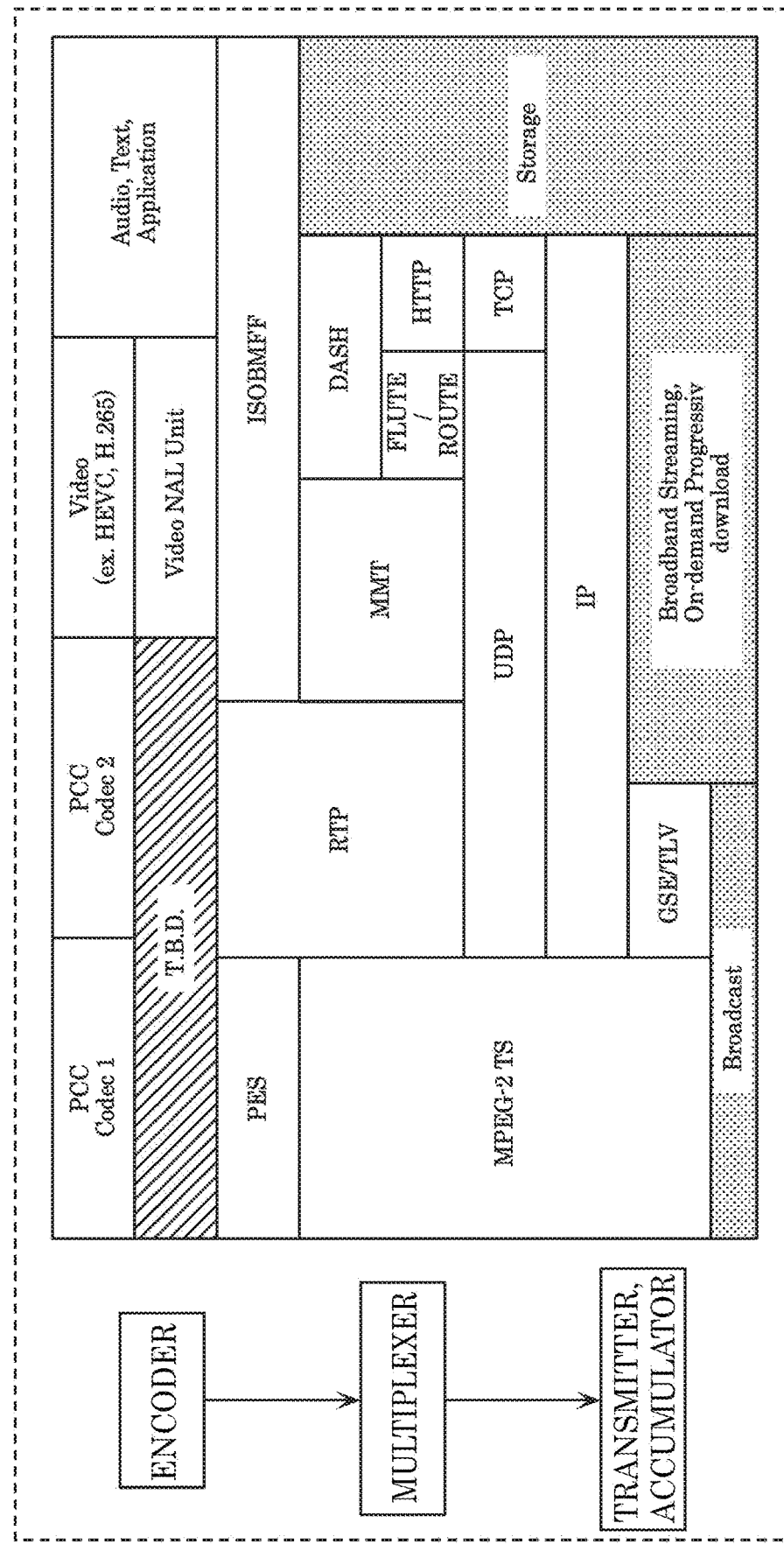
FIG. 23 is a diagram illustrating a protocol stack related to PCC encoded data according to Embodiment 1.

In the following, a problem with the PCC encoding scheme will be described. FIG. 23 is a diagram showing a protocol stack relating to PCC-encoded data. FIG. 23 shows an example in which PCC-encoded data is multiplexed with other medium data, such as a video (HEVC, for example) or an audio, and transmitted or accumulated.

A multiplexing scheme and a file format have a function of multiplexing various encoded data and transmitting or accumulating the data. To transmit or accumulate encoded data, the encoded data has to be converted into a format for the multiplexing scheme. For example, with HEVC, a technique for storing encoded data in a data structure referred to as a NAL unit and storing the NAL unit in ISOBMFF is prescribed.

At present, a first encoding method (Codec1) and a second encoding method (Codec2) are under investigation as encoding methods for point cloud data. However, there is no method defined for storing the configuration of encoded data and the encoded data in a system format. Thus, there is a problem that an encoder cannot perform an MUX process (multiplexing), transmission, or accumulation of data.

Note that, in the following, the term "encoding method" means any of the first encoding method and the second encoding method unless a particular encoding method is specified.

Embodiment 2

In this embodiment, types of the encoded data (geometry information (geometry), attribute information (attribute), and additional information (metadata)) generated by first encoder 4630 or second encoder 4650 described above, a method of generating additional information (metadata), and a multiplexing process in the multiplexer will be described. The additional information (metadata) may be referred to as a parameter set or control information (signaling information).

In this embodiment, the dynamic object (three-dimensional point cloud data that varies with time) described above with reference to FIG. 4 will be described, for example. However, the same method can also be used for the static object (three-dimensional point cloud data associated with an arbitrary time point).

Figure 24:
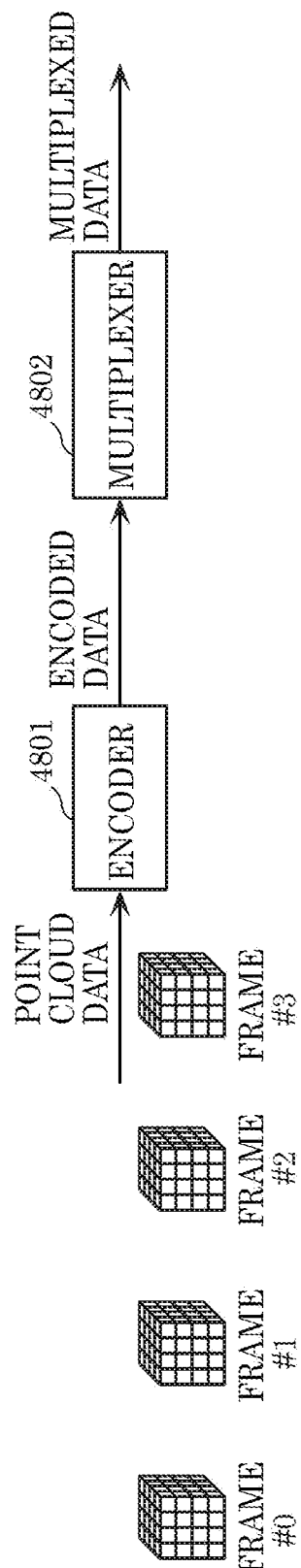
FIG. 24 is a diagram illustrating structures of an encoder and a multiplexer according to Embodiment 2.

FIG. 24 is a diagram showing configurations of encoder 4801 and multiplexer 4802 in a three-dimensional data encoding device according to this embodiment. Encoder 4801 corresponds to first encoder 4630 or second encoder 4650 described above, for example. Multiplexer 4802 corresponds to multiplexer 4634 or 4656 described above.

Encoder 4801 encodes a plurality of PCC (point cloud compression) frames of point cloud data to generate a plurality of pieces of encoded data (multiple compressed data) of geometry information, attribute information, and additional information.

Multiplexer 4802 integrates a plurality of types of data (geometry information, attribute information, and additional information) into a NAL unit, thereby converting the data into a data configuration that takes data access in the decoding device into consideration.

Figure 25:
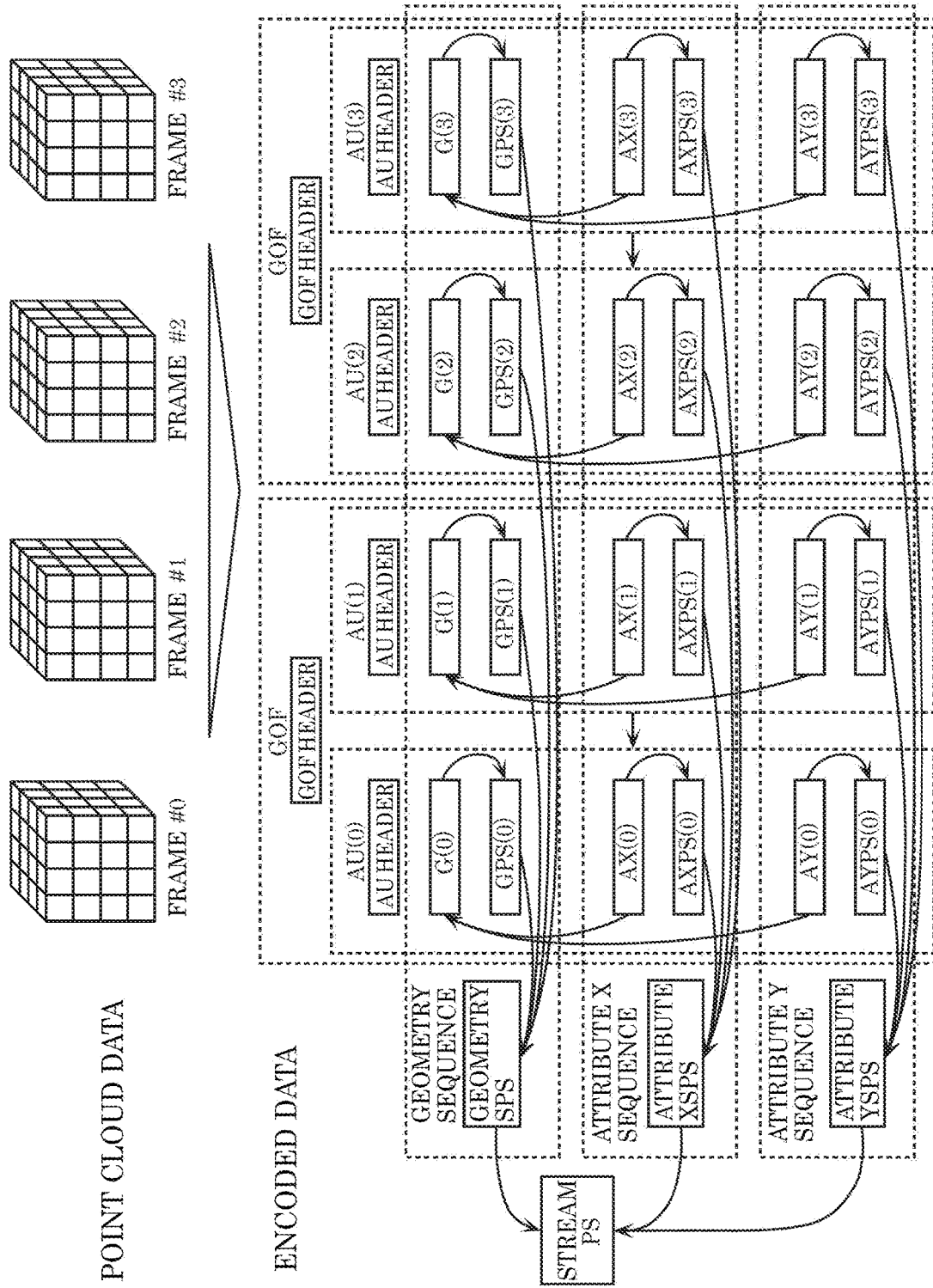
FIG. 25 is a diagram illustrating a structure example of encoded data according to Embodiment 2.

FIG. 25 is a diagram showing a configuration example of the encoded data generated by encoder 4801. Arrows in the drawing indicate a dependence involved in decoding of the encoded data. The source of an arrow depends on data of the destination of the arrow. That is, the decoding device decodes the data of the destination of an arrow, and decodes the data of the source of the arrow using the decoded data. In other words, "a first entity depends on a second entity" means that data of the second entity is referred to (used) in processing (encoding, decoding, or the like) of data of the first entity.

First, a process of generating encoded data of geometry information will be described. Encoder 4801 encodes geometry information of each frame to generate encoded geometry data (compressed geometry data) for each frame. The encoded geometry data is denoted by G(i). i denotes a frame number or a time point of a frame, for example.

Furthermore, encoder 4801 generates a geometry parameter set (GPS(i)) for each frame. The geometry parameter set includes a parameter that can be used for decoding of the encoded geometry data. The encoded geometry data for each frame depends on an associated geometry parameter set.

The encoded geometry data formed by a plurality of frames is defined as a geometry sequence. Encoder 4801 generates a geometry sequence parameter set (referred to also as geometry sequence PS or geometry SPS) that stores a parameter commonly used for a decoding process for the plurality of frames in the geometry sequence. The geometry sequence depends on the geometry SPS.

Next, a process of generating encoded data of attribute information will be described. Encoder 4801 encodes attribute information of each frame to generate encoded attribute data (compressed attribute data) for each frame. The encoded attribute data is denoted by A(i). FIG. 25 shows an example in which there are attribute X and attribute Y, and encoded attribute data for attribute X is denoted by AX(i), and encoded attribute data for attribute Y is denoted by AY(i).

Furthermore, encoder 4801 generates an attribute parameter set (APS(i)) for each frame. The attribute parameter set for attribute X is denoted by AXPS(i), and the attribute parameter set for attribute Y is denoted by AYPS(i). The attribute parameter set includes a parameter that can be used for decoding of the encoded attribute information. The encoded attribute data depends on an associated attribute parameter set.

The encoded attribute data formed by a plurality of frames is defined as an attribute sequence. Encoder 4801 generates an attribute sequence parameter set (referred to also as attribute sequence PS or attribute SPS) that stores a parameter commonly used for a decoding process for the plurality of frames in the attribute sequence. The attribute sequence depends on the attribute SPS.

In the first encoding method, the encoded attribute data depends on the encoded geometry data.

FIG. 25 shows an example in which there are two types of attribute information (attribute X and attribute Y). When there are two types of attribute information, for example, two encoders generate data and metadata for the two types of attribute information. For example, an attribute sequence is defined for each type of attribute information, and an attribute SPS is generated for each type of attribute information.

Note that, although FIG. 25 shows an example in which there is one type of geometry information, and there are two types of attribute information, the present disclosure is not limited thereto. There may be one type of attribute information or three or more types of attribute information. In such cases, encoded data can be generated in the same manner. If the point cloud data has no attribute information, there may be no attribute information. In such a case, encoder 4801 does not have to generate a parameter set associated with attribute information.

Next, a process of generating encoded data of additional information (metadata) will be described. Encoder 4801 generates a PCC stream PS (referred to also as PCC stream PS or stream PS), which is a parameter set for the entire PCC stream. Encoder 4801 stores a parameter that can be commonly used for a decoding process for one or more geometry sequences and one or more attribute sequences in the stream PS. For example, the stream PS includes identification information indicating the codec for the point cloud data and information indicating an algorithm used for the encoding, for example. The geometry sequence and the attribute sequence depend on the stream PS.

Next, an access unit and a GOF will be described. In this embodiment, concepts of access unit (AU) and group of frames (GOF) are newly introduced.

An access unit is a basic unit for accessing data in decoding, and is formed by one or more pieces of data and one or more pieces of metadata. For example, an access unit is formed by geometry information and one or more pieces of attribute information associated with a same time point. A GOF is a random access unit, and is formed by one or more access units.

Encoder 4801 generates an access unit header (AU header) as identification information indicating the top of an access unit. Encoder 4801 stores a parameter relating to the access unit in the access unit header. For example, the access unit header includes a configuration of or information on the encoded data included in the access unit. The access unit header further includes a parameter commonly used for the data included in the access unit, such as a parameter relating to decoding of the encoded data.

Note that encoder 4801 may generate an access unit delimiter that includes no parameter relating to the access unit, instead of the access unit header. The access unit delimiter is used as identification information indicating the top of the access unit. The decoding device identifies the top of the access unit by detecting the access unit header or the access unit delimiter.

Next, generation of identification information for the top of a GOF will be described. As identification information indicating the top of a GOF, encoder 4801 generates a GOF header. Encoder 4801 stores a parameter relating to the GOF in the GOF header. For example, the GOF header includes a configuration of or information on the encoded data included in the GOF. The GOF header further includes a parameter commonly used for the data included in the GOF, such as a parameter relating to decoding of the encoded data.

Note that encoder 4801 may generate a GOF delimiter that includes no parameter relating to the GOF, instead of the GOF header. The GOF delimiter is used as identification information indicating the top of the GOF. The decoding device identifies the top of the GOF by detecting the GOF header or the GOF delimiter.

In the PCC-encoded data, the access unit is defined as a PCC frame unit, for example. The decoding device accesses a PCC frame based on the identification information for the top of the access unit.

For example, the GOF is defined as one random access unit. The decoding device accesses a random access unit based on the identification information for the top of the GOF. For example, if PCC frames are independent from each other and can be separately decoded, a PCC frame can be defined as a random access unit.

Note that two or more PCC frames may be assigned to one access unit, and a plurality of random access units may be assigned to one GOF.

Encoder 4801 may define and generate a parameter set or metadata other than those described above. For example, encoder 4801 may generate supplemental enhancement information (SEI) that stores a parameter (an optional parameter) that is not always used for decoding.

Next, a configuration of encoded data and a method of storing encoded data in a NAL unit will be described.

Figure 26:
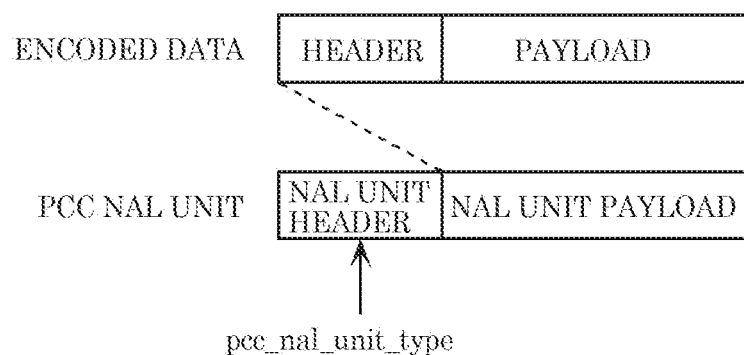
FIG. 26 is a diagram illustrating a structure example of encoded data and a NAL unit according to Embodiment 2.

For example, a data format is defined for each type of encoded data. FIG. 26 is a diagram showing an example of encoded data and a NAL unit.

For example, as shown in FIG. 26, encoded data includes a header and a payload. The encoded data may include length information indicating the length (data amount) of the encoded data, the header, or the payload. The encoded data may include no header.

The header includes identification information for identifying the data, for example. The identification information indicates a data type or a frame number, for example.

The header includes identification information indicating a reference relationship, for example. The identification information is stored in the header when there is a dependence relationship between data, for example, and allows an entity to refer to another entity. For example, the header of the entity to be referred to includes identification information for identifying the data. The header of the referring entity includes identification information indicating the entity to be referred to.

Note that, when the entity to be referred to or the referring entity can be identified or determined from other information, the identification information for identifying the data or identification information indicating the reference relationship can be omitted.

Multiplexer 4802 stores the encoded data in the payload of the NAL unit. The NAL unit header includes pcc_nal_unit_type, which is identification information for the encoded data. FIG. 27 is a diagram showing a semantics example of pcc_nal_unit_type.

As shown in FIG. 27, when pcc_codec_type is codec 1 (Codec1: first encoding method), values 0 to 10 of pcc_nal_unit_type are assigned to encoded geometry data (Geometry), encoded attribute X data (AttributeX), encoded attribute Y data (AttributeY), geometry PS (Geom. PS), attribute XPS (AttrX. S), attribute YPS (AttrY. PS), geometry SPS (Geometry Sequence PS), attribute X SPS (AttributeX Sequence PS), attribute Y SPS (AttributeY Sequence PS), AU header (AU Header), and GOF header (GOF Header) in codec 1. Values of 11 and greater are reserved in codec 1.

When pcc_codec_type is codec 2 (Codec2: second encoding method), values of 0 to 2 of pcc_nal_unit_type are assigned to data A (DataA), metadata A (MetaDataA), and metadata B (MetaDataB) in the codec. Values of 3 and greater are reserved in codec 2.

Next, an order of transmission of data will be described. In the following, restrictions on the order of transmission of NAL units will be described.

Multiplexer 4802 transmits NAL units on a GOF basis or on an AU basis. Multiplexer 4802 arranges the GOF header at the top of a GOF, and arranges the AU header at the top of an AU.

In order to allow the decoding device to decode the next AU and the following AUs even when data is lost because of a packet loss or the like, multiplexer 4802 may arrange a sequence parameter set (SPS) in each AU.

When there is a dependence relationship for decoding between encoded data, the decoding device decodes the data of the entity to be referred to and then decodes the data of the referring entity. In order to allow the decoding device to perform decoding in the order of reception without rearranging the data, multiplexer 4802 first transmits the data of the entity to be referred to.

Figure 28:
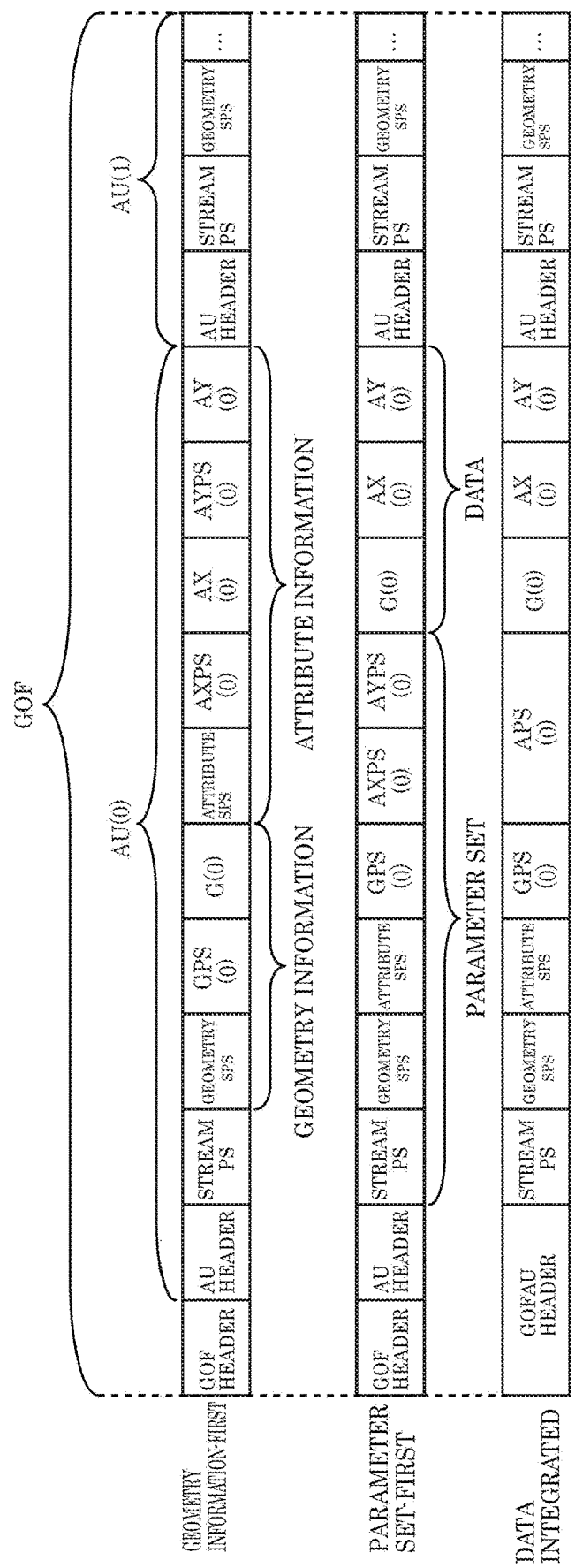
FIG. 28 is a diagram illustrating an example of a transmitting order of NAL units according to Embodiment 2.

FIG. 28 is a diagram showing examples of the order of transmission of NAL units. FIG. 28 shows three examples, that is, geometry information-first order, parameter-first order, and data-integrated order.

The geometry information-first order of transmission is an example in which information relating to geometry information is transmitted together, and information relating to attribute information is transmitted together. In the case of this order of transmission, the transmission of the information relating to the geometry information ends earlier than the transmission of the information relating to the attribute information.

For example, according to this order of transmission is used, when the decoding device does not decode attribute information, the decoding device may be able to have an idle time since the decoding device can omit decoding of attribute information. When the decoding device is required to decode geometry information early, the decoding device may be able to decode geometry information earlier since the decoding device obtains encoded data of the geometry information earlier.

Note that, although in FIG. 28 the attribute X SPS and the attribute Y SPS are integrated and shown as the attribute SPS, the attribute X SPS and the attribute Y SPS may be separately arranged.

In the parameter set-first order of transmission, a parameter set is first transmitted, and data is then transmitted.

As described above, as far as the restrictions on the order of transmission of NAL units are met, multiplexer 4802 can transmit NAL units in any order. For example, order identification information may be defined, and multiplexer 4802 may have a function of transmitting NAL units in a plurality of orders. For example, the order identification information for NAL units is stored in the stream PS.

The three-dimensional data decoding device may perform decoding based on the order identification information. The three-dimensional data decoding device may indicate a desired order of transmission to the three-dimensional data encoding device, and the three-dimensional data encoding device (multiplexer 4802) may control the order of transmission according to the indicated order of transmission.

Note that multiplexer 4802 can generate encoded data having a plurality of functions merged to each other as in the case of the data-integrated order of transmission, as far as the restrictions on the order of transmission are met. For example, as shown in FIG. 28, the GOF header and the AU header may be integrated, or AXPS and AYPS may be integrated. In such a case, an identifier that indicates data having a plurality of functions is defined in pcc_nal_unit_ type.

In the following, variations of this embodiment will be described. There are levels of PSs, such as a frame-level PS, a sequence-level PS, and a PCC sequence-level PS. Provided that the PCC sequence level is a higher level, and the frame level is a lower level, parameters can be stored in the manner described below.

The value of a default PS is indicated in a PS at a higher level. If the value of a PS at a lower level differs from the value of the PS at a higher level, the value of the PS is indicated in the PS at the lower level. Alternatively, the value of the PS is not described in the PS at the higher level but is described in the PS at the lower level. Alternatively, information indicating whether the value of the PS is indicated in the PS at the lower level, at the higher level, or at both the levels is indicated in both or one of the PS at the lower level and the PS at the higher level. Alternatively, the PS at the lower level may be merged with the PS at the higher level. If the PS at the lower level and the PS at the higher level overlap with each other, multiplexer 4802 may omit transmission of one of the PSs.

Note that encoder 4801 or multiplexer 4802 may divide data into slices or tiles and transmit each of the divided slices or tiles as divided data. The divided data includes information for identifying the divided data, and a parameter used for decoding of the divided data is included in the parameter set. In this case, an identifier that indicates that the data is data relating to a tile or slice or data storing a parameter is defined in pcc_nal_unit_type.

Figure 29:
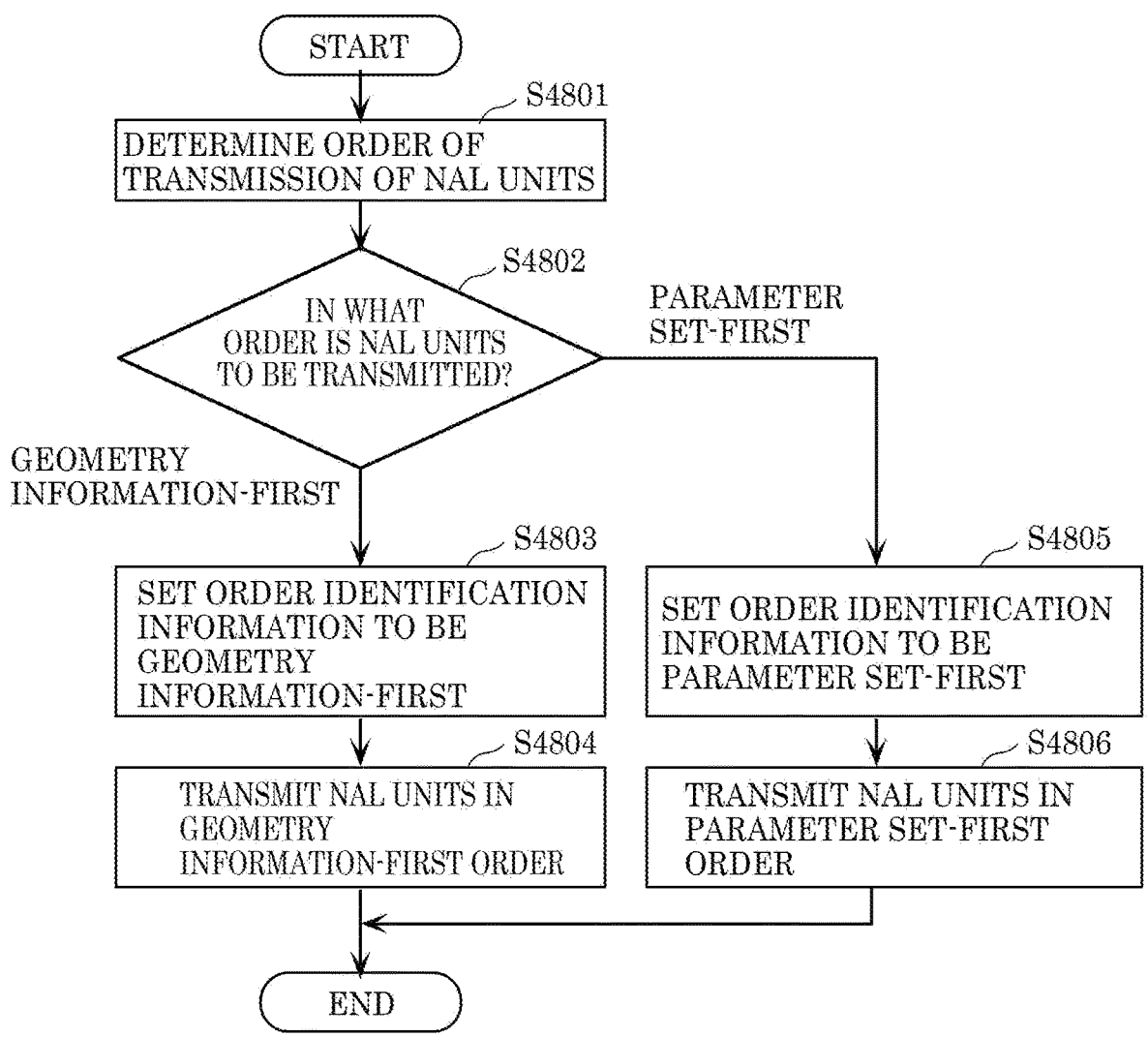
FIG. 29 is a flowchart of processing performed by a three-dimensional data encoding device according to Embodiment 2.

In the following, a process relating to order identification information will be described. FIG. 29 is a flowchart showing a process performed by the three-dimensional data encoding device (encoder 4801 and multiplexer 4802) that involves the order of transmission of NAL units.

First, the three-dimensional data encoding device determines the order of transmission of NAL units (geometry information-first or parameter set-first) (S4801). For example, the three-dimensional data encoding device determines the order of transmission based on a specification from a user or an external device (the three-dimensional data decoding device, for example).

If the determined order of transmission is geometry information-first (if "geometry information-first" in S4802), the three-dimensional data encoding device sets the order identification information included in the stream PS to geometry information-first (S4803). That is, in this case, the order identification information indicates that the NAL units are transmitted in the geometry information-first order. The three-dimensional data encoding device then transmits the NAL units in the geometry information-first order (S4804).

On the other hand, if the determined order of transmission is parameter set-first (if "parameter set-first" in S4802), the three-dimensional data encoding device sets the order identification information included in the stream PS to parameter set-first (S4805). That is, in this case, the order identification information indicates that the NAL units are transmitted in the parameter set-first order. The three-dimensional data encoding device then transmits the NAL units in the parameter set-first order (S4806).

Figure 30:
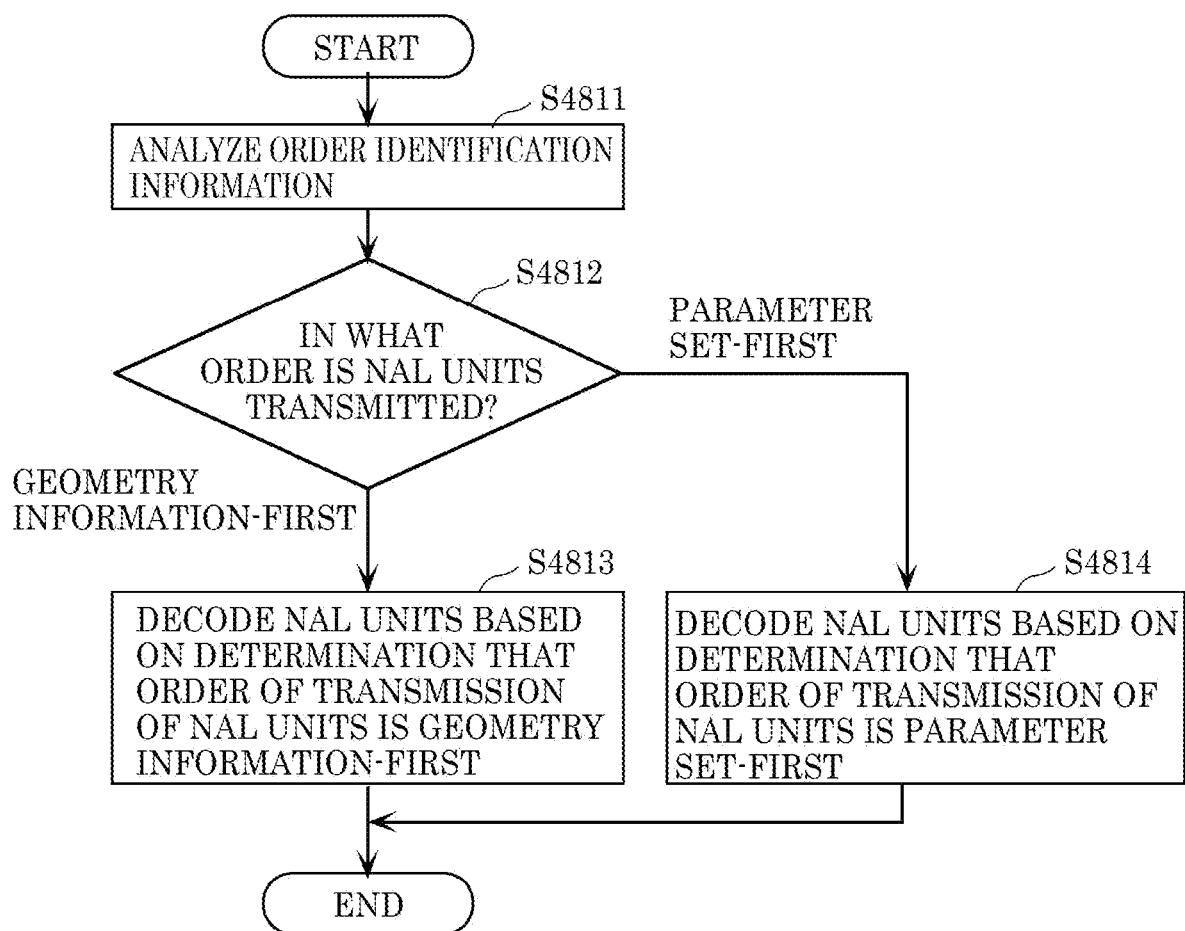
FIG. 30 is a flowchart of processing performed by a three-dimensional data decoding device according to Embodiment 2.

FIG. 30 is a flowchart showing a process performed by the three-dimensional data decoding device that involves the order of transmission of NAL units. First, the three-dimensional data decoding device analyzes the order identification information included in the stream PS (S4811).

If the order of transmission indicated by the order identification information is geometry information-first (if "geometry information-first" in S4812), the three-dimensional data decoding device decodes the NAL units based on the determination that the order of transmission of the NAL units is geometry information-first (S4813).

On the other hand, if the order of transmission indicated by the order identification information is parameter set-first (if "parameter set-first" in S4812), the three-dimensional data decoding device decodes the NAL units based on the determination that the order of transmission of the NAL units is parameter set-first (S4814).

For example, if the three-dimensional data decoding device does not decode attribute information, in step S4813, the three-dimensional data decoding device does not obtain the entire NAL units but can obtain a part of a NAL unit relating to the geometry information and decode the obtained NAL unit to obtain the geometry information.

Figure 31:
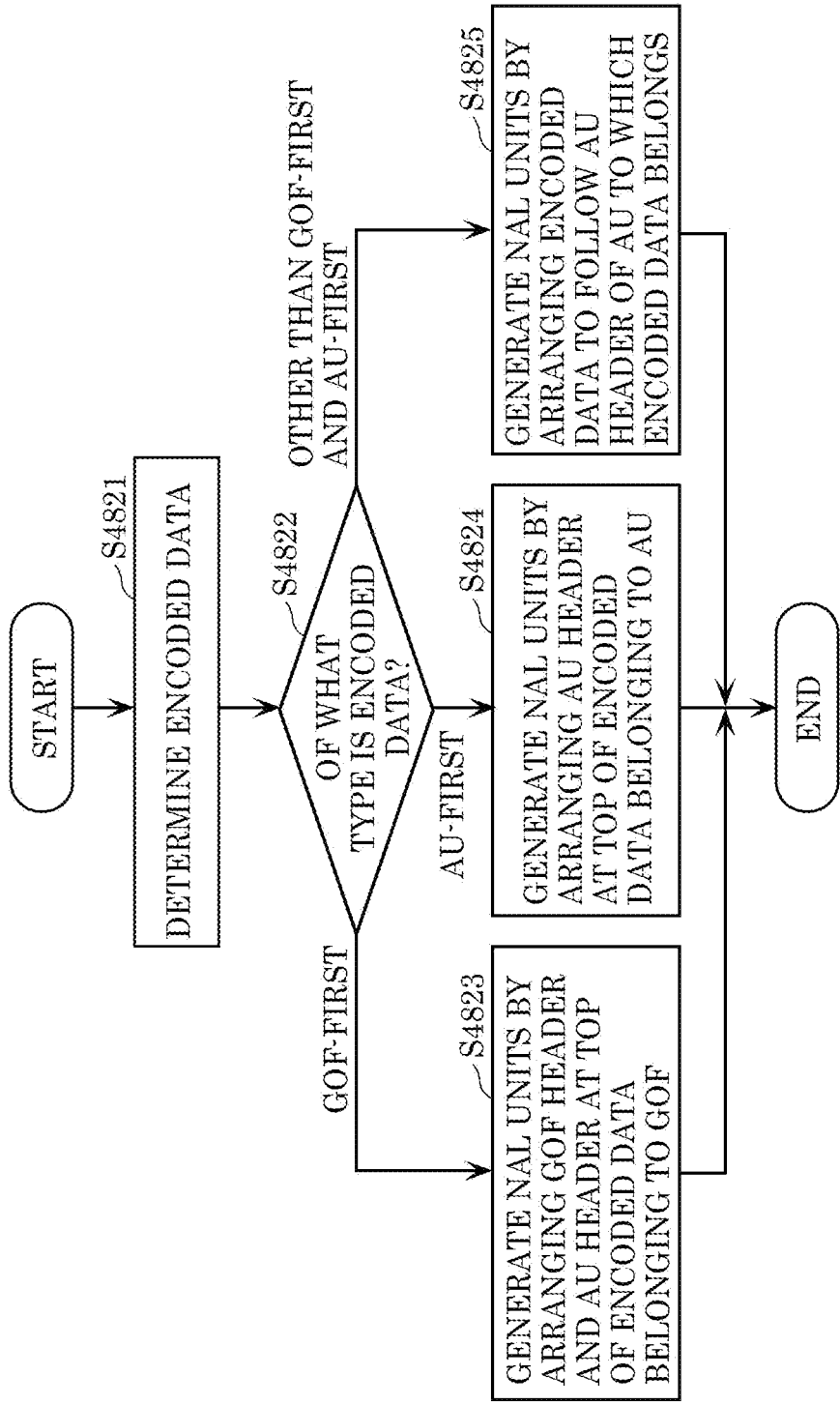
FIG. 31 is a flowchart of multiplexing processing according to Embodiment 2.

Next, a process relating to generation of an AU and a GOF will be described. FIG. 31 is a flowchart showing a process performed by the three-dimensional data encoding device (multiplexer 4802) that relates to generation of an AU and a GOF in multiplexing of NAL units.

First, the three-dimensional data encoding device determines the type of the encoded data (S4821). Specifically, the three-dimensional data encoding device determines whether the encoded data to be processed is AU-first data, GOF-first data, or other data.

If the encoded data is GOF-first data (if "GOF-first" in S4822), the three-dimensional data encoding device generates NAL units by arranging a GOF header and an AU header at the top of the encoded data belonging to the GOF (S4823).

If the encoded data is AU-first data (if "AU-first" in S4822), the three-dimensional data encoding device generates NAL units by arranging an AU header at the top of the encoded data belonging to the AU (S4824).

If the encoded data is neither GOF-first data nor AU-first data (if "other than GOF-first and AU-first" in S4822), the three-dimensional data encoding device generates NAL units by arranging the encoded data to follow the AU header of the AU to which the encoded data belongs (S4825).

Figure 32:
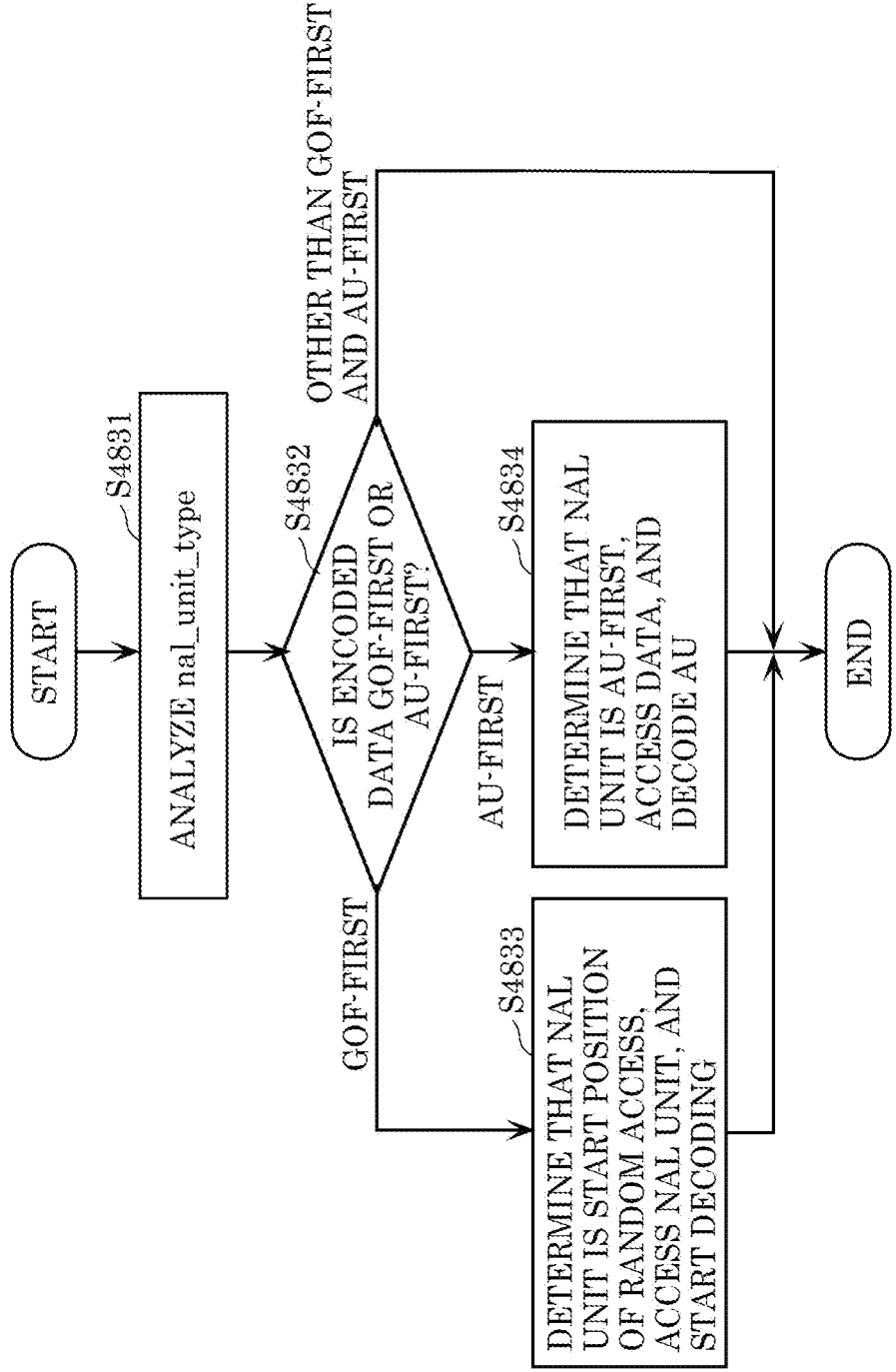
FIG. 32 is a flowchart of demultiplexing processing according to Embodiment 2.

Next, a process relating to access to an AU and a GOF will be described. FIG. 32 is a flowchart showing a process performed by the three-dimensional data decoding device that involves accessing to an AU and a GOF in demultiplexing of a NAL unit.

First, the three-dimensional data decoding device determines the type of the encoded data included in the NAL unit by analyzing nal_unit_type in the NAL unit (S4831). Specifically, the three-dimensional data decoding device determines whether the encoded data included in the NAL unit is AU-first data, GOF-first data, or other data.

If the encoded data included in the NAL unit is GOF-first data (if "GOF-first" in S4832), the three-dimensional data decoding device determines that the NAL unit is a start position of random access, accesses the NAL unit, and starts the decoding process (S4833).

If the encoded data included in the NAL unit is AU-first data (if "AU-first" in S4832), the three-dimensional data decoding device determines that the NAL unit is AU-first, accesses the data included in the NAL unit, and decodes the AU (S4834).

If the encoded data included in the NAL unit is neither GOF-first data nor AU-first data (if "other than GOF-first and AU-first" in S4832), the three-dimensional data decoding device does not process the NAL unit.

Embodiment 3

Figure 33:
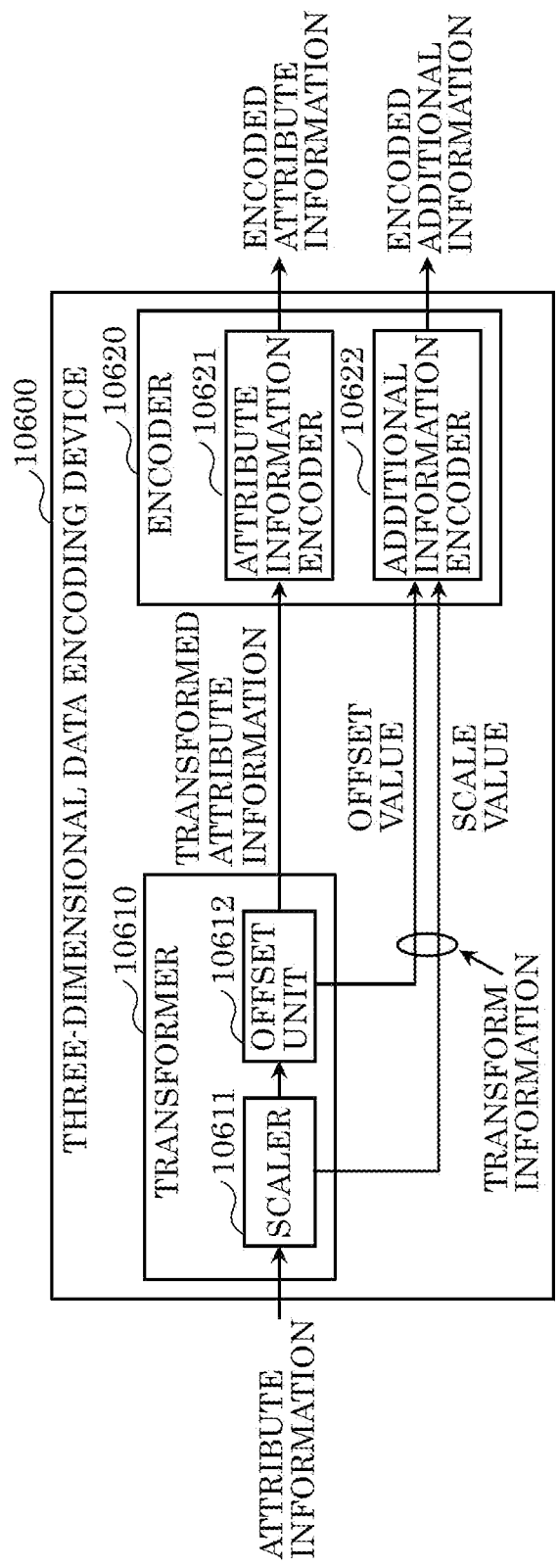
FIG. 33 is a block diagram illustrating a configuration of a three-dimensional data encoding device according to Embodiment 3.

FIG. 33 is a block diagram illustrating a configuration of a three-dimensional data encoding device according to this embodiment. Note that, in FIG. 33, illustration of an encoder that encodes geometry information, which is included in the three-dimensional data encoding device, is omitted.

Three-dimensional data encoding device 10600 includes transformer 10610 and encoder 10620.

Transformer 10610 executes a transform process on input attribute information before the attribute information is input to encoder 10620. The transform process is at least one of offset (offset process) and scaling (scaling process) described later, for example.

Transformer 10610 has scaler 10611 and offset unit 10612. Transformer 10610 has only to have at least one of offset unit 10612 and scaler 10611. For example, transformer 10610 need not have scaler 10611, if transformer 10610 performs only offset on the attribute information.

Scaler 10611 performs a scaling (multiplication or division), which is an example of the transform process, on the input attribute information, and outputs a scale value (more specifically, scale information that is information indicating a scale value used for the scaling).

Offset unit 10612 performs an offset (addition or subtraction), which is another example of the transform process, on the scaled attribute information, and outputs an offset value (more specifically, offset information that is information indicating an offset value used for the offset).

Encoder 10620 encodes the attribute information transformed by transformer 10610 (transformed attribute information), and encodes transform information, such as the offset value or the scale value, as additional information (metadata).

Encoder 10620 includes attribute information encoder 10621 and additional information encoder 10622.

Attribute information encoder 10621 encodes the transformed attribute information, which is the attribute information transformed by transformer 10610.

Additional information encoder 10622 encodes additional information output from transformer 10610, the additional information including the transform information, such as the scale value or the offset value.

For example, when encoder 10620 is not capable of encoding of a negative value or is prescribed not to encode a negative value, if the format of the input attribute information has a negative value, transformer 10610 transforms the attribute information into a positive value by adding an offset value to the attribute information.

For example, when encoder 10620 does not handle a decimal fraction and a floating-point number but handles an integer or is prescribed not to handle a decimal fraction and a floating-point number but handle an integer, if the format of the input attribute information is not an integer, scaler 10611 transforms the attribute information into an integer value by multiplying the input attribute information (more specifically, a numerical value indicated by the input attribute information) by a scale value.

For example, when encoder 10620 is capable of encoding of attribute information in an 8-bit unsigned integer format (positive integer), and the input attribute information is a 32-bit signed floating-point number within a range of [−1, 1], the attribute information is first transformed into scaled_value, which is a value in an 8-bit signed integer format within a range of [−127, 128], through a process, such as scaling, round-off, truncation, or round-up.

Note that scaled_attribute=round(input_attribute×scale).

Here, scale is an example of the scale value and is a value by which the value indicated by the attribute information is to be multiplied. For example, scale is $2^{(8 bit-1)}$, that is, the seventh power of 2=128.

The scaled attribute information is then transformed into an 8-bit unsigned integer format within a range of [0, 255] by offset.

Note that offset_attribute=scaled_attribute+offset.

Here, offset is an example of the offset value and is a value to be added to the value indicated by the attribute information. For example, offset is $2^{(8 bit-1)}-1=127$.

The offset value and/or the scale value, which are transform information used for the transform, are input to encoder 10620 and encoded as additional information.

Note that additional information encoder 10622 may encode the transform information itself as additional information or encode information from which the transform information can be derived as additional information.

Information from which the offset value can be derived and information from which the scale value can be derived may be indicated independently or indicated by common information.

For example, in the example described above, the offset value and the scale value are defined in advance, such as offset=$2^{(N-1)}$ and scale=$2^{(N-1)}-1$. In this case, encoder 10620 stores the value of N (which is an integer equal to or greater than 1) in the additional information and encodes the resulting additional information, or in other words, encodes the additional information indicating the value of N as the transform information.

When the encoder handles the 8-bit unsigned integer format, N may be defined as the number of bits of the unsigned integer format, and N=8 may be set.

Alternatively, N may be defined in advance as indicating the number of bits of the unsigned integer format. In that case, when N is stored as information indicating that N indicates the number of bits of the unsigned integer format in an encoded stream (bitstream), the information indicating that N indicates the number of bits of the unsigned integer format need not be included in the additional information.

Transformer 10610 may determine each of offset and scale (the offset value and the scale value) based on a value, a characteristic or the like indicated by the attribute information forming the three-dimensional point cloud.

Note that, after scaling the attribute information, scaler 10611 may round the value of the scaled attribute information through processing, such as round-off, truncation, or round-up.

When the value indicated by the attribute information is a positive integer value or other value that need not be transformed, transformer 10610 need not transform the attribute information. In that case, transformer 10610 need not output the scale value and the offset value, or transformer 10610 may output, as the transform information, information indicating that no transform occurred. In that case, for example, encoder 10620 encodes the attribute information that has not been transformed by transformer 10610.

Figure 34:
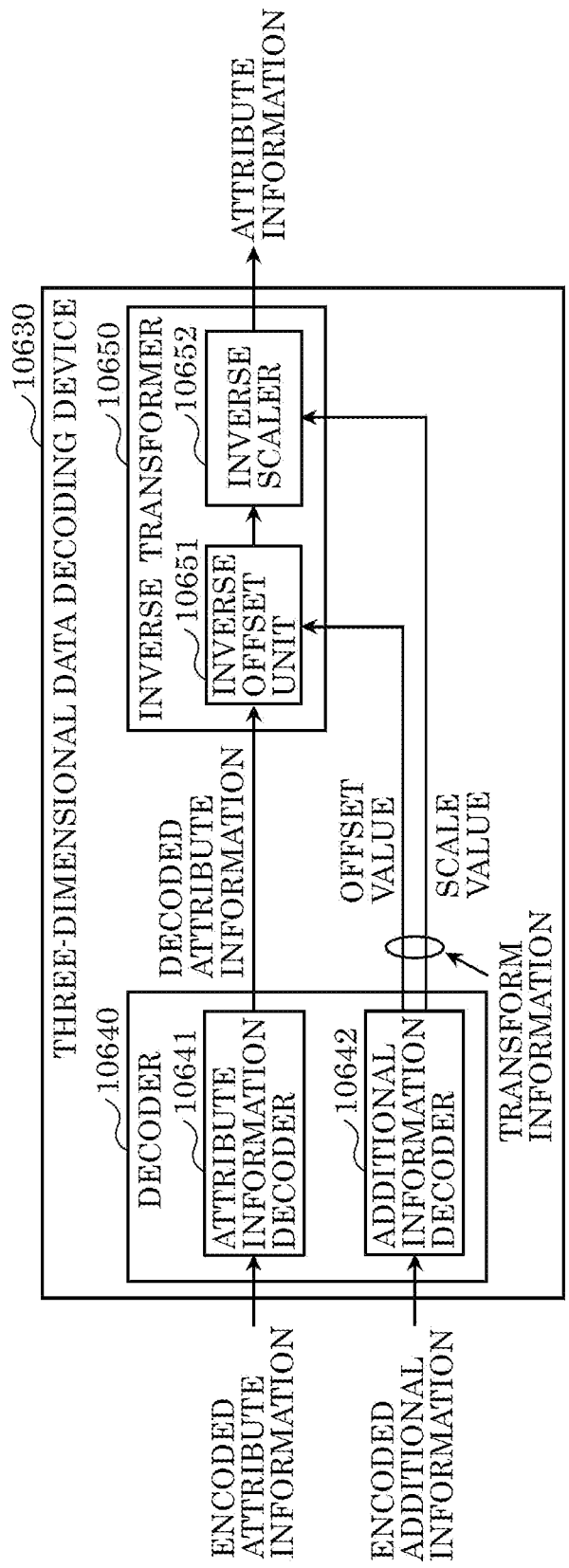
FIG. 34 is a block diagram illustrating a configuration of a three-dimensional data decoding device according to Embodiment 3.

FIG. 34 is a block diagram illustrating a configuration of a three-dimensional data decoding device according to this embodiment. Note that, in FIG. 34, illustration of a decoder that decodes encoded geometry information, which is included in the three-dimensional data decoding device, is omitted.

Three-dimensional data decoding device 10630 includes decoder 10640 and inverse transformer 10650.

Decoder 10640 receives attribute information encoded (encoded attribute information) and additional information encoded (encoded additional information), and decodes the encoded attribute information and the encoded additional information. Decoder 10640 has attribute information decoder 10641 and additional information decoder 10642.

Attribute information decoder 10641 decodes the encoded attribute information to produce decoded attribute information.

Additional information decoder 10642 decodes the encoded additional information to extract transform information or the like that indicates an offset value or a scale value.

Inverse transformer 10650 executes an inverse transform process on the decoded attribute information based on the transform information. The inverse transform process is at least one of inverse offset (inverse offset process) and inverse scaling (inverse scaling process) described later. Inverse transformer 10650 has inverse offset unit 10651 and inverse scaler 10652.

Inverse offset unit 10651 executes an inverse offset, which is an example of the inverse transform process, on the decoded attribute information using the offset value extracted from the transform information. That is, inverse offset unit 10651 executes, on the decoded attribute information, a transform that is inverse to the transform executed on the attribute information by transformer 10610 (more specifically, offset unit 10612). For example, when transformer 10610 has added an offset value to the value indicated by the attribute information, inverse offset unit 10651 subtracts the offset value from the value indicated by the decoded attribute information.

Inverse scaler 10652 performs an inverse scaling, which is another example of the transform process, on the inverse-offset decoded attribute information using the scale value extracted from the additional information. That is, inverse scaler 10652 executes, on the decoded attribute information, a transform that is inverse to the transform executed on the attribute information by transformer 10610 (more specifically, scaler 10611). For example, when transformer 10610 has multiplied the value indicated by the attribute information by a scale value, inverse scaler 10652 divides the value indicated by the decoded attribute information by the scale value.

For example, provided that the offset value and the scale value extracted from the additional information are offset and scale, respectively, the inverse-offset attribute information is derived as offset_attribute=decoded_value−offset, and the inverse-scaled attribute information is derived as scaled_attribute=offset_attribute/scale.

Note that in the scaling and the inverse scaling, the processing amount can be reduced by expressing the scale value as a power of 2 or the like and thereby using a shift operation (bit shift) rather than the multiplication and/or division. That is, the scaling and the inverse scaling are processes in which at least one of the multiplication and division and the shift operation is performed on the value indicated by the attribute information.

With the configuration described above, inverse transformer 10650 of three-dimensional data decoding device 10630 can reproduce the attribute information yet to be transformed by transformer 10610 of three-dimensional data encoding device 10600 by executing the inverse transform process based on the transform information included in the encoded data.

Note that three-dimensional data decoding device 10630 does not necessarily execute the inverse transform process, and may choose whether to execute the inverse transform process depending on the application or use case.

Although transformer 10610 has been described as being configured to have offset unit 10612 located after (in the subsequent stage to) scaler 10611, and inverse transformer 10650 has been described as being configured to have inverse scaler 10652 located after inverse offset unit 10651, the present disclosure is not limited to this. For example, transformer 10610 may be configured to have scaler 10611 located after offset unit 10612, and inverse transformer 10650 may be configured to have inverse offset unit 10651 located after inverse scaler 10652.

Alternatively, three-dimensional data encoding device 10600 may choose which configuration is to be used, that is, the order in which the scaling and the offset are performed on the attribute information, based on the type (attribute_type) of the attribute information, store information indicating which configuration is used, that is, information (order information) indicating the order in which the scaling and the offset are performed, in the additional information as a flag or the like, and transmit the resulting additional information to three-dimensional data decoding device 10630. Three-dimensional data decoding device 10630 may choose, based on the order information, the order in which the inverse scaling and the inverse offset are performed, and execute the inverse transform process on the decoded attribute information in the chosen order.

FIG. 35 is a diagram illustrating a first example of a syntax of a sequence parameter set (SPS) according to this embodiment.

In this embodiment, SPS indicates an identifier of SPS (sps_idx) and additional information concerning the entire sequence (common_information( )). For example, for each attribute included in the bitstream, SPS indicates additional information concerning attribute information, such as an identifier of the attribute information (attribute_type), the number of dimensions of the attribute information (num_dimension), and an identifier for differentiation between instances of the same attribute type (instance_id), and other additional information (attribute_info) concerning the attribute information, for example.

Three-dimensional point cloud data may have no attribute information corresponding to geometry information or have one or more items of attribute information corresponding to geometry information. For example, when three-dimensional data encoding device 10600 has a plurality of items of attribute information corresponding to one item of geometry information, three-dimensional data encoding device 10600 generates transform information corresponding to each item of attribute information, and stores the generated transform information in the additional information (or in other words, generates additional information including the transform information).

transform_flag is information (flag) that indicates whether additional information for each item of attribute information includes transform information. For example, when including transform information in additional information, three-dimensional data encoding device 10600 sets transform_flag=1, and sets transform information (offset value and/or scale value). For example, when not including transform information, three-dimensional data encoding device 10600 sets transform_flag=0.

Note that the number of dimensions of attribute information is one or greater, and when the number of dimensions is two or greater, common transform information may be used for all dimensions. Of course, even when the number of dimensions of attribute information is two or greater, different transform information may be used for each dimension.

For example, when the attribute information is formed by three-dimensional color information and a one-dimension reflectance, common transform information may be used for red (R), green (G), and blue (B) of the color information, and different transform information than that for the color information may be used for the reflectance.

Alternatively, common transform information may be used for a plurality of items of particular attribute information, and the transform information may be stored in additional information common to the plurality of items of particular attribute information. Alternatively, for example, common transform information may be used for a plurality of instances of the same attribute type (attribute_type), and the transform information may be indicated on a basis of the type of attribute information.

Alternatively, based on the type of attribute, it may be prescribed in advance that no transform information is used and indicated in additional information for a particular attribute type.

Figure 36:
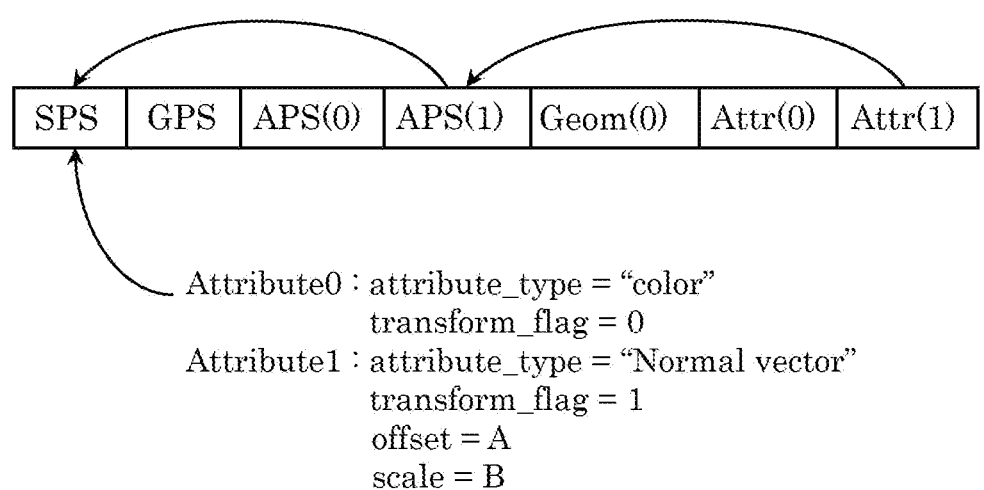
FIG. 36 is a diagram illustrating an example configuration of a bitstream according to Embodiment 3.

FIG. 36 is a diagram illustrating an example configuration of a bitstream according to this embodiment.

The transform information is stored in SPS, for example.

Note that the transform information need not be stored in SPS, and may be stored in a parameter set concerning encoding of the attribute information (attribute parameter set/APS) or other additional information, such as a slice header.

Alternatively, the transform information may be stored in additional information, such as supplemental enhancement information (SEI), for example.

instance_id indicates an identifier of the same attribute type. For example, for Color1, attribute_type=color, and instance_id=0. For example, for Color2, attribute_type=color, and instance_id=1.

Note that when the attribute information is color information, no transform information is generated.

When the attribute information is information indicating a normal vector, for example, transform information is generated and included in the bitstream along with SPS, APS or the like.

When Attribute0 included in the bitstream is color information (Color), which is an example of the attribute information, for example, the flag information (transform_flag) indicating whether transform information is included in the bitstream is set to be 0 (transform_flag=0), thereby indicating that no transform process has been performed on Attribute0.

On the other hand, when Attribute1 included in the bitstream is normal vector information (Normal_Vector), which is another example of the attribute information, for example, transform_flag=1 is set, thereby indicating that a transform process has been performed on Attribute1. In this case, for example, the bitstream includes information indicating the value used for offset (offset value) and information indicating the value used for scaling (scale value), such as offset=A and scale=B.

Note that transform_flag may be replaced with transform_information_type, and based on transform_information_type, combinations indicating the offset value and the scale value or the manners and/or formats indicating the offset value and/or scale value may be changed. In this way, information indicating whether a transform process has been performed (transform identification information), such as transform flag information, such as transform_flag, or transform type information, such as transform_information_type, is included in the bitstream.

FIG. 37 is a diagram illustrating a second example of the syntax of SPS according to this embodiment. FIG. 38 is a diagram illustrating a first example of a syntax of the transform information according to this embodiment.

For example, as illustrated in FIG. 38, the manner of indicating the scale value and the offset value may be able to be chosen from among a manner of indicating the values themselves, a manner of indicating the values as a multiplier of 2 (a value calculated according to y=log 2(x)), and a predetermined manner determined in advance, for example. For example, a flag of which syntax is to be used may be indicated, and the syntax may be switched based on the flag.

For example, when transform_type==2, the three-dimensional data encoding device obtains offset_log 2, and calculates the offset value and the scale value by calculating offset=2^(offset_log 2−X)−Y and scale=2^(scale_log 2−Z).

Note that X, Y, and Z are arbitrary integers. X, Y, and Z may be values determined in advance, or information indicating these values may be included in the bitstream and transmitted from three-dimensional data encoding device 10600 to three-dimensional data decoding device 10630.

In the above calculation, instead of offset_log 2 and scale_log 2, these values minus 1 (such as offset_log 2_minus1 and scale_log 2_minus_1) may be stored in the additional information.

In this way, the number of bits can be reduced.

FIG. 39 is a diagram illustrating a second example of the syntax of the transform information according to this embodiment.

In the example illustrated in FIG. 39, based on the type of the attribute information (attribute_type), the syntax is switched between indicating which of the offset value and the scale value is to be indicated, indicating both the values, and not indicating both the values, for example.

Note that when both offset and scaling are to be executed, order information (transform_order) indicating the order of offset unit 10612 and scaler 10611 of transformer 10610 of three-dimensional data encoding device 10600 may be included in the bitstream as additional information. This allows three-dimensional data decoding device 10630 to extract a predetermined syntax based on the additional information, such as transform_type, attribute_type, and transform_order, and applies the syntax to inverse transformer 10650.

Figure 40:
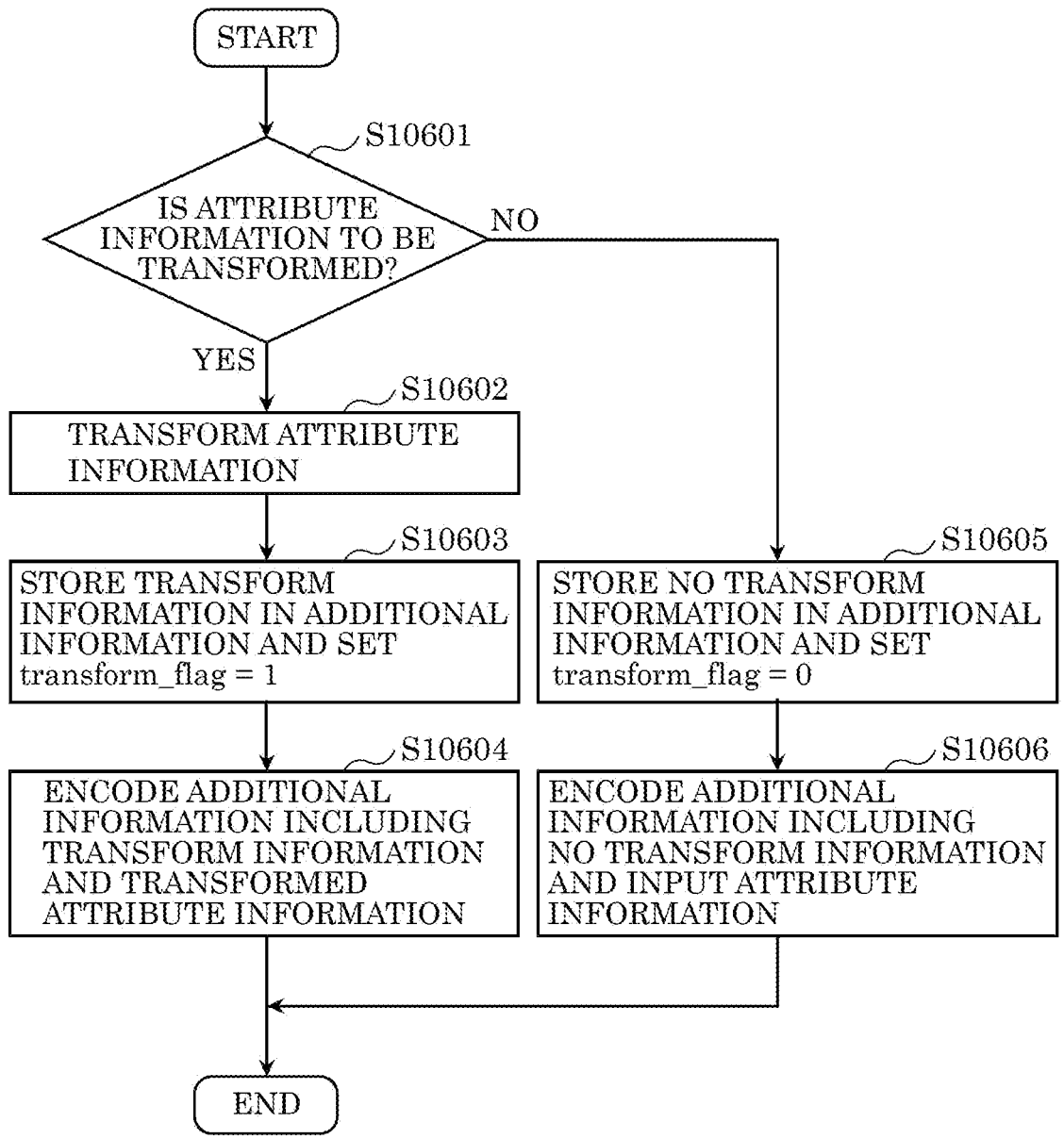
FIG. 40 is a flowchart illustrating a process procedure of the three-dimensional data encoding device according to Embodiment 3.

FIG. 40 is a flowchart illustrating a process procedure of the three-dimensional data encoding device according to this embodiment.

Three-dimensional data encoding device 10600 first determines whether to transform input attribute information (S10601).

When it is determined to transform input attribute information (Yes in S10601), three-dimensional data encoding device 10600 executes a transform process on the input attribute information (S10602). For example, three-dimensional data encoding device 10600 executes offset and scaling on the input attribute information.

Three-dimensional data encoding device 10600 then stores transform information in additional information, and sets transform_flag=1 (S10603). For example, information indicating an offset value used for offset and a scale value used for scaling is included in the additional information as the transform information.

Three-dimensional data encoding device 10600 then encodes the additional information including the transform information and the attribute information on which the transform process is executed (S10604). After step S10604, for example, three-dimensional data encoding device 10600 generates a bitstream including these items of encoded information as encoded data and transmits the bitstream to three-dimensional data decoding device 10630.

On the other hand, when it is determined not to transform input attribute information (No in S10601), since no transform process is executed on the input attribute information, three-dimensional data encoding device 10600 stores no transform information in additional information, and sets transform_flag=0 (S10605).

Three-dimensional data encoding device 10600 then encodes the additional information including no transform information and the attribute information on which no transform process has been executed, that is, the input attribute information (S10606). After step S10606, for example, three-dimensional data encoding device 10600 generates a bitstream including these items of information as encoded data and transmits the bitstream to three-dimensional data decoding device 10630.

Figure 41:
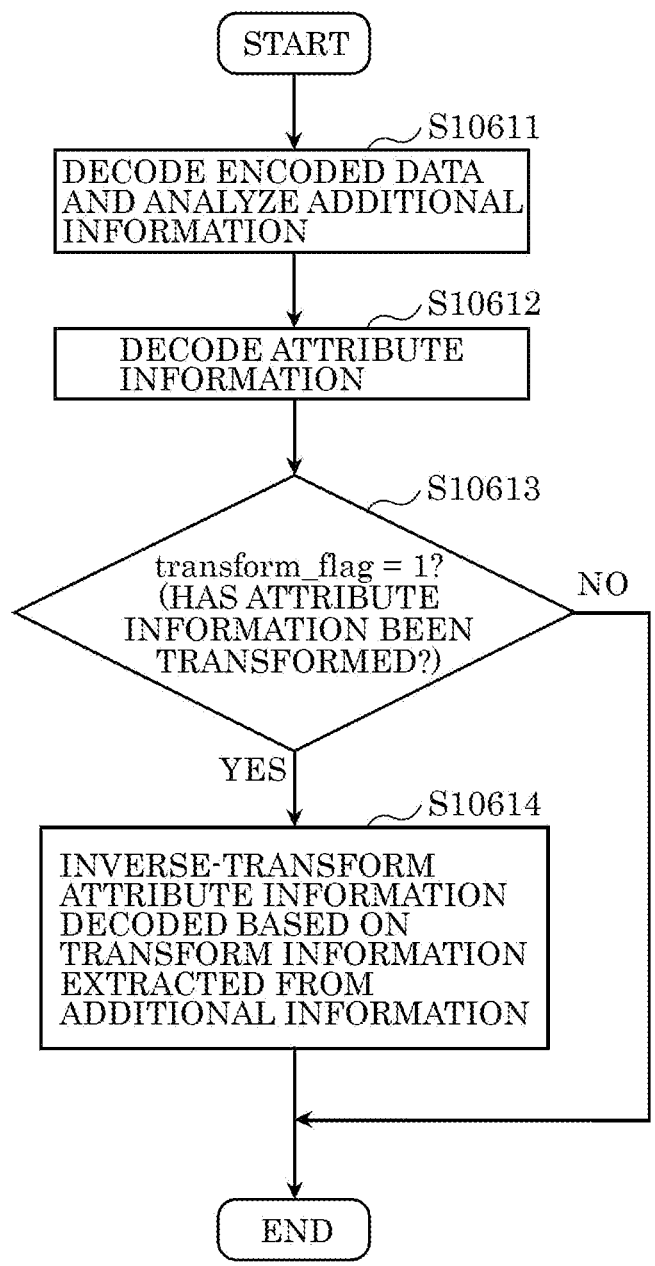
FIG. 41 is a flowchart illustrating a process procedure of the three-dimensional data decoding device according to Embodiment 3.

FIG. 41 is a flowchart illustrating a process procedure of the three-dimensional data decoding device according to this embodiment.

Three-dimensional data decoding device 10630 first receives the bitstream transmitted by three-dimensional data encoding device 10600, for example, decodes the encoded data included in the received bitstream, and analyzes the additional information included in the decoded encoded data (S10611).

Three-dimensional data decoding device 10630 then decodes the attribute information of the encoded data included in the bitstream (S10612).

Three-dimensional data decoding device 10630 then determines whether transform_flag included in the bitstream is set to be 1 (S10613). That is, by determining whether transform_flag=1, three-dimensional data decoding device 10630 determines whether a transform process has been executed on the attribute information included in the bitstream.

When it is determined that transform_flag included in the bitstream is set to be 1 (Yes in S10613), three-dimensional data decoding device 10630 extracts transform information from the additional information, and executes an inverse transform process on the attribute information based on the extracted transform information (S10614).

On the other hand, when it is determined that transform_flag included in the bitstream is not set to be 1 (No in S10613), that is, when transform_flag=0, three-dimensional data decoding device 10630 executes no inverse transform process and ends the process.

Although the data format of the attribute information input to encoder 10620 is transformed, and the transform information is included in the bitstream in the example shown above, the present disclosure is not limited to this.

Figure 42:
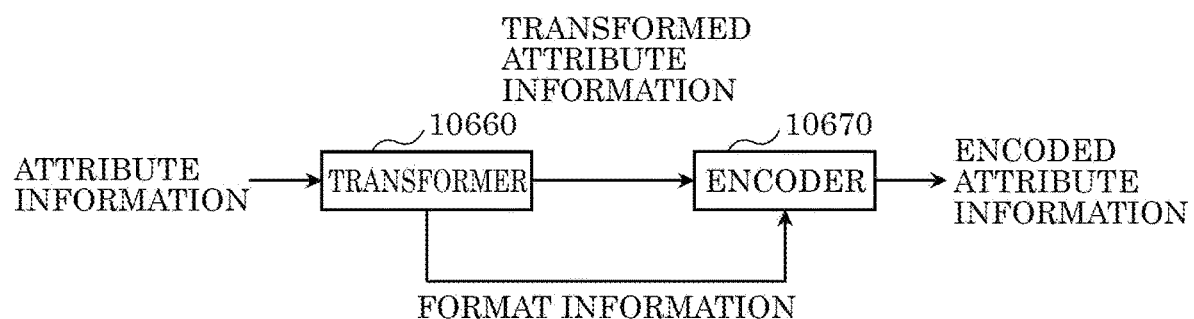
FIG. 42 is a block diagram for describing another example of the process of the three-dimensional data encoding device according to Embodiment 3.
Figure 43:
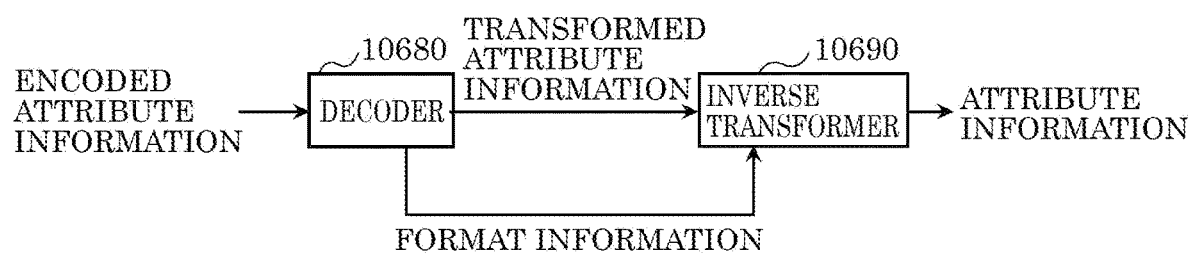
FIG. 43 is a block diagram for describing another example of the process of the three-dimensional data decoding device according to Embodiment 3.

FIG. 42 is a block diagram for describing another example of the process of the three-dimensional data encoding device according to this embodiment. FIG. 43 is a block diagram for describing another example of the process of the three-dimensional data decoding device according to this embodiment.

For example, the three-dimensional data encoding device may store format information in the additional information, the format information indicating the data format of the attribute information input to transformer 10660 and the format of the attribute information to be encoded after transform, and encoder 10670 may encode the additional information including the format information.

Three-dimensional data decoding device 10630 can reproduce the attribute information yet to be subjected to the transform process by transformer 10660 of the three-dimensional data encoding device by inverse transformer 10690 executing an inverse transform on the decoded attribute information based on the format information extracted by decoder 10680.

The format information (data format information) is information indicating the data format, the number of bits, and whether signed or unsigned, for example. For example, the format information is information, such as int8, unit16, or float16. The digit, such as 8 of int8, indicates the number of bits.

Alternatively, for example, the format information may indicate the file format (such as ply file, pcd file, Las file, txt file, or csv file) of the point cloud data yet to be subjected to the transform process, or may indicate the file format of the point cloud data subjected to the transform process.

Alternatively, for example, the format information may indicate, as SEI being extended information, at least one of a file format of point cloud data yet to be subjected to the transform process and a file format of point cloud data subjected to the transform process. Further, the SEI may include header information included in each of the file formats.

Here, examples of the file format of point cloud data include the ply format, which is a polygon file format, the las format, which is a format of LiDAR data obtained by laser measurement, and the pcd format, which is a point cloud file format.

At least one of the file format and the header information may be included in user_data.

Thus, the three-dimensional data encoding device can encode attribute information using the format information extracted by transformer 10660. The three-dimensional data decoding device can perform an inverse-transform on decoded attribute information using format information and can reconstruct header information and the like not to be encoded.

Although the offset and scaling of the attribute information have been described above, the methods described in this embodiment can also be applied to the geometry information.

The transform process, such as offset and scaling, may be executed before the geometry information is encoded, and the inverse transform process may be executed after the geometry information is decoded. In that case, the transform information or the format information may be stored in the additional information, such as SPS.

The three-dimensional data encoding device may have a transformer that executes a transform on at least one or both of the geometry information and the attribute information. Similarly, the three-dimensional data decoding device may have an inverse transformer that executes an inverse transform on any one or both (that is, at least one) of the geometry information and the attribute information. In that case, any one or both (that is, at least one) of the transform information on the geometry information and the transform information on the attribute information may be included in the additional information.

Although offset, scaling, and quantization have been described above as a manner of transforming input point cloud data, the present disclosure is not limited to these manners, and other transform processes can also be used. For example, predetermined linear or nonlinear transform means, such as a transform or an approximation using a predetermined function, may be used in the transform process.

The additional information can include not only information indicating the format of the attribute information but also information indicating the order of data of the point cloud, information indicating the order of sorting, or information on timestamps.

Embodiment 4

A specific example of supplemental enhancement information (SEI), which is extended information, will be described. FIG. 44 is a diagram illustrating a syntax example of SEI.

SEI includes format_id that indicates a format type. For example, format_id=0 indicates the ply format, format_id=1 indicates the las format, and format_id=2 indicates the pcd format. Note that the association between values set to format_id and the formats is not limited to the example and can be set arbitrarily. For example, a format_id may be defined for another commonly known point cloud format.

In accordance with format_id, SEI may include at least a part of header information in the corresponding format. For example, in the case of format_id=0, SEI includes ply_format_info( ). ply_format_info( ) includes header information of the ply format. In the case of format_id=1, SEI includes las_format_info( ). las_format_info( ) includes header information of the las format. SEI may include header information of another commonly known point cloud format.

FIG. 45 is a diagram illustrating a syntax example of ply_format_info( ). ply_format_info( ) includes information included in a header of the ply format or information of a part of the header. For example, as illustrated in FIG. 45, ply_format_info( ) includes format_info, element_info, property_num, property_info, property_type, scale, offset, is_property, fill_property, sps_id, and component_id.

format_info indicates whether data is in a binary format or a text format. Note that, in the case of data in the binary format, ply_format_info( ) may include information indicating whether data is in big endian or little endian.

element_info indicates a type of data (e.g., a three-dimensional point or a vertex (vertex) that indicates one of points constituting three-dimensional polygon data, etc.). Note that ply_format_info( ) may include information indicating the number of data items.

property_num indicates the number of properties (also referred to as components) included in the ply format. ply_format_info( ) includes, as items of information of each property, property_info, property_type, scale, offset, is_property, fill_property, sps_id, and component_id.

property_info indicates a type of a property and includes a property name, an identifier, or the like. Specifically, the type of a property refers to elements of geometry information (an x coordinate, a y coordinate, and a z coordinate in a Cartesian coordinate system, or a distance, a horizontal angle, and an angle of elevation), elements of color information (R, G, and B), a reflectivity, or an element of another type of information.

property_type indicates a data type such as float, int, and unsigned int. scale indicates a scale value used in a scaling process. offset indicates an offset value used in an offset process.

is_property indicates whether the property is compressed. For example, in the case where the property is compressed, is_property is set as is_property=1, and in the case where the property is not compressed, is_property is set as is_property=0.

In the case where the property is compressed, ply_format_info( ) includes information for identifying compressed data of encoded data. The information includes, for example, sps_id that is an identifier of an SPS and component_id that is an identifier of a property (component).

For example, the property is associated with an attribute information item that is described component_id-th in a plurality of attribute information items described in a sequence parameter set (SPS) having a specified sps_id.

In the case where the property is not compressed, ply_format_info( ) includes fill_property. fill_property indicates a value that is reproduced as a data value of the property in decoding. In the case where points need reproduction with different values, ply_format_info( ) may include fill_property for the number of items of data.

That is, when a property (component) is to be decoded, data of the property is constituted by decoded data specified by sps_id and component_id. When a property (component) is not to be decoded, data of the property is constituted by a value indicated by fill_property. The syntax shows an example in which fill_property is a value that is used in common by all points included in a point cloud. However, fill_property may indicate a different value for each point.

ply_format_info( ) may include information concerning another property as necessary.

FIG. 46 is a diagram illustrating a syntax example of las_format_info( ). las_format_info( ) includes information included in a header of the las format. For example, las_format_info includes public_header_block( ), variable_length_records( ), point_data_records( ), and extended_variable_length_records( ).

public_header_block( ) includes header information concerning data that is stored in Point Data Records in the las format.

variable_length_records( ) includes arbitrary variable-length header information that is stored in Variable Length Records in the las format.

point_data_records( ) includes information concerning geometry information or attribute information of a point cloud that is stored in Point Data Records in the las format.

extended_variable_length_records( ) includes extended information of an end of the las format that is stored in Extended Variable Length Records in the las format.

FIG. 47 is a diagram illustrating a syntax example of public_header_block( ). public_header_block( ) may include the information included in Public Header Block in the las format as it is or may include a part of the information.

FIG. 48 is a diagram illustrating a syntax example of variable_length_records( ). variable_length_records( ) may include the information included in Variable Length Record Header in the las format as it is or may include a part of the information.

FIG. 49 is a diagram illustrating a syntax example of point_data_records( ). point_data_records( ) may include information concerning geometry information or attribute information of a point cloud that is included in Point Data Records in the las format. For example, point_data_records( ) includes component_num, component_info, scale, offset, is_component, and fill_component.

component_num indicates the number of properties (components) of one point included in the las format. point_data_records( ) also includes, as items of information of each property, items of information according to Point Data Record Format defined in the las format (component_info, scale, offset, is_component, and fill_component). Note that point_data_records( ) may include information concerning all properties or may include information concerning some of the properties.

component_info is information indicating a correspondence between a property and actual data. Specifically, component_info includes a property name, an identifier (ID) of the property, or the like.

point_data_records( ) may include information of each of properties the number of which is indicated by property_num. For example, the information includes scale, offset, is_component, and fill_component.

scale indicates a scale value used in a scaling process. offset indicates an offset value used in an offset process. is_component indicates whether a current property is compressed. In the case where the current property is not compressed, point_data_records( ) includes fill_component. fill_component indicates a value that is reproduced as a data value of the property in decoding. In the case where points need reproduction with different values, point_data_records( ) may include fill_component for the number of items of data.

point_data_records( ) may include information concerning another property as necessary.

FIG. 50 is a diagram illustrating a syntax example of extended_variable_length_records( ). extended_variable_length_records( ) may include information included in Extended Variable Length Records in the las format as it is or may include a part of the information.

Figure 51:
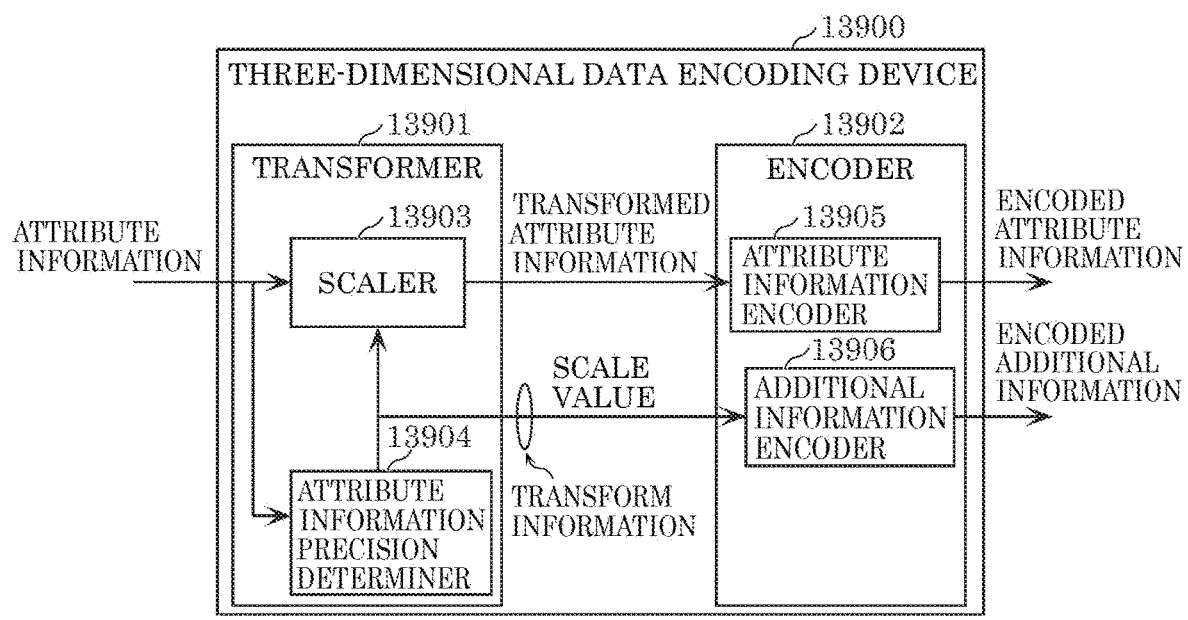
FIG. 51 is a block diagram of a three-dimensional data encoding device according to a first example of Embodiment 4.

A first example of a transformer and an inverse transformer will be described below. FIG. 51 is a block diagram illustrating a configuration of three-dimensional data encoding device 13900 according to the first example. Note that the figure illustrates processors relating mainly to encoding attribute information and omits illustration of processors relating to encoding position information. Three-dimensional data encoding device 13900 includes transformer 13901 and encoder 13902.

Transformer 13901 generates transformed attribute information by transforming attribute information included in point cloud data. Transformer 13901 includes scaler 13903 and attribute information precision determiner 13904.

Attribute information precision determiner 13904 determines a precision of attribute information to be encoded. Specifically, attribute information precision determiner 13904 determines effective bits from a plurality of bits included in the attribute information and determines a scale value (scale) to be used in division, multiplication, or bit shifting for extracting the effective bits.

Scaler 13903 performs a scaling (multiplication or division) on the attribute information using the scale value determined by attribute information precision determiner 13904, thereby generating the transformed attribute information. Transformer 13901 outputs transform information including the scale value to encoder 13902.

Encoder 13902 includes attribute information encoder 13905 and additional information encoder 13906. Attribute information encoder 13905 generates encoded attribute information by encoding the transformed attribute information. Additional information encoder 13906 generates encoded additional information by encoding the transform information including the scale value as additional information (referred to also as metadata or control information). The encoded attribute information and the encoded additional information are included in a bitstream output by three-dimensional data encoding device 13900 (referred to also as an encoded bitstream or encoded data).

Figure 52:
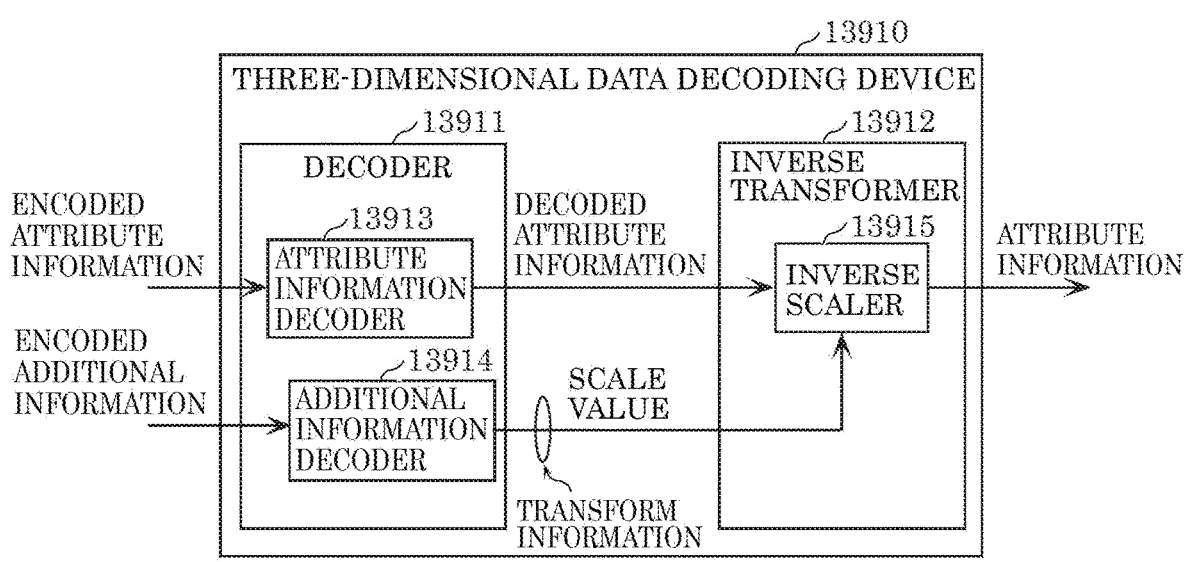
FIG. 52 is a block diagram of a three-dimensional data decoding device according to a first example of Embodiment 4.

FIG. 52 is a block diagram illustrating a configuration of three-dimensional data decoding device 13910 according to the first example. Note that the figure illustrates processors relating mainly to decoding attribute information and omits illustration of processors relating to decoding position information.

Three-dimensional data decoding device 13910 decodes, for example, a bitstream that is generated by three-dimensional data encoding device 13900 illustrated in FIG. 51 and includes the encoded attribute information and the encoded additional information. Three-dimensional data decoding device 13910 includes decoder 13911 and inverse transformer 13912.

Decoder 13911 includes attribute information decoder 13913 and additional information decoder 13914. Attribute information decoder 13913 generates decoded attribute information by decoding the encoded attribute information. Additional information decoder 13914 generates the transform information including the scale value by decoding the encoded additional information.

Inverse transformer 13912 includes inverse scaler 13915. Inverse scaler 13915 performs an inverse scaling on the decoded attribute information using the scale value, thereby generating the attribute information.

Figure 53:
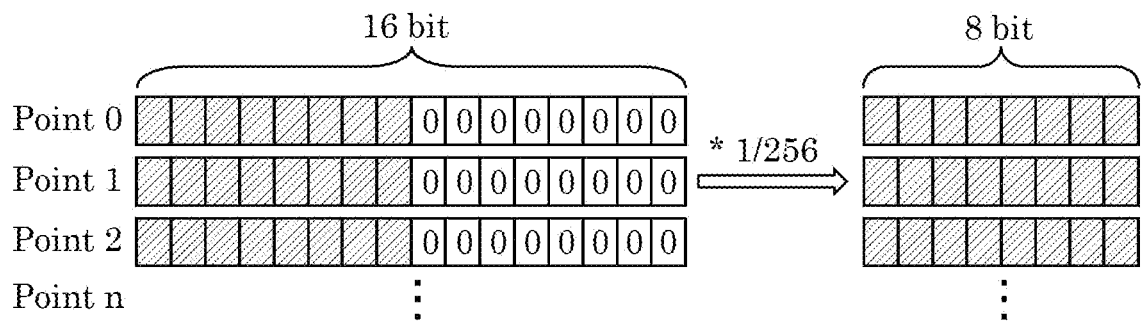
FIG. 53 is a diagram illustrating an example of processing performed by a transformer according to a first example of Embodiment 4.
Figure 54:
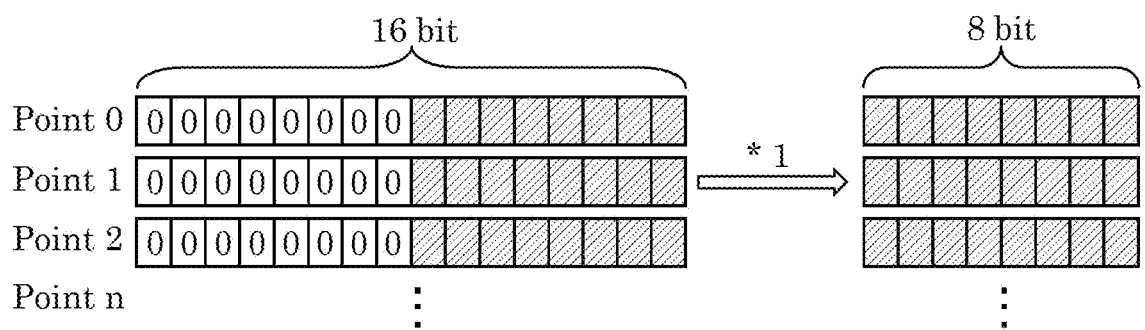
FIG. 54 is a diagram illustrating an example of processing performed by a transformer according to a first example of Embodiment 4.

A specific example of a process by transformer 13901 in the first example will be described below. Transformer 13901 checks positions of effective bits of all items of attribute information to be encoded (items of attribute information of Point 0 to Point n). FIG. 53 and FIG. 54 are diagrams illustrating examples of the process by transformer 13901. In the example illustrated in FIG. 53, a bit depth of the attribute information is 16-bit. Here, the attribute information is expressed in 16 bits, where upper 8 bits are effective bits, and lower 8 bits are invalid bits. The bit depth may be denoted as a bit width or a bit precision. In this case, transformer 13901 executes, as the scaling process, a division with scale=256, a multiplication with scale=1/256, or a right shift operation with scale=8 bits on the attribute information. This scaling process makes the lower 8 bits effective, generating transformed attribute information having a bit depth of 8-bit.

In the example illustrated in FIG. 54, a bit depth of the attribute information is 16-bit, where lower 8 bits are effective bits, and upper 8 bits are invalid bits. In this case, transformer 13901 executes, as the scaling process, a division with scale=1, a multiplication with scale=1, or a right shift operation with scale=0 bits on the attribute information. This scaling process makes the lower 8 bits effective, generating transformed attribute information having a bit depth of 8-bit. In this case, transformer 13901 may generate the attribute information having a bit depth of 8-bit by clipping the upper 8 bits to make the lower 8 bits effective without performing the scaling process.

As seen from the above, transformer 13901 transforms the attribute information having a bit depth of 16-bit into the 8-bit transformed attribute information. This enables encoder 13902 to handle a value smaller in size than the 16-bit attribute information, thus increasing compression efficiency.

Note that transformer 13901 need not check the precision of the attribute information. For example, in the case where a position of effective bits of attribute information to be encoded is fixed according to a standard for a format of the attribute information, transformer 13901 may determine a scale value (scale) according to the rule.

Alternatively, in the case where the lower 8 bits are effective bits, for example, transformer 13901 may output the 16-bit attribute information with the upper 8 bits remaining invalid (zero-padded), as the transformed attribute information, without changing the bit depth to 8-bit.

Although the specific example is described about the case of 16-bit attribute information, the same method is applicable to attribute information having any bit depth.

Transformer 13901 may further include an offset unit that performs an offset process. In this case, the offset process may be performed after the scaling process or may be performed before the scaling process.

Transformer 13901 may change the scale value for each encoding group unit such as a slice, tile, and frame. Transformer 13901 may change the scale value for each type of attribute information. Transformer 13901 thus can use the scale value being a value that differs among the units or the types.

Figure 55:
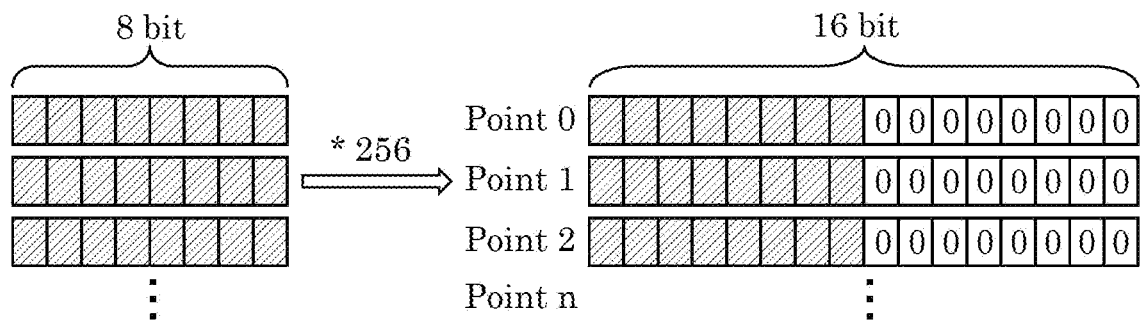
FIG. 55 is a diagram illustrating an example of processing performed by an inverse transformer according to a first example of Embodiment 4.
Figure 56:
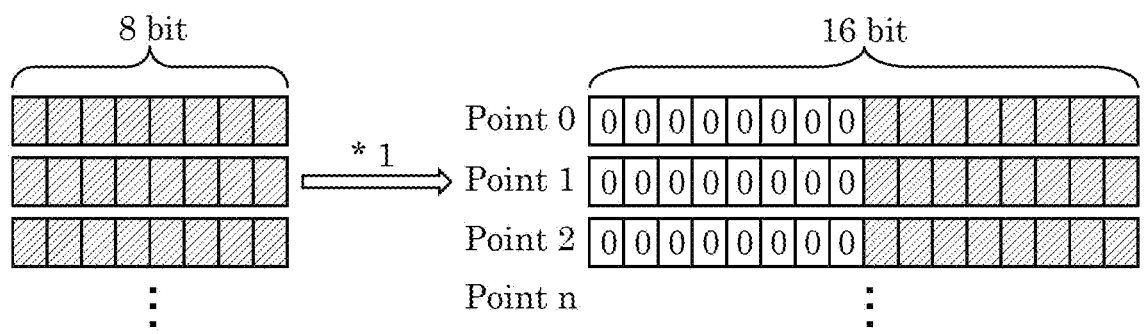
FIG. 56 is a diagram illustrating an example of processing performed by an inverse transformer according to a first example of Embodiment 4.

A specific example of a process by inverse transformer 13912 in the first example will be described below. FIG. 55 and FIG. 56 are diagrams illustrating examples of the process by inverse transformer 13912. In the example illustrated in FIG. 55, a bit depth of the decoded attribute information is 8-bit. Inverse transformer 13912 executes a multiplication with scale=256 or a left shift operation with scale=8 bits on the decoded attribute information, thereby generating attribute information having a bit depth of 16-bit in which its upper 8 bits are effective.

In the example illustrated in FIG. 56, a bit depth of the decoded attribute information is 8-bit. Inverse transformer 13912 executes a multiplication with scale=1 or a left shift operation with scale=0 bits on the decoded attribute information, thereby generating attribute information having a bit depth of 16-bit in which its lower 8 bits are effective. In this case, inverse transformer 13912 may generate the attribute information having a bit depth of 16-bit by making the lower 8 bits effective without performing the scaling process.

As seen from the above, three-dimensional data decoding device 13910 can reproduce original attribute information by decoding the bitstream generated by three-dimensional data encoding device 13900 described above. In short, three-dimensional data decoding device 13910 can decode a bitstream with an increased compression efficiency.

In the above-described manner, inverse transformer 13912 included in three-dimensional data decoding device 13910 can reproduce attribute information yet to be subjected to the transform by transformer 13901 included in three-dimensional data encoding device 13900 by executing an inverse transform process based on transform information included in a bitstream. Note that three-dimensional data decoding device 13910 need not necessarily execute the inverse transform process. Three-dimensional data decoding device 13910 may select, based on an application or a use case, whether to perform the inverse transform process.

Although the specific example is described about the case of 16-bit attribute information, the same method is applicable to attribute information having any bit depth.

Inverse transformer 13912 may further include an inverse offset unit that performs an inverse offset process. In this case, an inverse scaling process may be performed after the inverse offset process or may be performed before the inverse offset process.

Inverse transformer 13912 may change the scale value for each encoding group unit such as a slice, tile, and frame, to perform an inverse-transform. Inverse transformer 13912 may change the scale value for each type of attribute information. Inverse transformer 13912 thus can use the scale value being a value that differs among the units or the types.

In the following, variations of the syntax will be described. FIG. 57 is a diagram illustrating a syntax example of a sequence parameter set (SPS). An SPS includes sps_idx, common_information( ), attribute_type, instance_id, num_dimention, num_attribute_parameter, attribute_parameter (i), and attribute_info( ).

sps_idx is an identifier of the SPS. common_information ( ) is additional information concerning the entire sequence. attribute_type, instance_id, num_dimention, num_attribute_parameter, and attribute_parameter(i) are set for each item of attribute information.

attribute_type is an identifier of attribute information. instance_id is an identifier for identifying an instance of the same attribute type. num_dimention indicates a dimensionality of attribute information. attribute_info( ) is another type of additional information concerning attribute information.

attribute_parameter( ) includes various types of additional information (metadata) for different items of attribute information and has a general-purpose format. num_attribute_parameter indicates the number of attribute_parameter( ).

FIG. 58 is a diagram illustrating a syntax example of attribute_parameter(i). attribute_parameter(i) includes attr_param_type, attribute_source_offset_num_bits, attribute_source_offset, attribute_source_scale_num_bits, attribute_source_scale, and attribute_scale_frac_bits.

attr_param_type indicates a type of attribute_parameter. For example, in the case of attr_param_type=3, attribute_parameter(i) includes attribute_source_offset_num_bits, attribute_source_offset, attribute_source_scale_num_bits, attribute_source_scale, and attribute_scale_frac_bits. This is the same as indication of transform_info in the case of transform_flag=1.

attribute_source_offset indicates an offset value for restoring decoded attribute information to original (source) attribute information.

attribute_source_scale indicates a scale value for restoring decoded attribute information to original attribute information.

attribute_source_offset_num_bits indicates the number of bits of an offset value (attribute_source_offset). Note that the number of bits indicated by attribute_source_offset_num_bits being zero bits means that the offset process is not performed (i.e., offset=0). That is, attribute_source_offset_num_bits has a function as a flag indicating whether to indicate an offset value (whether to perform the offset process).

attribute_source_scale_num_bits indicates the number of bits of a scale value (attribute_source_scale). Note that the number of bits indicated by attribute_source_scale_num_bits being zero bits means that the scaling process is not performed (i.e., scale=1). That is, attribute_source_scale_num_bits has a function as a flag indicating whether to indicate a scale value (whether to perform the scaling process).

attribute_scale_frac_bits indicates the number of bits for expressing a value of a fractional portion of the scale value. This attribute_scale_frac_bits and the following (Equation a1) are used to calculate the scale value.

[Math. 1]
$$\text{scale} = \frac{\text{attribute\_source\_scale}}{(1 \ll \text{attribute\_source\_scale\_frac\_bit})} \quad \text{(Equation a1)}$$

Figure 59:
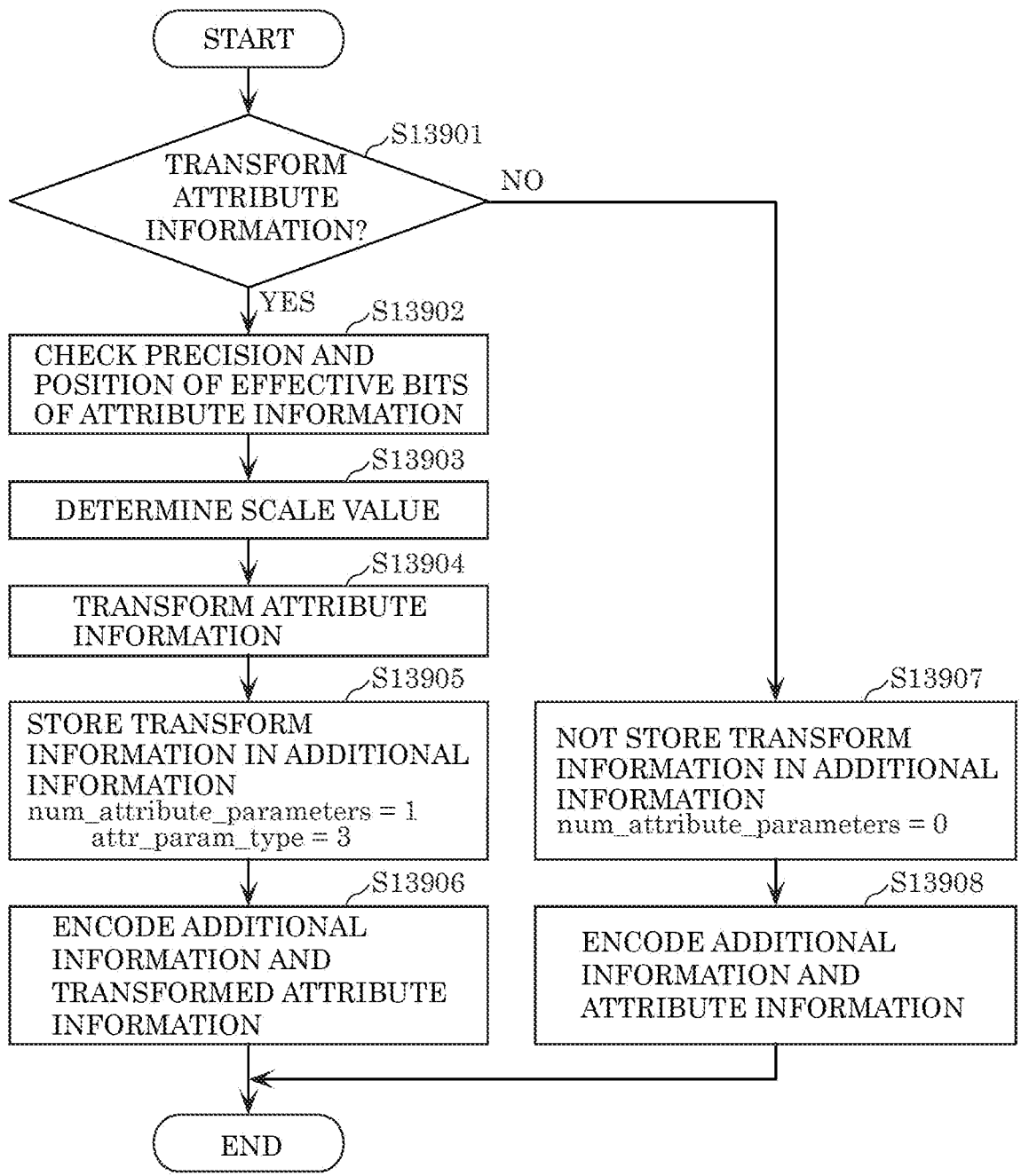
FIG. 59 is a flowchart of three-dimensional data encoding processing according to Embodiment 4.

Next, a flow of a process by three-dimensional data encoding device 13900 and three-dimensional data decoding device 13910 will be described. FIG. 59 is a flowchart of a three-dimensional data encoding process by three-dimensional data encoding device 13900.

First, three-dimensional data encoding device 13900 determines whether to transform attribute information (S13901). For example, three-dimensional data encoding device 13900 determines whether to transform the attribute information based on instructions or a setting from the outside. Note that three-dimensional data encoding device 13900 may determine whether to transform the attribute information based on point cloud data to be encoded such as attribute information to be encoded.

In the case where the attribute information is transformed (Yes in S13901), three-dimensional data encoding device 13900 checks precisions and positions of effective bits of items of attribute information of all three-dimensional points included in the point cloud data to be encoded (S13902). Next, three-dimensional data encoding device 13900 determines a scale value based on the positions of effective bits (S13903). Next, three-dimensional data encoding device 13900 transforms the attribute information using the determined scale value, thereby generating transformed attribute information (S13904). Next, three-dimensional data encoding device 13900 stores transform information including the scale value in additional information (S13905). For example, three-dimensional data encoding device 13900 stores num_attribute_parameter=1 and attr_param_type=3 in the additional information. The scale value is also stored in attribute_source_scale. Specifically, the scale value is indicated by attribute_source_scale_num_bits, attribute_source_scale, and attribute_scale_frac_bits. Next, three-dimensional data encoding device 13900 encodes the additional information including the scale value and encodes the transformed attribute information, thereby generating a bitstream (encoded data) (S13906).

On the other hand, in the case where the attribute information is not transformed (No in S13901), three-dimensional data encoding device 13900 does not store the transform information in the additional information (S13907). For example, three-dimensional data encoding device 13900 stores num_attribute_parameter=0 in the additional information. Next, three-dimensional data encoding device 13900 encodes the additional information not including the transform information and encodes the attribute information, thereby generating a bitstream (encoded data) (S13908).

Figure 60:
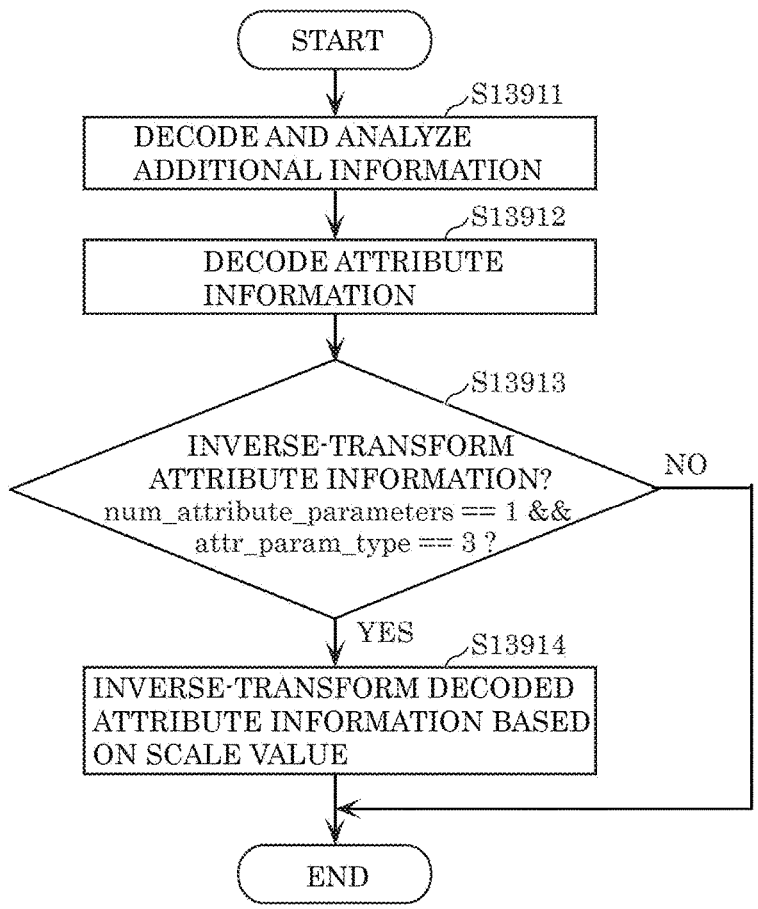
FIG. 60 is a flowchart of three-dimensional data decoding processing according to Embodiment 4.

FIG. 60 is a flowchart of a three-dimensional data decoding process by three-dimensional data decoding device 13910. First, three-dimensional data decoding device 13910 decodes encoded additional information included in a bitstream and analyzes the resulting additional information (S13911). Next, three-dimensional data decoding device 13910 decodes encoded attribute information included in the bitstream, thereby generating decoded attribute information (S13912).

Next, based on information included in the additional information, three-dimensional data decoding device 13910 determines whether to inverse-transform the attribute information (whether the attribute information has been transformed) (S13913). For example, three-dimensional data decoding device 13910 determines to inverse-transform the attribute information in the case of num_attribute_parameter==1 and attr_param_type==3. Otherwise, three-dimensional data decoding device 13910 determines not to inverse-transform the attribute information.

In the case where it is determined that the attribute information is inverse-transformed (Yes in S13913), three-dimensional data decoding device 13910 inverse-transforms the decoded attribute information based on a scale value included in the additional information, thereby generating the attribute information (S13914). On the other hand, in the case where it is determined that the attribute information is not inverse-transformed (No in S13913), three-dimensional data decoding device 13910 does not perform the inverse-transforming but outputs the decoded attribute information as the attribute information.

Figure 61:
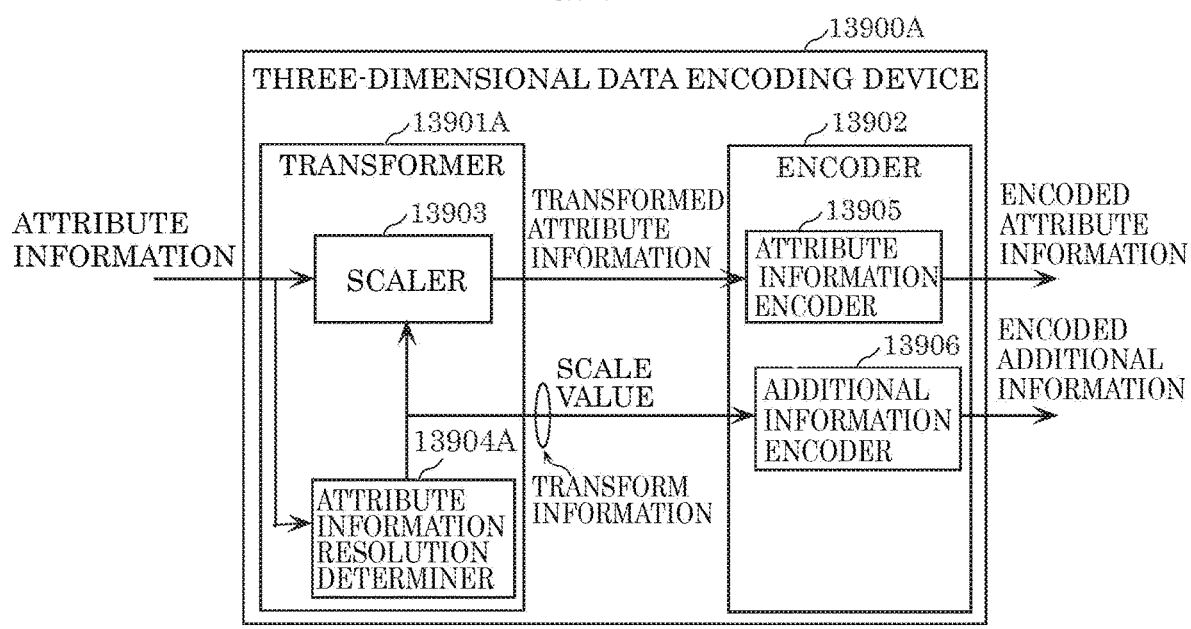
FIG. 61 is a block diagram of a three-dimensional data encoding device according to a second example of Embodiment 4.

Next, a second example of a transformer and an inverse transformer will be described. FIG. 61 is a block diagram illustrating a configuration of three-dimensional data encoding device 13900A according to the second example. Note that the figure illustrates processors relating mainly to encoding attribute information and omits illustration of processors relating to encoding position information.

When three-dimensional data encoding device 13900A illustrated in FIG. 61 is compared with three-dimensional data encoding device 13900 illustrated in FIG. 51, transformer 13901A differs in configuration from transformer 13901. Specifically, transformer 13901A includes attribute information resolution determiner 13904A in place of attribute information precision determiner 13904.

Attribute information resolution determiner 13904A determines a resolution of attribute information to be encoded. Attribute information resolution determiner 13904A determines how many times a value of the attribute information is greater than a reference signal and determines a scale value (scale) to be used in division, multiplication, or bit shifting for extracting the reference signal.

Scaler 13903 performs a scaling (multiplication or division) on the attribute information using the scale value determined by attribute information resolution determiner 13904A, thereby generating the transformed attribute information. Transformer 13901A outputs transform information including the scale value to encoder 13902.

Encoder 13902 includes attribute information encoder 13905 and additional information encoder 13906. Attribute information encoder 13905 generates encoded attribute information by encoding the transformed attribute information. Additional information encoder 13906 generates encoded additional information by encoding, as additional information, the transform information including the scale value. The encoded attribute information and the encoded additional information are included in a bitstream output by three-dimensional data encoding device 13900A.

Note that a configuration of three-dimensional data decoding device 13910 that decodes the bitstream generated by three-dimensional data encoding device 13900A is the same as the configuration illustrated in FIG. 52.

A specific example of a process by transformer 13901A in the second example will be described below. Transformer 13901A checks resolutions of all items of attribute information to be encoded (items of attribute information of Point 0 to Point n). FIG. 62 is a diagram illustrating an example of the process by transformer 13901A. In the example illustrated in FIG. 62, a bit depth of attribute information is 16-bit. The attribute information is in increments of 255, that is, a multiple of 255. In this case, transformer 13901A executes, as a scaling process, a division with scale=255 or a multiplication with scale=1/255 on the attribute information, thereby generating transformed attribute information having a bit depth of 8-bit.

As seen from the above, transformer 13901A can transform the attribute information having a bit depth of 16-bit into the 8-bit transformed attribute information. This enables encoder 13902 to handle a value smaller in size than the 16-bit attribute information, thus increasing compression efficiency.

Note that transformer 13901A need not check the precision of the attribute information. For example, in the case where a resolution of attribute information to be encoded is known according to a standard for a format of the attribute information, transformer 13901A may determine a scale value (scale) according to the rule.

Alternatively, for example, even when the scaling brings the attribute information into a range of 8 bits, transformer 13901A may output the 16-bit attribute information with the upper 8 bits remaining invalid (zero-padded), as the transformed attribute information, without changing the bit depth to 8-bit.

Although the specific example is described about the case of 16-bit attribute information, the same method is applicable to attribute information having any bit depth.

Transformer 13901A may further include an offset unit that performs an offset process. In this case, the offset process may be performed after the scaling process or may be performed before the scaling process.

Transformer 13901A may change the scale value for each encoding group unit such as a slice, tile, and frame. Transformer 13901A may change the scale value for each type of attribute information. Transformer 13901A thus can use the scale value being a value that differs among the units or the types.

A specific example of a process by inverse transformer 13912 in the second example will be described below. FIG. 63 is a diagram illustrating an example of a process by inverse transformer 13912. In the example illustrated in FIG. 63, a bit depth of the decoded attribute information is 8-bit. Inverse transformer 13912 executes a multiplication with scale=255 on the decoded attribute information, thereby generating attribute information having a bit depth of 16-bit in which its upper 8 bits are effective.

As seen from the above, three-dimensional data decoding device 13910 can reproduce original attribute information by decoding the bitstream generated by three-dimensional data encoding device 13900A described above. In short, three-dimensional data decoding device 13910 can decode a bitstream with an increased compression efficiency.

In the above-described manner, inverse transformer 13912 included in three-dimensional data decoding device 13910 can reproduce attribute information yet to be subjected to the transform by transformer 13901A included in three-dimensional data encoding device 13900A by executing an inverse transform process based on transform information included in a bitstream. Three-dimensional data decoding device 13910 need not necessarily execute the inverse transform process. Three-dimensional data decoding device 13910 may select, based on an application or a use case, whether to perform the inverse transform process.

Although the specific example is described about the case of 16-bit attribute information, the same method is applicable to attribute information having any bit depth.

Inverse transformer 13912 may further include an inverse offset unit that performs an inverse offset process. In this case, an inverse scaling process may be performed after the inverse offset process or may be performed before the inverse offset process.

Inverse transformer 13912 may change the scale value for each encoding group unit such as a slice, tile, and frame, to perform an inverse-transform. Inverse transformer 13912 may change the scale value for each type of attribute information. Inverse transformer 13912 thus can use the scale value being a value that differs among the units or the types.

The above description provides an example in which transformer 13901A divides the attribute information by a value of 255, scale=255 is stored in the additional information, and the attribute information is multiplied by the value of 255 obtained by inverse transformer 13912 analyzing the additional information. However, three-dimensional data encoding device 13900A may store, in the additional information, the value by which inverse transformer 13912 divides the attribute information.

A procedure of the process by three-dimensional data encoding device 13900A in the second example is substantially the same as the procedure according to the flowchart in the first example illustrated in FIG. 59. Note that, in the second example, three-dimensional data encoding device 13900A checks in step S13902 resolutions of items of attribute information of all three-dimensional points included in point cloud data to be encoded. A procedure of the process by three-dimensional data decoding device 13910 in the second example is the same as the procedure according to the flowchart in the first example illustrated in FIG. 60.

Figure 64:
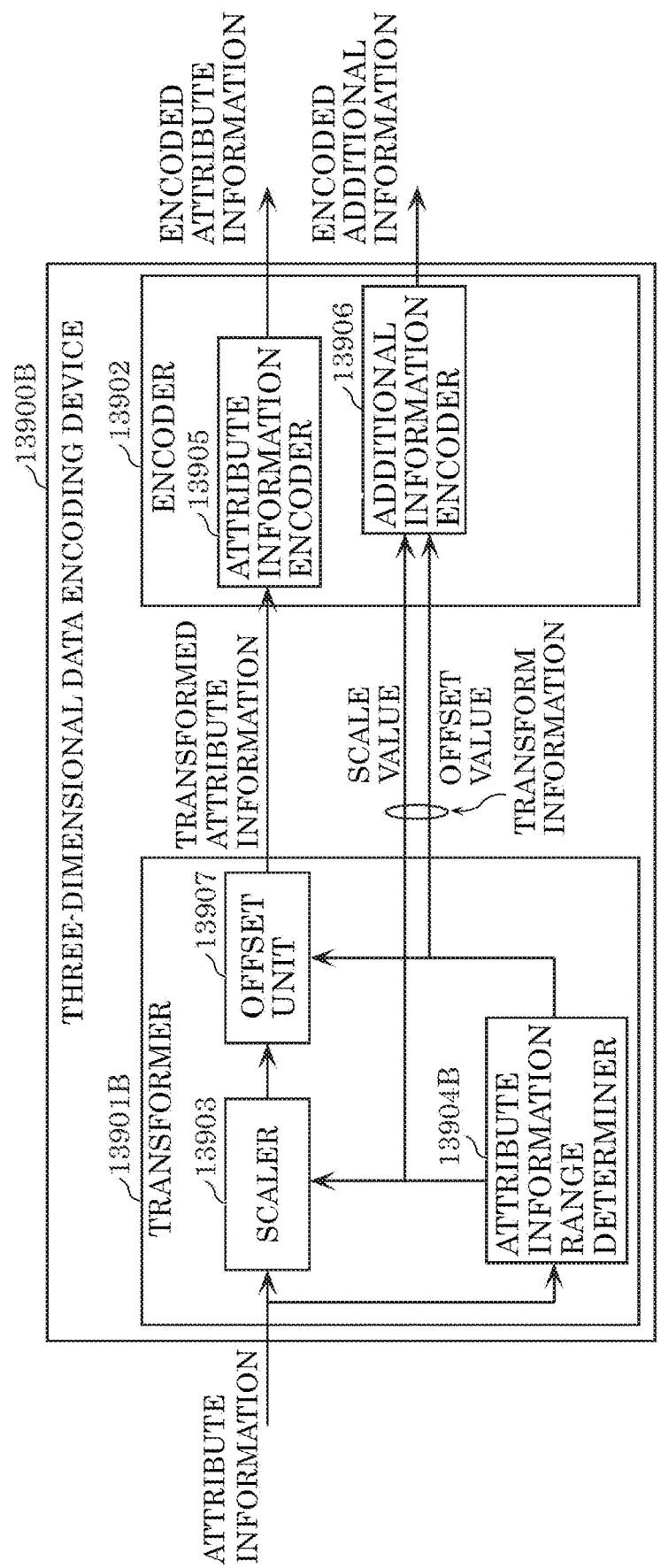
FIG. 64 is a block diagram illustrating the configuration of a three-dimensional data encoding device according to a third example of Embodiment 4.

A third example of a transformer and an inverse transformer will be described below. FIG. 64 is a block diagram illustrating a configuration of three-dimensional data encoding device 13900B according to the third example. Note that the figure illustrates processors relating mainly to encoding attribute information and omits illustration of processors relating to encoding position information.

When three-dimensional data encoding device 13900B illustrated in FIG. 64 is compared with three-dimensional data encoding device 13900 illustrated in FIG. 51, transformer 13901B differs in configuration from transformer 13901. Specifically, transformer 13901B includes attribute information range determiner 13904B in place of attribute information precision determiner 13904. Transformer 13901B further includes offset unit 13907.

Attribute information range determiner 13904B determines a range of a value of attribute information to be encoded. Attribute information range determiner 13904B determines to perform at least one of a scaling process and an offset process in the case where the range of the value of the attribute information exceeds allowances of the system or in the case where it is determined that the range of the value results in a low efficiency. In addition, attribute information range determiner 13904B performs at least one of determination of a scale value (scale) used in division, multiplication, or bit shifting and determination of an offset value (offset) used in addition or subtraction so as to bring a range of a value of transformed attribute information between the allowances of the system or to improve the efficiency. Here, the low efficiency means the case where data amount can be reduced by the scaling or offset process, for example, the case where the data amount can be reduced by the offset process as in an example illustrated in FIG. 67 described later.

Scaler 13903 performs a scaling (multiplication or division) on the attribute information using the scale value determined by attribute information range determiner 13904B, thereby generating scaled attribute information.

Offset unit 13907 executes an offset (addition or subtraction) on the scaled attribute information using the offset value determined by attribute information range determiner 13904B, thereby generating transformed attribute information.

Encoder 13902 includes attribute information encoder 13905 and additional information encoder 13906. Attribute information encoder 13905 generates encoded attribute information by encoding the transformed attribute information. Additional information encoder 13906 generates encoded additional information by encoding, as additional information, transform information including the scale value and the offset value. The encoded attribute information and the encoded additional information is included in a bitstream output by three-dimensional data encoding device 13900B.

Note that a configuration of three-dimensional data decoding device 13910 that decodes the bitstream generated by three-dimensional data encoding device 13900B is substantially the same as the configuration illustrated in FIG. 52. Note that inverse transformer 13912 performs an inverse offset process in addition to an inverse scaling process on decoded attribute information to generate attribute information.

A specific example of a process by transformer 13901B in the third example will be described below. Transformer 13901B checks ranges of values of all items of attribute information to be encoded (items of attribute information of Point 0 to Point n). FIG. 65, FIG. 66, and FIG. 67 are diagrams illustrating examples of the process by transformer 13901B. The example illustrated in FIG. 65 is of the case where a bit depth that can be supported by the system is 16-bit, and a maximum bit depth of attribute information is 17-bit. In this case, the bit depth of the attribute information overflows the range supported by the system by 1 bit. Transformer 13901B thus generates transformed attribute information having a bit depth of 16-bit by executing a division with scale=2, a multiplication with scale=1/2, or a right shift operation with scale=1 bit on the attribute information so as to bring a value of the transformed attribute information within the range.

The example illustrated in FIG. 66 is of the case where a bit depth that can be supported by the system is unsigned 16-bit, and a minimum value of attribute information is −5027. In this case, the value of the attribute information goes beyond the range supported by the system in a negative direction by 5027. Transformer 13901B thus generates transformed attribute information having a bit depth of unsigned 16-bit by executing an addition with offset=5027 on the attribute information so as to bring a value of the transformed attribute information within the range.

The example illustrated in FIG. 67 is of the case where a value that can be supported by the system is an unsigned integer value, and attribute information is a 64-bit floating point number. In this case, transformer 13901B executes a multiplication with scale=100000 on the attribute information to transform the attribute information to an integer value. Transformer 13901B further executes an addition with offset=−2312000 on the multiplied attribute information to reduce a data amount. Attribute information having a bit depth of unsigned 8-bit is thereby generated.

As seen from the above, three-dimensional data encoding device 13900B can transform attribute information having a value exceeding the range that can be supported by the system to transformed attribute information having a value within the range by the scaling process or the offset process.

Note that three-dimensional data encoding device 13900B may execute the scaling process for the purpose of quantization for reducing the data amount. In this case, the larger the scale value is, the larger a quantization error in an inverse-transform is, but the more the data amount can be reduced accordingly.

In the case where, for example, a range of attribute information to be encoded is fixed according to a standard for a format of the attribute information, transformer 13901B may determine the scale value (scale) and the offset value (offset) according to the rule, without checking the range of the attribute information.

Although the specific example is described about the case of 16-bit or 64-bit floating-point attribute information, the same method is applicable to attribute information having any bit depth.

When performing a process equivalent to division in the scaling process, transformer 13901B may perform rounding addition. Here, the rounding addition refers to a rounding process in which a rounding-down or rounding-up process is performed on one or more least significant bits.

The above description is given of the case where the offset process is performed after the scaling process. However, the scaling process may be performed after the offset process.

Transformer 13901B may change the scale value and the offset value for each encoding group unit such as a slice, tile, and frame. Transformer 13901B may change the scale value and the offset value for each type of attribute information. Transformer 13901B thus can use the scale value being a value that differs among the units or the types.

A specific example of a process by inverse transformer 13912 in the third example will be described below. FIG. 68, FIG. 69, and FIG. 70 are diagrams illustrating examples of the process by inverse transformer 13912. In the example illustrated in FIG. 68, inverse transformer 13912 inverse-transforms decoded attribute information having a bit depth of 16-bit using a scale value included in additional information. Specifically, inverse transformer 13912 executes a multiplication with scale=2 or a left shift operation with scale=1 bit on the decoded attribute information, thereby generating attribute information having a bit depth of 17-bit.

In the example illustrated in FIG. 69, a bit depth of the decoded attribute information is unsigned 16-bit. Inverse transformer 13912 inverse-transforms the decoded attribute information using an offset value included in additional information. Specifically, inverse transformer 13912 executes an addition with offset=−5027 on the decoded attribute information, thereby generating attribute information having a bit depth of signed 16-bit.

In the example illustrated in FIG. 70, a bit depth of the decoded attribute information is unsigned 8-bit. Inverse transformer 13912 inverse-transforms the decoded attribute information using an offset value and a scale value included in additional information. Specifically, inverse transformer 13912 executes an addition with offset=2312000 on the decoded attribute information and executes a multiplication with scale=1/100000 on the value subjected to the addition, thereby generating 64-bit floating-point attribute information.

As seen from the above, three-dimensional data encoding device 13900B can transform attribute information having a value exceeding the range that can be supported by the system to transformed attribute information having a value within the range by the scaling process or the offset process. In addition, three-dimensional data decoding device 13910 can reproduce original attribute information by decoding compressed data generated in this manner.

A scaling process may be executed for the purpose of quantization for reducing the data amount. In this case, the larger the scale value is, the larger a quantization error of attribute information reproduced by the inverse-transform is, but the more the data amount can be reduced accordingly.

In the above-described manner, inverse transformer 13912 included in three-dimensional data decoding device 13910 can reproduce attribute information yet to be subjected to the transform by transformer 13901B included in three-dimensional data encoding device 13900B by executing an inverse transform process based on transform information included in a bitstream. Three-dimensional data decoding device 13910 need not necessarily execute the inverse transform process. Three-dimensional data decoding device 13910 may select, based on an application or a use case, whether to execute the inverse transform process.

Although the specific example is described about the case of 16-bit attribute information, the same method is applicable to attribute information having any bit depth. When performing a process equivalent to division in the inverse scaling process, three-dimensional data decoding device 13910 may perform rounding addition.

The inverse scaling process may be performed after the inverse offset process or may be performed before the inverse offset process.

Inverse transformer 13912 may change the scale value and the offset value for each encoding group unit such as a slice, tile, and frame, to perform an inverse-transform. Inverse transformer 13912 may change the scale value and the offset value for each type of attribute information. Inverse transformer 13912 thus can use the scale value and the offset value each being a value that differs among the units or the types.

Figure 71:
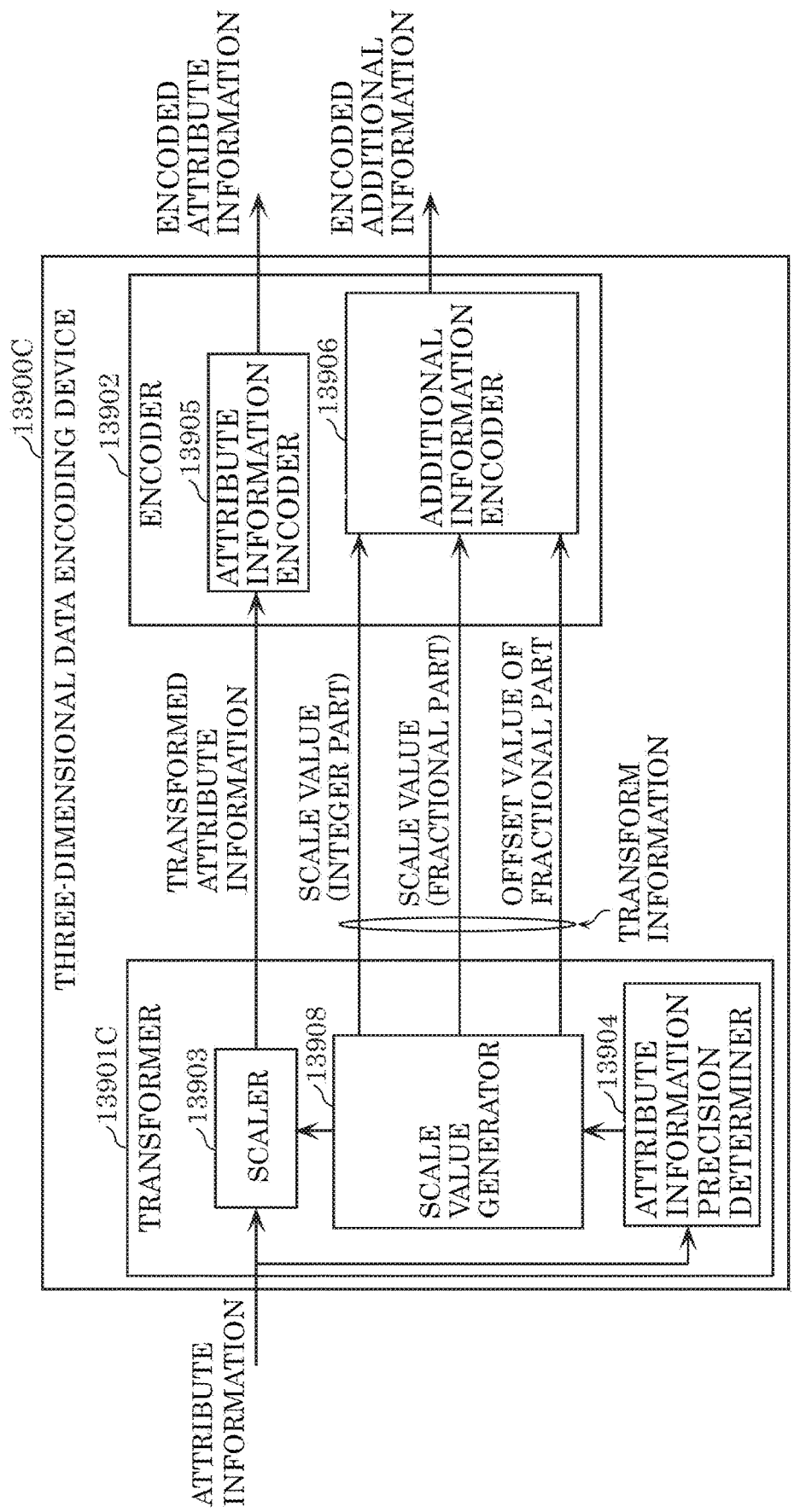
FIG. 71 is a block diagram of a three-dimensional data encoding device according to a fourth example of Embodiment 4.

Next, a fourth example of a transformer and an inverse transformer will be described. FIG. 71 is a block diagram illustrating a configuration of three-dimensional data encoding device 13900C according to the fourth example. Note that the figure illustrates processors relating mainly to encoding attribute information and omits illustration of processors relating to encoding position information.

When three-dimensional data encoding device 13900C illustrated in FIG. 71 is compared with three-dimensional data encoding device 13900 illustrated in FIG. 51, transformer 13901C differs in configuration from transformer 13901. Specifically, transformer 13901C further includes scale value generator 13908.

Scale value generator 13908 generates, from a fractional-precision scale value determined by attribute information precision determiner 13904, a value of an integer part of the scale value, a value of a fractional part of the scale value, and an offset value of the fractional part of the scale value that represent the scale value.

Additional information encoder 13906 encodes, as additional information, transform information including the value of the integer part of the scale value, the value of the fractional part of the scale value, and the offset value of the fractional part of the scale value, which are generated by scale value generator 13908. The additional information is included in a bitstream and sent to a three-dimensional data decoding device.

Figure 72:
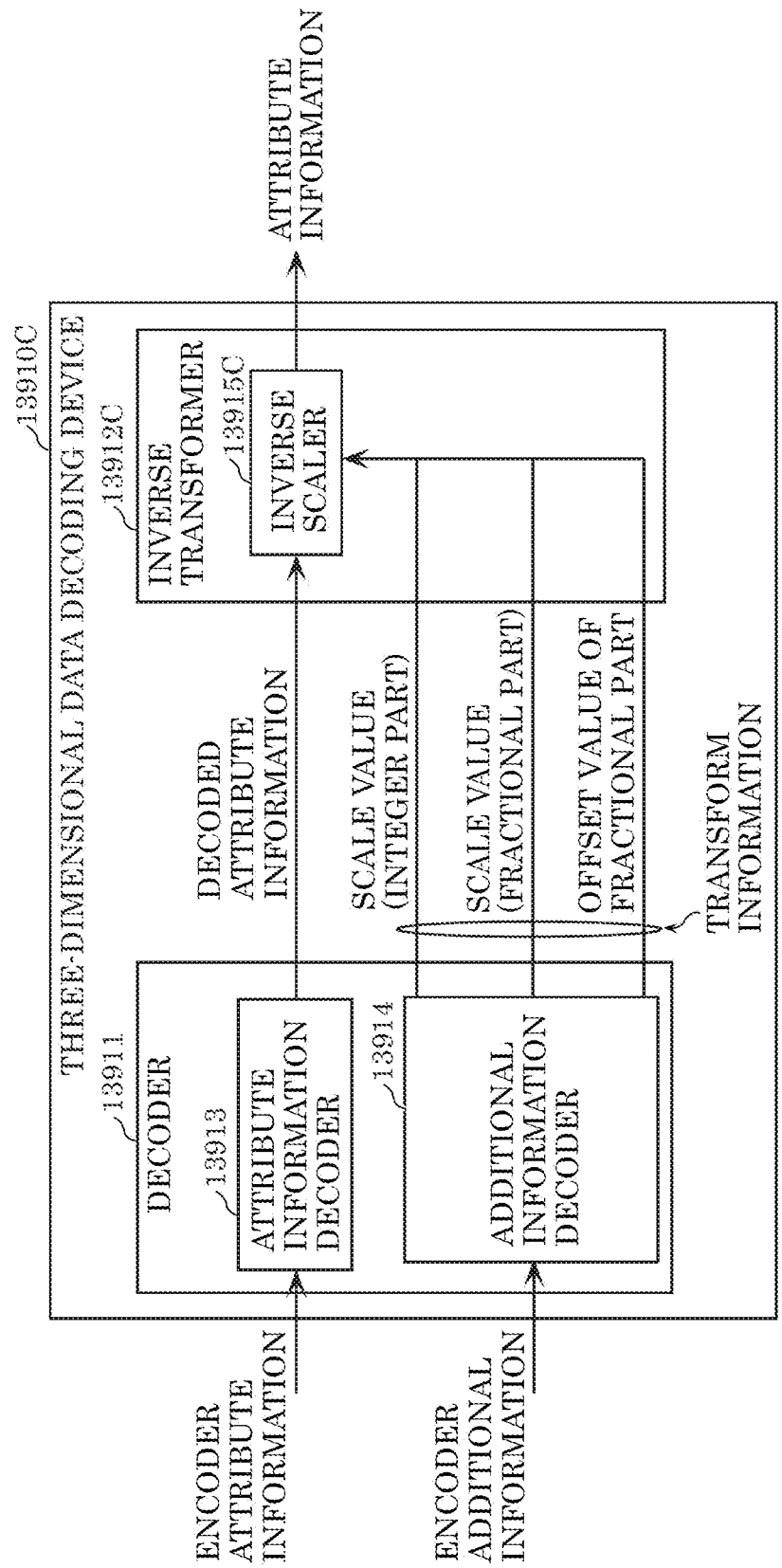
FIG. 72 is a block diagram of a three-dimensional data decoding device according to a fourth example of Embodiment 4.

FIG. 72 is a block diagram illustrating a configuration of three-dimensional data decoding device 13910C according to the fourth example. Note that the figure illustrates processors relating mainly to decoding attribute information and omits illustration of processors relating to decoding position information.

When three-dimensional data decoding device 13910C illustrated in FIG. 72 is compared with three-dimensional data decoding device 13910 illustrated in FIG. 52, inverse scaler 13915C included in inverse transformer 13912C differs in function from inverse scaler 13915.

Additional information decoder 13914 decodes encoded additional information included in a bitstream, thereby generating a value of an integer part of a scale value, a value of a fractional part of the scale value, and an offset value of the fractional part of the scale value. Inverse scaler 13915C calculates the scale value using the value of the integer part of the scale value, the value of the fractional part of the scale value, and the offset value of the fractional part of the scale value. Inverse scaler 13915C performs an inverse scaling on the decoded attribute information using the calculated scale value, thereby generating the attribute information.

A specific example of a process by transformer 13901C in the fourth example will be described below. For example, as illustrated in FIG. 53 and FIG. 55 or FIG. 62 and FIG. 63, in the case of an example in which attribute information is divided by scale=255 in three-dimensional data encoding device 13900C, and decoded attribute information is multiplied by scale=255 in three-dimensional data decoding device 13910C, a scale value (scale) can be given as the following (Equation a2) with scale_int being an integer part of the scale value, scale_frac being a fractional part of the scale value, and scale_frac_offset being an offset value of the fractional part of the scale value.

[Math. 2]
$$\text{scale} = \frac{\text{scale\_int}}{(1 \ll \text{scale\_frac}) - \text{scale\_frac\_offset}} \quad \text{(Equation a2)}$$

Here, scale_int=255, scale_frac=0, and scale_frac_offset=0 give scale=255.

Alternatively, a value obtained by interchanging the numerator and the denominator of the above (Equation a2) may be defined as scale. For example, scale_int=1, scale_frac=8, and scale_frac_offset=1 may give scale=1/255.

Note that the scale value may be derived from the following (Equation a3). In this case, scale_int=255 and scale_frac=0 give scale=255.

[Math. 3]
$$\text{scale} = \frac{\text{scale\_int}}{(1 \ll \text{scale\_frac})} \quad \text{(Equation a3)}$$

Note that three-dimensional data encoding device 13900C and three-dimensional data decoding device 13910C may constantly use any one of (Equation a2) and (Equation a3) or may selectively use one of (Equation a2) and (Equation a3) by switching between (Equation a2) and (Equation a3).

In the above-described manner, three-dimensional data encoding device 13900C can encode attribute information having a bit depth of 16-bit as 8-bit attribute information and thus can handle values smaller than in the case where 16-bit attribute information is encoded. Accordingly, compression efficiency can be increased. In addition, three-dimensional data encoding device 13900C can execute a scaling that needs a fractional precision.

Three-dimensional data decoding device 13910C can reproduce original attribute information by decoding the bitstream generated by three-dimensional data encoding device 13900C.

Inverse transformer 13912C included in three-dimensional data decoding device 13910C can reproduce attribute information yet to be subjected to the transform by transformer 13901C included in three-dimensional data encoding device 13900C by executing an inverse transform process on decoded attribute information based on transform information included in a bitstream. Note that three-dimensional data decoding device 13910C need not necessarily execute the inverse transform process. Three-dimensional data decoding device 13910C may select, based on an application or a use case, whether to execute the inverse transform process.

The description is here given of the example in which three-dimensional data encoding device 13900C includes, as in the first example, attribute information precision determiner 13904 that determines a precision of attribute information to be encoded. However, three-dimensional data encoding device 13900C may include, as in the second example or the third example, attribute information resolution determiner 13904A that determines a resolution of attribute information or attribute information range determiner 13904B that determines a range of attribute information.

Transformer 13901C need not check the precision of the attribute information. For example, in the case where a position of effective bits of attribute information to be encoded is fixed according to a standard for a format of the attribute information, transformer 13901C may determine a scale value (scale) according to the rule.

Alternatively, even when the scaling brings the attribute information into a range of 8 bits, transformer 13901C may output the 16-bit attribute information with the upper 8 bits remaining invalid (zero-padded), as the transformed attribute information, without changing the bit depth to 8-bit.

Although the specific example is described about the case of 16-bit attribute information, the same method is applicable to attribute information having any bit depth.

Transformer 13901C may further include an offset unit that performs an offset process. In this case, the offset process may be performed after the scaling process or may be performed before the scaling process.

Transformer 13901C may change the scale value for each encoding group unit such as a slice, tile, and frame. Transformer 13901C may change the scale value for each type of attribute information. Transformer 13901C thus can use the scale value being a value that differs among the units or the types.

Inverse transformer 13912C may further include an inverse offset unit that performs an inverse offset process. In this case, an inverse scaling process may be performed after the inverse offset process or may be performed before the inverse offset process.

Inverse transformer 13912C may change the scale value for each encoding group unit such as a slice, tile, and frame, to perform an inverse-transform. Inverse transformer 13912C may change the scale value for each type of attribute information. Inverse transformer 13912C thus can use the scale value being a value that differs among the units or the types.

Any two or more of the first example to the fourth example may be combined. To geometry information, as with attribute information, any one method of the first example to fourth example or a method for which any two or more of the first example to fourth example are combined may be applied. In this case, the transform information, format information, or the like may be stored in additional information such as an SPS.

A fifth example of a transformer and an inverse transformer will be described below. The transformer may include an offset calculator. The offset calculator calculates an offset component of the entire attribute information. The transformer may offset the attribute information using the calculated offset component (offset value). The offset calculator may calculate the offset component using attribute information of the entire sequence or may calculate the offset component for each frame using attribute information in the frame.

Figure 73:
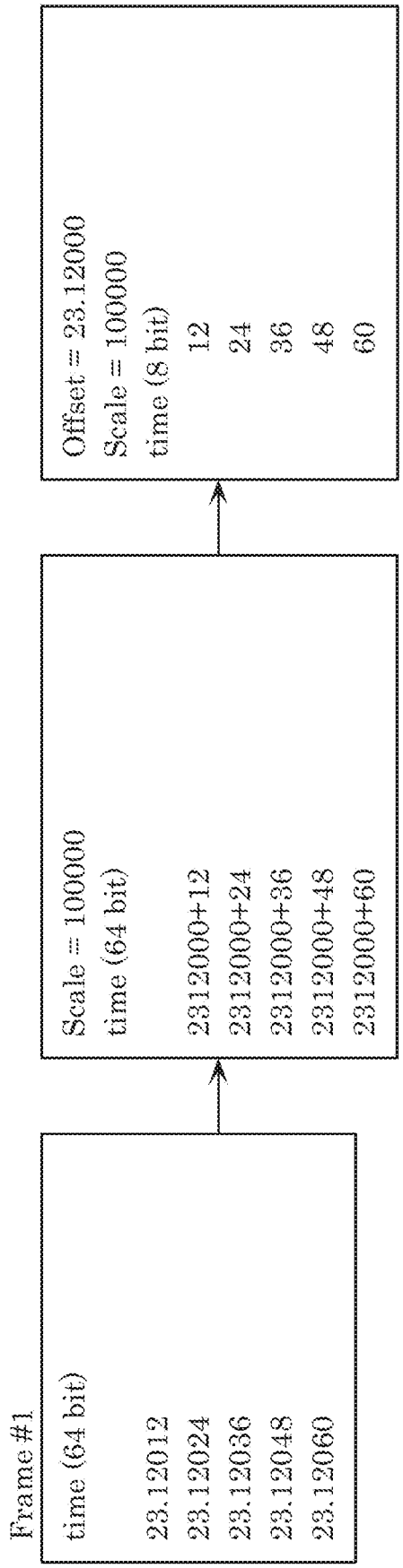
FIG. 73 is a diagram illustrating an example of processing performed by a transformer according to a fifth example of Embodiment 4.

FIG. 73 is a diagram illustrating an example of a process of the transform. In the example illustrated in FIG. 73, attribute information is 64-bit time information (time), and the transformer calculates an offset component for each frame. In Frame #1, one item of time information (gps_time) is added to one point as the attribute information, and points are arranged in ascending order of time. The times may be time points at which the points are obtained or may be information of differences with respect to an arbitrary reference.

In the example illustrated in FIG. 73, the transformer performs a scaling with 100000 on items of time information of a plurality of points, then calculates a component of 2312000 that are common to all the points as the offset component, and offsets the offset component from the items of time information subjected to the scaling.

Thus, the attribute information can be transformed to information of 8-bit positive values. As seen from the above, transforming 64-bit information to 8-bit positive values can reduce a code amount.

In the case where values of the attribute information monotonously increase or monotonously decrease, the three-dimensional data encoding device may encode difference values from previous points. In the case where all of the difference values are the same, the three-dimensional data encoding device may add the difference values to additional information and send the additional information. Thus, the three-dimensional data encoding device need not encode the attribute information for each point. That is, the three-dimensional data encoding device need not add attribute information for each point in a bitstream.

An example of a method for storing transform information will be described below. attribute_parameter(i), which is transform information including the scale value and offset value described above, may be stored in an SPS or may be stored in information other than an SPS. For example, the transform information may be stored in another type of additional information such as a slice header and an attribute parameter set (APS), which is a parameter set concerning encoding attribute information. Alternatively, the transform information may be stored in additional information such as supplemental enhancement information (SEI).

Figure 74:
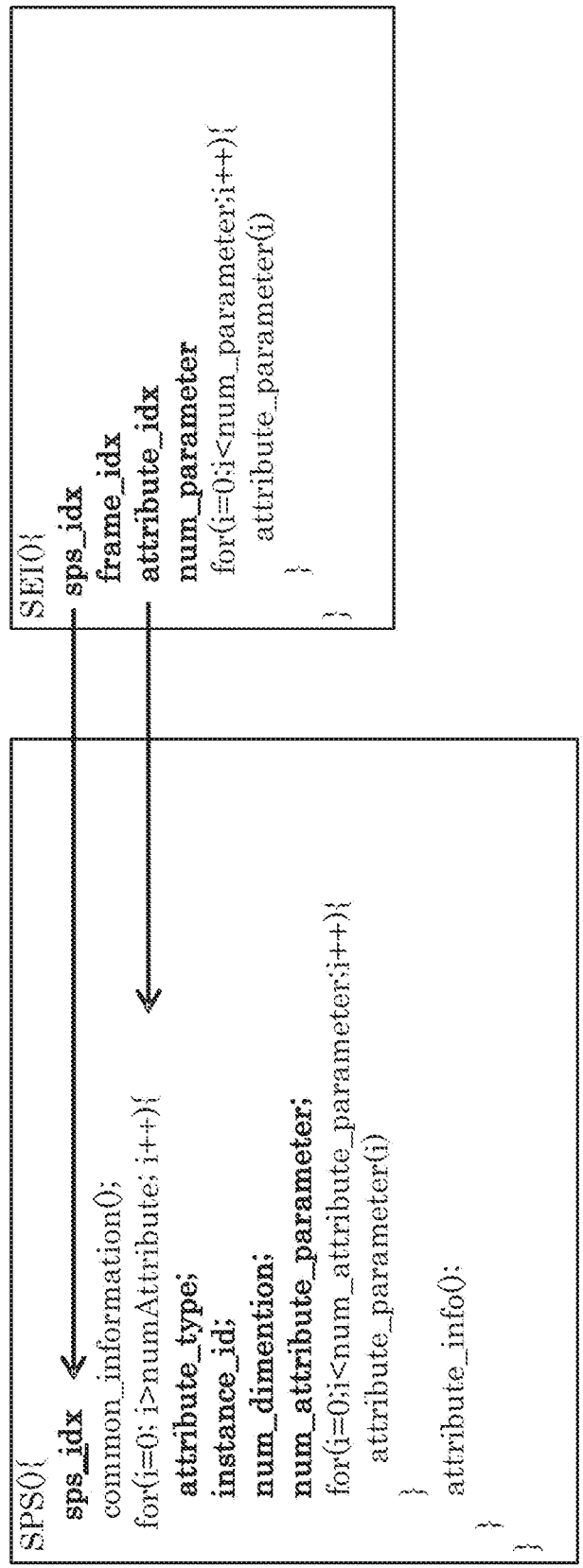
FIG. 74 is a diagram illustrating examples of syntax of SPS and SEI according to Embodiment 4.

FIG. 74 is a diagram illustrating a syntax example of an SPS and SEI. As illustrated in FIG. 74, in the case where transform information is stored in SEI, the SEI includes sps_idx and attribute_idx. The three-dimensional data decoding device thus can identify corresponding attribute information that is described in the SPS. Here, attribute_idx indicates that the SEI corresponds to an item of attribute information that is indicated attribute_idx-th of a plurality of items of attribute information indicated in a loop of numAttribute in the SPS. Therefore, the three-dimensional data decoding device can determine that a current item of attribute information corresponding to SEI corresponds to an item of attribute information indicated attribute_idx-th of a plurality of attribute information indicated in a loop of numAttribute in an SPS that has the same sps_idx as sps_idx included in the SEI.

In the case where transform information is included in an SPS, the transform information is applied to a value of attribute information of the entire sequence. In the case where transform information is present in frame-level (frame-based) SEI that is provided for each frame, the transform information may be applied to a value of the attribute information of the frame.

In the case where items of transform information are present in both an SPS and frame-level SEI, the item of transform information indicated in the frame-level SEI may be applied. Alternatively, both the items of transform information indicated in the SPS and the frame-level SEI may be applied. That is, frame-level SEI including transform information need not be provided in all frames and may be provided in some of the frames.

In the case where items of transform information are present in both an SPS and frame-level SEI, a processing amount of an analyzing process on the transform information in the three-dimensional data decoding device by applying the item of transform information in the SPS, that is, by giving a higher priority to the SPS. Alternatively, the three-dimensional data encoding device may store, in a bitstream, information for indicating which of the SPS and the frame-level SEI a higher priority is given to.

In the case where items of transform information are present in both an SPS and frame-level SEI, the three-dimensional data encoding device may set an average value of a plurality of transform coefficients of a plurality of SEIs to a transform coefficient of an SPS. Thus, in the case where SEI is lost because of communication error or the like, the three-dimensional data decoding device can perform the process using the transform information included in the SPS instead. In addition, a difference in a result of the process in this case can be reduced.

There may be different levels of parameter sets (PSs) provided, such as a frame-level PS, a sequence-level PS, and a PCC sequence-level PS, which includes a plurality of sequences. In this example, the PCC sequence level is the highest level, the sequence level is the next highest level, and the frame level is the lowest level. In the case where there are a plurality of levels in this manner, the transform information may be stored in a method described below.

Default transform information is stored in a higher-level PS. The default transform information is transform information used when transform information is not used for a lower-level PS. The default transform information is transform information that can be used at a plurality of lower levels. In the case where transform information used at a lower level is different from transform information included in a higher-level PS, the transform information used at the lower level is stored in a lower-level PS.

Alternatively, no transform information is stored in a higher-level PS, and transform information may be stored in a lower-level PS.

Alternatively, information indicating whether transform information is stored in a lower-level PS, stored in a higher-level PS, or stored in both the lower-level PS and the higher-level PS may be stored in one or both of the lower-level PS and the higher-level PS.

Information included in a lower-level PS may be included in a higher-level PS. In the case where a lower-level PS overlaps with a higher-level PS, any one of the lower-level PS and the higher-level PS need not be included in a bitstream.

Figure 75:
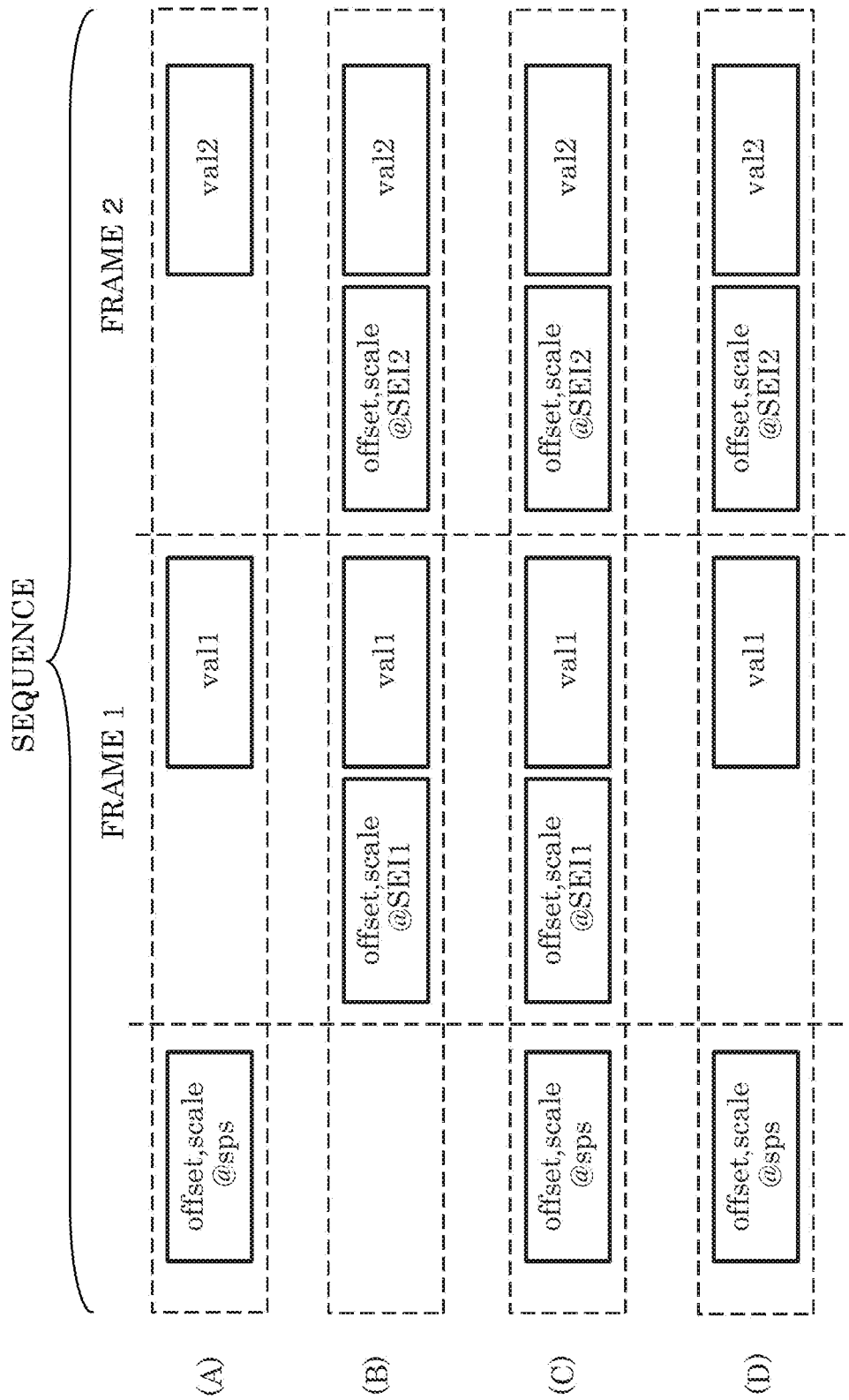
FIG. 75 is a diagram illustrating an example of storing transform information according to Embodiment 4.

FIG. 75 is a diagram illustrating an example of storing transform information. An example illustrated in (A) in FIG. 75 is an example in which transform information is present in an SPS, and no transform information is present in SEI. val1 is a value that is attribute information subjected to decoding and belonging to frame 1 (decoded attribute information), and val2 is a value that is attribute information subjected to decoding and belonging to frame 2 (decoded attribute information). Transformed attribute information val1' and val2' can be derived as follows with transform information in an SPS (offset@sps and scale@sps).

$$val1'=val1 \times scale@sps+offset@sps$$

$$val2'=val2 \times scale@sps+offset@sps$$

(B) in FIG. 75 is an example in which no transform information is present in an SPS, and transform information is present in frame-level SEI. In this case, transformed attribute information val1' and val2' can be derived as follows with transform information in SEI1 of frame 1 (offset@SEI1 and scale@SEI1) and transform information in SEI2 of frame 2 (offset@SEI2 and scale@SEI2).

$$val1'=val1 \times scale@SEI1+offset@SEI1$$

$$val2'=val2 \times scale@SEI2+offset@SEI2$$

(C) in FIG. 75 is an example in which items of transform information are present in both an SPS and SEI. In this case, transformed attribute information val1' and val2' can be derived as follows with transform information in the SEI.

$$val1'=val1 \times scale@SEI1+offset@SEI1$$

$$val2'=val2 \times scale@SEI2+offset@SEI2$$

Alternatively, transformed attribute information val1' and val2' can be derived as follows with both the transform information in the SPS and the transform information in the SEI.

$$val1'=val1 \times scale@SPS \times scale@SEI1+offset@SPS+offset@SEI1$$

$$val2'=val2 \times scale@SPS \times scale@SEI2+offset@SPS+offset@SEI2$$

(D) in FIG. 75 is an example in which transform information is present in an SPS, and there are a frame in which transform information is present in SEI and a frame in which no transform information is present in SEI. In this example, sequence-level transform information is present in SPS, and presence or absence of frame-level transform information depends on each frame. In this case, for a frame in which frame-level transform information is present, the frame-level transform information is applied to a value of attribute information of the frame. For a frame in which frame-level transform information is not present, sequence-level transform information is applied. For example, transformed attribute information val1' of frame 1 in which frame-level SEI is not present can be derived as follows with transform information of the SPS.

$$val1'=val1 \times scale@SPS+offset@SPS$$

Transformed attribute information val2' of frame 2 in which frame-level SEI is present can be derived as follows with transform information of the SEI.

$$val2'=val2 \times scale@SEI2+offset@SEI2$$

Note that the description is here given of an example of a transform and an inverse-transform of attribute information, the same technique can be used in a transform and an inverse-transform of geometry information.

In the case where an encoder and a decoder for geometry information or attribute information are defined as supporting encoding of a predetermined format (e.g., a positive integer in a predetermined number or less of bits), when encoding or decoding items of point cloud data constituted by one or more predefined point cloud formats, the three-dimensional data encoding device notifies the three-dimensional data decoding device of format information using SEI, which is extended information. Thus, using the format information, the three-dimensional data decoding device can transform decoded items of point cloud data to items of point cloud data in the point cloud formats yet to be subjected to encoding. In the case where items of point cloud data in two or more different point cloud formats are encoded, the three-dimensional data encoding device storing format information for each of the point cloud formats in SEI enables the three-dimensional data decoding device can reproduce items of point cloud data in the respective point cloud formats.

For example, in the case where attribute information to be encoded is a normal vector (Normal Vector), is data ranging from −1.000 to 1.000, and is three-dimensional data expressed as a floating point number, transformer 13901B and inverse transformer 13912 in the third example are used to transform the attribute information to a positive integer and inverse-transform the transformed attribute information. Thus, a compressing process of point cloud data by encoder 13902 and decoder 13911 that support processing of a positive integer in a predetermined number or less of bits can be implemented.

In the case where attribute information to be encoded is constituted by data that has a predetermined bit length and in which some bits are effective bits, the compressing process of point cloud data using encoder 13902 and decoder 13911 can be implemented by using transformer 13901 and inverse transformer 13912 in the first example.

In the case where attribute information to be encoded is, for example, data that is constituted by multiples of a predetermined value, such as values of attribute information that are all reflectivities being multiples of 255, the compressing process of point cloud data using encoder 13902 and decoder 13911 can be implemented by using transformer 13901A and inverse transformer 13912 in the second example.

In the case where attribute information to be encoded can be expressed as relative values with respect to a reference value, such as timestamps (timestamp), a compressing process of point cloud data using the encoder and the decoder can be implemented by using the transformer and the inverse transformer in the fifth example.

Further, the three-dimensional data encoding device can reduce information amount by offsetting the reference value and encoding differences from the reference value.

As seen from the above, the present embodiment is useful for an application that transforms various formats for point cloud data and performs encoding and decoding using a general-purpose encoding scheme and a general-purpose decoding scheme. For example, in point cloud data in augmented reality (AR) and virtual reality (VR), a plurality of items of color information, normal vectors, and the like may be added to points as items of attribute information. Therefore, efficient decoding and encoding can be implemented by using the method described above. In the case where decoded point cloud data is presented with a presenting device such as a display device, the three-dimensional data decoding device may output the decoded point cloud data to the presenting device as it is without performing an inverse-transform.

In point cloud data obtained with LiDAR and three-dimensional map data obtained based on LiDAR, reflectivities or timestamps may be added to points. In this case, efficient decoding and encoding can also be implemented by using the method described above.

Although an example in which format information or transform information is stored in additional information (various types of parameter sets, SEI, inventory, etc.) included in a bitstream is described, the method for storing format information or transform information is not limited to this. For example, format information or transform information may be sent to the three-dimensional data decoding device in another format rather than being stored in a bitstream. For example, the three-dimensional data encoding device may store transform information in data or a file, other than a bitstream, in a data format that is separately defined in another standard or the like and send the data or the file to the three-dimensional data decoding device together with the bitstream. At this time, means for transmitting the bitstream and means for transmitting the data including the transform information may be the same or different from each other.

In the case where transform information is predetermined and known, the three-dimensional data encoding device need not send the transform information to the three-dimensional data decoding device. Alternatively, the three-dimensional data encoding device may send an identifier that represents the transform information to the three-dimensional data decoding device.

Figure 76:
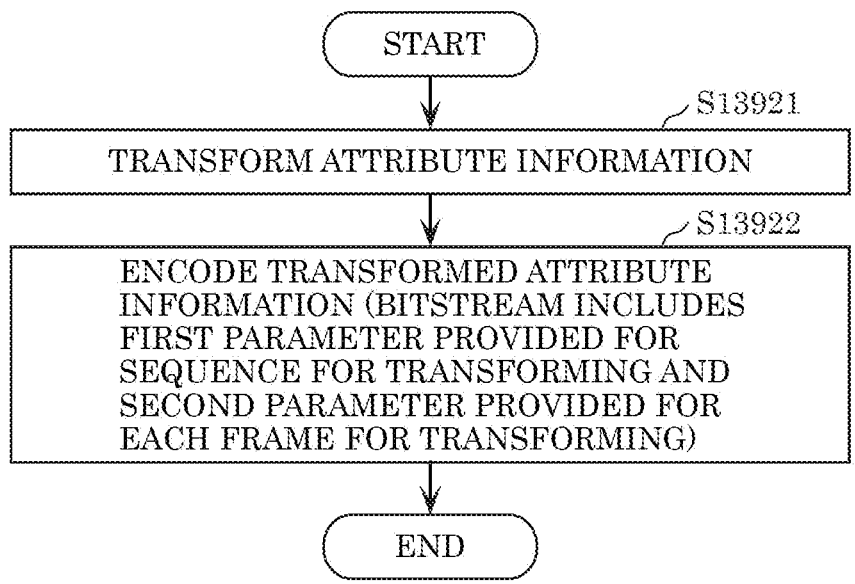
FIG. 76 is a flowchart of three-dimensional data encoding processing according to Embodiment 4.

As described above, the three-dimensional data encoding device according to the present embodiment performs the process illustrated in FIG. 76. The three-dimensional data encoding device transforms attribute information of a three-dimensional point in at least one frame among frames constituting a sequence (S13921); and encodes the attribute information transformed to generate a bitstream (S13922). The bitstream further includes: at least one first parameter (for example, offset,scale@sps in FIG. 75) provided for the sequence for the transforming; and at least one second parameter (for example, offset,scale@SEI1 and offset, scale@SEI2 in FIG. 75) provided for each of the at least one frame for the transforming. Specifically, the three-dimensional data encoding device stores a first parameter and a second parameter into a bitstream.

For example, a bitstream includes sequence-based first control information (e.g., SPS) and frame-based second control information (frame-level SEI). The first control information includes at least one first parameter, and the second control information includes at least one second parameter. That is, the three-dimensional data encoding device stores the first parameter in the first control information and stores the second parameter in the second control information.

Accordingly, in the three-dimensional data encoding device, for example, switching the parameter of the transforming between the sequence-based parameter and the frame-based parameter can be selectively controlled. Accordingly, an appropriate transform process can be performed, thus enabling improvement in coding efficiency.

It should be noted that first control information including at least one first parameter and second control information including at least one second parameter may be set for each property (component).

For example, in a three-dimensional data decoding device that decodes the attribute information from the bitstream, when the at least one second parameter corresponding to a current frame to be processed is included in the bitstream, the at least one second parameter is used, the current frame being included in the frames. In other words, the three-dimensional data encoding device stores, in the bitstream, the second parameter which is the parameter used in the transforming processing of the attribute information of the current frame.

Note that the three-dimensional data encoding device may perform a transform on some of a plurality of frames while not performing the transform on the other frames. Thus, the three-dimensional data encoding device can perform a transform on a frame having a code amount that is otherwise large, thereby reducing the code amount. The three-dimensional data encoding device can reduce a processing amount and improve its processing speed by not performing a transform on a frame that results in a minor effect of reducing its code amount. As seen from the above, the three-dimensional data encoding device can improve its processing speed while improving its compression efficiency.

For example, in the three-dimensional data decoding device, when the at least one second parameter corresponding to the current frame is not included in the bitstream, the at least one first parameter is used. In other words, the three-dimensional data encoding device stores, in the bitstream, the first parameter which is the parameter used in the transforming processing of the attribute information of the current frame.

For example, the transforming includes performing, on the attribute information, at least one of: multiplication or division, using a first value (for example, scale value (scale)); or addition or subtraction, using a second value (for example, offset value (offset)), and each of the at least one first parameter and the at least one second parameter indicates at least one of the first value or the second value.

For example, the bitstream includes information items on a plurality of types of the three-dimensional point, the information items on the plurality of types including the attribute information, and, the bitstream further includes first information (for example, is_property) indicating whether each of the information items on the plurality of types is compressed. In other words, the three-dimensional data encoding device stores, into the bitstream, the information items on the plurality of types of the three-dimensional point and the first information.

For example, the information items on the plurality of types include a plurality of types of attribute information (for example, a plurality of items of color information, normal vectors, and the like) of the three-dimensional point. For example, the information items on the plurality of types include geometry information of the three-dimensional point.

For example, the three-dimensional data encoding device may determine whether to transform attribute information in accordance with a type of the attribute information. The three-dimensional data encoding device may determine whether to transform attribute information in accordance with a data size of the attribute information. For example, a plurality of types of attribute information include first attribute information and second attribute information, and the three-dimensional data encoding device transforms the first attribute information and does not transform the second attribute information. Thus, the three-dimensional data encoding device can adaptively switch whether to transform attribute information in accordance with the types of the attribute information.

For example, the three-dimensional data encoding device determines whether to compress attribute information in accordance with a type of the attribute information. The three-dimensional data encoding device may determine whether to compress attribute information in accordance with a data size of the attribute information. For example, a plurality of types of attribute information include first attribute information and second attribute information, and the three-dimensional data encoding device compresses the first attribute information and does not compress the second attribute information. Thus, the three-dimensional data encoding device can adaptively switch whether to compress attribute information in accordance with the types of the attribute information.

For example, the bitstream includes first control information (for example, SPS) for the sequence, and the first control information includes information indicating a list of the information items on the plurality of types. For example, the first information includes: information (sps_id) identifying the first control information; and information (component_id) indicating an ordinal position, on the list, of information that is compressed.

For example, the bitstream further includes second information (for example, format_id) indicating a format type of point cloud data including the attribute information. In other words, the three-dimensional data encoding device stores the second information into the bitstream.

For example, the three-dimensional data encoding device includes a processor and memory, and the processor performs the above processes using the memory.

Figure 77:
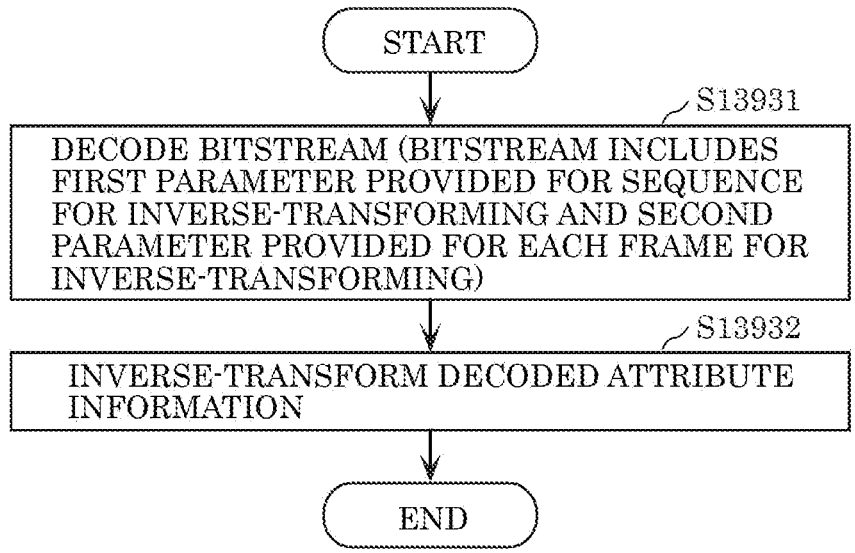
FIG. 77 is a flowchart of three-dimensional data decoding processing according to Embodiment 4.

Furthermore, the three-dimensional data decoding device according to the present embodiment performs the process illustrated in FIG. 77. The three-dimensional data decoding device decodes a bitstream to generate decoded attribute information (S13931); and inverse-transforms the decoded attribute information to generate attribute information of a three-dimensional point in at least one frame among frames constituting a sequence (S13932). The bitstream further includes: at least one first parameter (for example, offset, scale@sps in FIG. 75) provided for the sequence for the inverse-transforming; and at least one second parameter (for example, offset,scale@SEI1 and offset,scale@SEI2 in FIG. 75) provided for each of the at least one frame for the inverse-transforming. Specifically, the three-dimensional data encoding device stores a first parameter and a second parameter into a bitstream. For example, the three-dimensional data decoding device performs inverse-transforming using at least one first parameter or at least one second parameter.

For example, a bitstream includes sequence-based first control information (e.g., SPS) and frame-based second control information (frame-level SEI). The first control information includes at least one first parameter, and the second control information includes at least one second parameter. That is, the three-dimensional data decoding device obtains the first parameter from the first control information and obtains the second parameter from the second control information.

Accordingly, the three-dimensional data decoding device can decode attribute information from a bitstream for which coding efficiency has been improved.

For example, when the at least one second parameter corresponding to a current frame to be processed is included in the bitstream, the three-dimensional data decoding device inverse-transforms decoded attribute information of the current frame using the at least one second parameter, the current frame being included in the frames.

For example, when the at least one second parameter corresponding to the current frame is not included in the bitstream, the three-dimensional data decoding device inverse-transforms the decoded attribute information of the current frame using the at least one first parameter.

For example, the inverse-transforming includes performing, on the decoded attribute information, at least one of: multiplication or division using, a first value (for example, scale value (scale)); or addition or subtraction, using a second value (for example, offset value (offset)), and each of the at least one first parameter and the at least one second parameter indicates at least one of the first value or the second value.

For example, the bitstream includes information items on a plurality of types of the three-dimensional point, the information items on the plurality of types including the attribute information, and the bitstream further includes first information (for example, is_property) indicating whether each of the information items on the plurality of types is compressed. For example, the three-dimensional data decoding device decodes or obtains at least one of the information items on the plurality of types of the three-dimensional point from the bitstream, using the first information.

For example, the information items on the plurality of types include a plurality of types of attribute information (for example, a plurality of items of color information, normal vectors, and the like) of the three-dimensional point. For example, the information items on the plurality of types include geometry information of the three-dimensional point.

For example, the bitstream includes first control information (for example, SPS) for the sequence, and the first control information includes information indicating a list of the information items on the plurality of types. For example, the first information includes: information (sps_id) identifying the first control information; and information (component_id) indicating an ordinal position, on the list, of information that is compressed.

For example, the bitstream further includes second information (for example, format_id) indicating a format type of point cloud data including the attribute information.

For example, the three-dimensional data decoding device includes a processor and memory, and the processor performs the above processes using the memory.

A three-dimensional data encoding device, a three-dimensional data decoding device, and the like according to the embodiments of the present disclosure have been described above, but the present disclosure is not limited to these embodiments.

Note that each of the processors included in the three-dimensional data encoding device, the three-dimensional data decoding device, and the like according to the above embodiments is typically implemented as a large-scale integrated (LSI) circuit, which is an integrated circuit (IC). These may take the form of individual chips, or may be partially or entirely packaged into a single chip.

Such IC is not limited to an LSI, and thus may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

Moreover, in the above embodiments, the structural components may be implemented as dedicated hardware or may be realized by executing a software program suited to such structural components. Alternatively, the structural components may be implemented by a program executor such as a CPU or a processor reading out and executing the software program recorded in a recording medium such as a hard disk or a semiconductor memory.

The present disclosure may also be implemented as a three-dimensional data encoding method, a three-dimensional data decoding method, or the like executed by the three-dimensional data encoding device, the three-dimensional data decoding device, and the like.

Also, the divisions of the functional blocks shown in the block diagrams are mere examples, and thus a plurality of functional blocks may be implemented as a single functional block, or a single functional block may be divided into a plurality of functional blocks, or one or more functions may be moved to another functional block. Also, the functions of a plurality of functional blocks having similar functions may be processed by single hardware or software in a parallelized or time-divided manner.

Also, the processing order of executing the steps shown in the flowcharts is a mere illustration for specifically describing the present disclosure, and thus may be an order other than the shown order. Also, one or more of the steps may be executed simultaneously (in parallel) with another step.

A three-dimensional data encoding device, a three-dimensional data decoding device, and the like according to one or more aspects have been described above based on the embodiments, but the present disclosure is not limited to these embodiments. The one or more aspects may thus include forms achieved by making various modifications to the above embodiments that can be conceived by those skilled in the art, as well forms achieved by combining structural components in different embodiments, without materially departing from the spirit of the present disclosure.

INDUSTRIAL APPLICABILITY

The present disclosure is applicable to a three-dimensional data encoding device and a three-dimensional data decoding device.

The invention claimed is:

1. A three-dimensional data encoding device comprising:
a processor; and
memory, wherein
using the memory, the processor:
    obtains second attribute information obtained by transforming first attribute information of a three-dimensional point in at least one frame among frames, the frames constituting a sequence; and
    encodes the second attribute information to generate a bitstream, wherein
the transforming is different from quantization, and
the bitstream further includes:
    at least one first parameter provided for the sequence for the transforming;
    at least one second parameter provided for each of the at least one frame for the transforming; and
    second information indicating a format type of point cloud data including the second attribute information.

2. A three-dimensional data decoding device comprising:
a processor; and
memory, wherein
using the memory, the processor:
    obtains a bitstream; and
    decodes the bitstream to generate second attribute information obtained by transforming first attribute information of a three-dimensional point in at least one frame among frames, the frames constituting a sequence, wherein the transforming is different from quantization, and
the bitstream further includes:
- at least one first parameter provided for the sequence for the transforming;
- at least one second parameter provided for each of the at least one frame for the transforming; and
- second information indicating a format type of point cloud data including the second attribute information.

3. A three-dimensional data encoding device comprising:
a processor; and
memory, wherein
using the memory, the processor:
- obtains second attribute information obtained by transforming first attribute information of a three-dimensional point in at least one frame among frames, the frames constituting a sequence; and
- encodes the second attribute information to generate a bitstream, wherein the transforming is different from quantization,
the bitstream further includes:
- at least one first parameter provided for the sequence for the transforming; and
- at least one second parameter provided for each of the at least one frame for the transforming, and by the transforming, a negative value of the first attribute information is transformed into zero or a positive value.

4. A three-dimensional data decoding device comprising:
a processor; and
memory, wherein
using the memory, the processor:
- obtains a bitstream; and
- decodes the bitstream to generate second attribute information obtained by transforming first attribute information of a three-dimensional point in at least one frame among frames, the frames constituting a sequence, wherein the transforming is different from quantization,
the bitstream further includes:
- at least one first parameter provided for the sequence for the transforming; and
- at least one second parameter provided for each of the at least one frame for the transforming, and by the transforming, a negative value of the first attribute information is transformed into zero or a positive value.

* * * * *